United States Patent
Tang et al.

(10) Patent No.: US 10,690,886 B2
(45) Date of Patent: Jun. 23, 2020

(54) IMAGING LENS ASSEMBLY, IMAGE CAPTURING UNIT AND ELECTRONIC DEVICE

(71) Applicant: LARGAN Precision Co., Ltd., Taichung (TW)

(72) Inventors: Hsiang-Chi Tang, Taichung (TW); Cheng-Chen Lin, Taichung (TW); Chun-Yen Chen, Taichung (TW); Yu-Tai Tseng, Taichung (TW); Wei-Yu Chen, Taichung (TW)

(73) Assignee: LARGAN Precision Co., Ltd., Taichung (TW)

( * ) Notice: Subject to any disclaimer, the term of this patent is extended or adjusted under 35 U.S.C. 154(b) by 207 days.

(21) Appl. No.: 15/816,897

(22) Filed: Nov. 17, 2017

(65) Prior Publication Data
US 2019/0004285 A1 Jan. 3, 2019

(30) Foreign Application Priority Data
Jun. 30, 2017 (TW) .............................. 106122122 A

(51) Int. Cl.
  *G02B 13/00* (2006.01)
  *G02B 9/64* (2006.01)
(52) U.S. Cl.
  CPC ........... *G02B 13/0045* (2013.01); *G02B 9/64* (2013.01)
(58) Field of Classification Search
  CPC ...... G02B 13/0045; G02B 9/64; G02B 13/06; G02B 13/18
  USPC ........ 359/642, 708, 713, 739, 740, 754, 755
  See application file for complete search history.

(56) References Cited

U.S. PATENT DOCUMENTS

| 8,736,979 | B2 * | 5/2014 | Tsai | G02B 3/04 359/714 |
| 8,947,788 | B2 * | 2/2015 | Tsai | G02B 3/04 359/714 |
| 9,042,036 | B2 * | 5/2015 | Tsai | G02B 3/04 359/714 |
| 9,235,033 | B2 * | 1/2016 | Tsai | G02B 3/04 |
| 2015/0268448 | A1 | 9/2015 | Kubota et al. | |

(Continued)

FOREIGN PATENT DOCUMENTS

| CN | 205003345 U | 1/2016 |
| CN | 207473173 | 6/2018 |

(Continued)

*Primary Examiner* — Tuyen Tra
(74) *Attorney, Agent, or Firm* — Hanley, Flight & Zimmerman, LLC

(57) ABSTRACT

An imaging lens assembly includes, in order from an object side to an image side: a first lens element, a second lens element, a third lens element, a fourth lens element, a fifth lens element, a sixth lens element and a seventh lens element. The first lens element with positive refractive power has an object-side surface being convex in a paraxial region thereof and an image-side surface being concave in a paraxial region thereof. The seventh lens element has an image-side surface being concave in a paraxial region thereof. The image-side surface of the seventh lens element has at least one convex shape in an off-axis region thereof. An object-side surface and the image-side surface of the seventh lens element are aspheric. At least one of an image-side surface of the fourth lens element and an image-side surface of the fifth lens element has at least one inflection point.

28 Claims, 26 Drawing Sheets

(56) References Cited

U.S. PATENT DOCUMENTS

| | | |
|---|---|---|
| 2015/0277083 A1 | 10/2015 | Chae |
| 2015/0378131 A1 | 12/2015 | Tang et al. |
| 2016/0131874 A1 | 5/2016 | Tang et al. |
| 2017/0059825 A1 | 3/2017 | Tang et al. |
| 2017/0059826 A1 | 3/2017 | Tang et al. |
| 2018/0188486 A1 | 7/2018 | Gong et al. |
| 2018/0188488 A1 | 7/2018 | Gong et al. |
| 2018/0335608 A1 | 11/2018 | Chang et al. |
| 2018/0335609 A1 | 11/2018 | Chang et al. |

FOREIGN PATENT DOCUMENTS

| | | |
|---|---|---|
| JP | 2005-084387 | 3/2005 |
| JP | 2015072403 A | 4/2015 |
| JP | 2015072405 A | 4/2015 |
| JP | 2015114505 A | 6/2015 |
| WO | 2017-199633 | 11/2017 |
| WO | 2018224025 | 12/2018 |

\* cited by examiner

IMAGING LENS ASSEMBLY, IMAGE CAPTURING UNIT AND ELECTRONIC DEVICE

RELATED APPLICATIONS

This application claims priority under 35 U.S.C. § 119 to Taiwan Application 106122122, filed Jun. 30, 2017, which is incorporated by reference herein in its entirety.

BACKGROUND

Technical Field

The present disclosure relates to an imaging lens assembly, an image capturing unit and an electronic device, more particularly to an imaging lens assembly and an image capturing unit applicable to an electronic device.

Description of Related Art

In recent years, with the popularity of electronic devices having camera functionalities, the demand of miniaturized optical systems has been increasing. As advanced semiconductor manufacturing technologies have reduced the pixel size of sensors, and compact optical systems have gradually evolved toward the field of higher megapixels, there is an increasing demand for compact optical systems featuring better image quality.

For various applications, the optical systems have been widely applied to different kinds of electronic devices, such as vehicle devices, image recognition systems, entertainment devices, sport devices and intelligent home assistance systems. With the development and the popularity of intelligent electronic products, the demand for better imaging functionality is increasing. For example, consumers expect smartphones to be capable of recording images and capturing action photos or images with sufficient depth of focus in a low light condition (i.e. night-time) or dynamic photography (i.e. short exposure photography). Therefore, optical systems featuring large apertures are required so as to meet those demands. However, the optical systems with large apertures usually have a long total track length, thereby being large in size. Furthermore, since the image quality of the peripheral region of the image is closely related to the size of aperture, the optical systems with large apertures would lead to poor peripheral image quality. Therefore, the conventional optical systems with large apertures have been incapable of meeting the requirements of the current technology trends. Thus, in order to maintain peripheral image quality, there is a need to develop an optical system featuring not only large aperture, but also short total track length with high image quality.

SUMMARY

According to one aspect of the present disclosure, an imaging lens assembly includes seven lens elements. The seven lens elements are, in order from an object side to an image side, a first lens element, a second lens element, a third lens element, a fourth lens element, a fifth lens element, a sixth lens element and a seventh lens element. The first lens element with positive refractive power has an object-side surface being convex in a paraxial region thereof and an image-side surface being concave in a paraxial region thereof. The seventh lens element has an image-side surface being concave in a paraxial region thereof. The image-side surface of the seventh lens element has at least one convex shape in an off-axis region thereof. An object-side surface and the image-side surface of the seventh lens element are both aspheric. At least one of an image-side surface of the fourth lens element and an image-side surface of the fifth lens element has at least one inflection point. When a focal length of the imaging lens assembly is f, a curvature radius of the image-side surface of the fourth lens element is R8, a curvature radius of the image-side surface of the fifth lens element is R10, an axial distance between the object-side surface of the first lens element and the image-side surface of the seventh lens element is Td, a sum of central thicknesses of the seven lens elements of the imaging lens assembly is ΣCT, a focal length of the sixth lens element is f6, and a focal length of the seventh lens element is f7, the following conditions are satisfied:

$0 \leq f/R8;$ $0 \leq f/R10;$ $Td/\Sigma CT < 1.65;$ and $1.10 < |f/f6| + |f/f7|.$ According to another aspect of the present disclosure, an image capturing unit includes the aforementioned imaging lens assembly and an image sensor, wherein the image sensor is disposed on an image surface of the imaging lens assembly.

According to still another aspect of the present disclosure, an electronic device includes the aforementioned image capturing unit.

According to yet another aspect of the present disclosure, an imaging lens assembly includes seven lens elements. The seven lens elements are, in order from an object side to an image side, a first lens element, a second lens element, a third lens element, a fourth lens element, a fifth lens element, a sixth lens element and a seventh lens element. The first lens element with positive refractive power has an object-side surface being convex in a paraxial region thereof. The seventh lens element has an image-side surface being concave in a paraxial region thereof. The image-side surface of the seventh lens element has at least one convex shape in an off-axis region thereof. An object-side surface and the image-side surface of the seventh lens element are both aspheric. At least one of an image-side surface of the fourth lens element and an image-side surface of the fifth lens element has at least one inflection point. When a focal length of the imaging lens assembly is f, a curvature radius of the image-side surface of the fourth lens element is R8, a curvature radius of the image-side surface of the fifth lens element is R10, an axial distance between the object-side surface of the first lens element and the image-side surface of the seventh lens element is Td, a sum of central thicknesses of the seven lens elements of the imaging lens assembly is ΣCT, a focal length of the sixth lens element is f6, a focal length of the seventh lens element is t7, and a number of lens elements having an Abbe number smaller than 40 among the seven lens elements is V40, the following conditions are satisfied:

$0 \leq f/R8;$ $0 \leq f/R10,$ $Td/\Sigma CT < 1.65;$ $1.10 < |f/f6| + |f/f7|,$ and $3 \leq V40.$

BRIEF DESCRIPTION OF THE DRAWINGS

The disclosure can be better understood by reading the following detailed description of the embodiments, with reference made to the accompanying drawings as follows.

DETAILED DESCRIPTION

Figure 1:
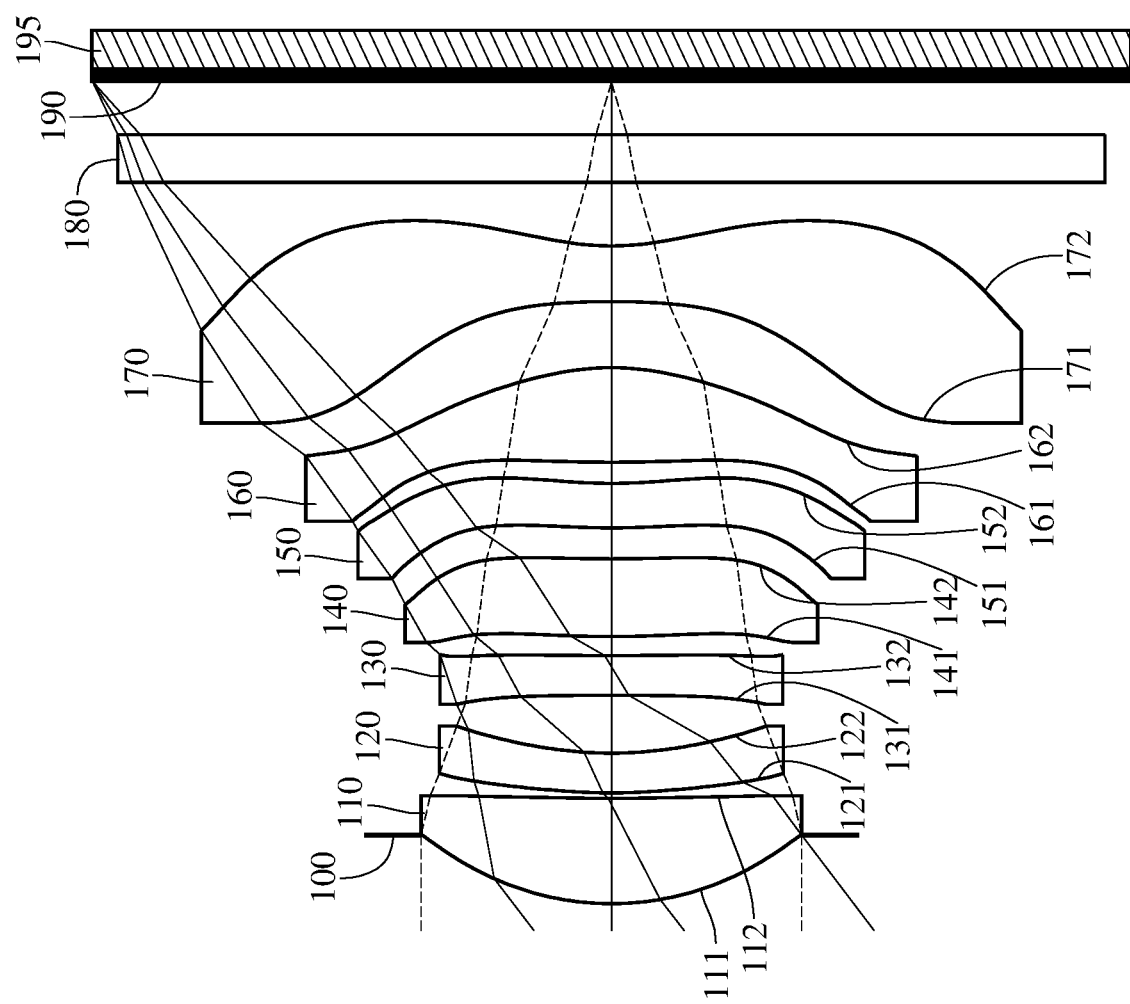
FIG. 1 is a schematic view of an image capturing unit according to the 1st embodiment of the present disclosure.

An imaging lens assembly includes seven lens elements. The seven lens elements are, in order from an object side to an image side, a first lens element, a second lens element, a third lens element, a fourth lens element, a fifth lens element, a sixth lens element and a seventh lens element.

The first lens element has positive refractive power; therefore, it is favorable for providing sufficient positive refractive power so as to reduce the sensitivity and a total track length of the imaging lens assembly. The first lens element has an object-side surface being convex in a paraxial region thereof, and the first lens element can have an image-side surface being concave in a paraxial region thereof; therefore, it is favorable for correcting aberrations.

Both an image-side surface of the fourth lens element and an image-side surface of the fifth lens element can be concave in a paraxial region thereof; therefore, along with the sixth lens element and the seventh lens element, the shapes of the fourth lens element and the fifth lens element are favorable for correcting aberrations. At least one of the image-side surface of the fourth lens element and the image-side surface of the fifth lens element has at least one inflection point; therefore, it is favorable for correcting off-axis aberrations.

The sixth lens element can have positive refractive power; therefore, it is favorable for light from the periphery of an imaged object to converge onto an image surface. The sixth lens element can have an image-side surface being convex in a paraxial region thereof; therefore, it is favorable for strengthening the positive refractive power of the sixth lens element.

The seventh lens element can have an object-side surface being concave in a paraxial region thereof; therefore, it is favorable for correcting aberrations. The seventh lens element has an image-side surface being concave in a paraxial region thereof, and the image-side surface of the seventh lens element has at least one convex shape in an off-axis region thereof; therefore, it is favorable for reducing a back focal length so as to keep the imaging lens assembly compact; furthermore, it is favorable for correcting field curvature and reducing the incident angle of light projecting onto the image surface so as to improve peripheral image quality.

When a focal length of the imaging lens assembly is f, and a curvature radius of the image-side surface of the fourth lens element is R8, the following condition is satisfied: $0 \leq f/R8$. Therefore, it is favorable for reducing the back focal length of the imaging lens assembly so as to achieve compactness.

When the focal length of the imaging lens assembly is f, and a curvature radius of the image-side surface of the fifth lens element is R10, the following condition is satisfied: $0 \leq f/R10$. Therefore, it is favorable for further reducing the back focal length.

When an axial distance between the object-side surface of the first lens element and the image-side surface of the seventh lens element is Td, and a sum of central thicknesses of the seven lens elements (the first lens element through the seventh lens element) of the imaging lens assembly is $\Sigma CT$, the following condition is satisfied: $Td/\Sigma CT < 1.65$. Therefore, it is favorable for efficiently utilizing the space in the imaging lens assembly so as to reduce the size and the total track length of the imaging lens assembly for compactness. Preferably, the following condition can be satisfied: $1.0 \leq Td/\Sigma CT \leq 1.55$. More preferably, the following condition can also be satisfied: $1.20 \leq Td/\Sigma CT \leq 1.50$.

When the focal length of the imaging lens assembly is f, a focal length of the sixth lens element is f6, and a focal length of the seventh lens element is t7, the following condition is satisfied: $1.10 < |f/f6| + |f/f7|$. Therefore, it is favorable for light from the periphery of an imaged object to converge onto the image surface by the sixth lens element and the seventh lens element with strong refractive power, thereby improving peripheral image quality. Preferably, the following condition can also be satisfied: $1.5 < |f/f6| + |f/f7| < 5.0$.

When the number of lens elements having an Abbe number smaller than 40 among the seven lens elements is V40, the number of lens elements having an Abbe number smaller than 30 among the seven lens elements is V30, and the number of lens elements having an Abbe number smaller than 20 among the seven lens elements is V20, at least one of the following conditions can be satisfied: $3 \leq V40$; $3 \leq V30$; and $1 \leq V20$. Therefore, with the configuration of the imaging lens assembly having a large aperture, it is favorable for improving the capability of correcting chromatic aberration to have better peripheral image quality. Preferably, the following condition can also be satisfied: $30 < V2+V3+V4 < 115$.

When a focal length of the first lens element is f1, and a focal length of the second lens element is f2, the following condition can be satisfied: $f1/|f2| < 1.80$. Therefore, it is favorable for the first lens element to have sufficient positive refractive power so as to allow light from the periphery of an imaged object converging onto the image surface. Preferably, the following condition can also be satisfied: $f1/|f2| < 0.50$.

When an axial distance between the first lens element and the second lens element is T12, an axial distance between the second lens element and the third lens element is T23, an axial distance between the third lens element and the fourth lens element is T34, an axial distance between the fourth lens element and the fifth lens element is T45, an axial distance between the fifth lens element and the sixth lens element is T56, and an axial distance between the sixth lens element and the seventh lens element is T67, the following conditions can be satisfied: $1.0 < T67/T12$; $1.0 < T67/T23$; $1.0 < T67/T34$; $1.0 < T67/T45$; and $1.0 < T67/T56$. Therefore, a sufficient axial distance between the sixth lens element and the seventh lens element is favorable for the sixth and the seventh lens elements to have proper lens shape so as to improve peripheral image quality. Preferably, at least one of the following conditions can be satisfied: $2.0 < T67/T12 < 50$; $1.25 < T67/T23 < 20$; $1.25 < T67/T34 < 20$; $1.25 < T67/T45 < 10$; and $1.50 < T67/T56$. More preferably, at least one of the following conditions can also be satisfied: $3.0 < T67/T12 < 30$; $1.5 < T67/T23 < 10$; $1.5 < T67/T34 < 10$; $1.5 < T67/T45 < 8.0$; and $2.0 < T67/T56 < 10$.

When an axial distance between the object-side surface of the first lens element and an image surface is TL, and a maximum image height of the imaging lens assembly (half of a diagonal length of an effective photosensitive area of an image sensor) is ImgH, the following condition can be satisfied: $0.80 < TL/ImgH < 1.75$. Therefore, it is favorable for keeping the imaging lens assembly compact. Preferably, the following condition can also be satisfied: $1.0 < TL/ImgH < 1.60$.

When an f-number of the imaging lens assembly is Fno, the following condition can be satisfied: $1.0 < Fno < 2.0$. Therefore, it is favorable for the imaging lens assembly featuring a large aperture to provide sufficient depth of focus for capturing images.

When a curvature radius of the image-side surface of the first lens element is R2, and a central thickness of the first lens element is CT1, the following condition can be satisfied: $0 < R2/CT1$. Therefore, it is favorable for balancing the positive refractive power distribution of the imaging lens assembly so as to correct aberrations.

When the focal length of the imaging lens assembly is f, the focal length of the first lens element is f1, the focal length of the second lens element is f2, the maximum image height of the imaging lens assembly is ImgH, and the axial distance between the object-side surface of the first lens element and the image surface is TL, at least one of the following conditions can be satisfied: $0.50 < f \times (|f1|+|f2|)/(|f1| \times |f2|) < 1.65$; and $|(f1/ImgH) \times (TL/f2)| < 0.85$. Therefore, it is favorable for the first lens element to have sufficient positive refractive power so as to allow light from the periphery of an imaged object converging onto the image surface. Preferably, the following condition can also be satisfied: $0.50 < f \times (|f1|+|f2|)/(|f1| \times |f2|) < 1.50$.

When the focal length of the imaging lens assembly is f, the curvature radius of the image-side surface of the fourth lens element is R8, and the curvature radius of the image-side surface of the fifth lens element is R10, the following condition can be satisfied: $0.25 < (f/R8)+(f/R10)$. Therefore, the shapes of the fourth lens element and the fifth lens element are favorable for correcting aberrations when configured with the sixth lens element and the seventh lens element. Preferably, the following condition can also be satisfied: $0.50 < (f/R8)+(f/R10) < 3.0$.

When a maximum value among all refractive indices of the seven lens elements of the imaging lens assembly is Nmax, the following condition can be satisfied: $1.65 \leq Nmax < 1.75$. Therefore, it is favorable for selecting proper materials of the lens elements so as to achieve compactness, and thus the imaging lens assembly is applicable to compact electronic devices.

According to the present disclosure, the lens elements thereof can be made of glass or plastic material. When the lens elements are made of glass material, the distribution of the refractive power of the lens system may be more flexible to design. When the lens elements are made of plastic material, the manufacturing cost can be effectively reduced. Furthermore, surfaces of each lens element can be arranged to be aspheric, since the aspheric surface of the lens element is easy to form a shape other than spherical surface so as to have more controllable variables for eliminating the aberration thereof, and to further decrease the required number of the lens elements. Therefore, the total track length of the lens system can also be reduced.

According to the present disclosure, each of an object-side surface and an image-side surface has a paraxial region and an off-axis region. The paraxial region refers to the region of the surface where light rays travel close to the optical axis, and the off-axis region refers to the region of the surface away from the paraxial region. Particularly, unless otherwise stated, when the lens element has a convex surface, it indicates that the surface is convex in the paraxial region thereof; when the lens element has a concave surface, it indicates that the surface is concave in the paraxial region thereof. Moreover, when a region of refractive power or focus of a lens element is not defined, it indicates that the region of refractive power or focus of the lens element is in the paraxial region thereof.

According to the present disclosure, an inflection point is a point on the surface of the lens element at which the surface changes from concave to convex, or vice versa.

According to the present disclosure, an image surface of the imaging lens assembly, based on the corresponding image sensor, can be flat or curved, especially a curved surface being concave facing towards the object side of the imaging lens assembly.

According to the present disclosure, an image correction unit, such as a field flattener, can be optionally disposed between the lens element closest to the image side of the imaging lens assembly and the image surface for correcting aberrations such as field curvature. The optical properties of the image correction unit, such as curvature, thickness, index of refraction, position and surface shape (convex or concave surface with spherical, aspheric, diffractive or Fresnel types), can be adjusted according to the design of an image capturing unit. In general, a preferable image correction unit is, for example, a thin transparent element having a concave object-side surface and a planar image-side surface, and the thin transparent element is disposed near the image surface.

According to the present disclosure, the imaging lens assembly can include at least one stop, such as an aperture stop, a glare stop or a field stop. Said glare stop or said field stop is set for eliminating the stray light and thereby improving the image quality thereof.

According to the present disclosure, an aperture stop can be configured as a front stop or a middle stop. A front stop disposed between an imaged object and the first lens element can provide a longer distance between an exit pupil of the lens system and the image surface to produce a telecentric effect, and thereby improves the image-sensing efficiency of an image sensor (for example, CCD or CMOS). A middle stop disposed between the first lens element and the image surface is favorable for enlarging the view angle of the imaging lens assembly and thereby provides a wider field of view for the same.

According to the above description of the present disclosure, the following specific embodiments are provided for further explanation.

1st Embodiment

Figure 2:
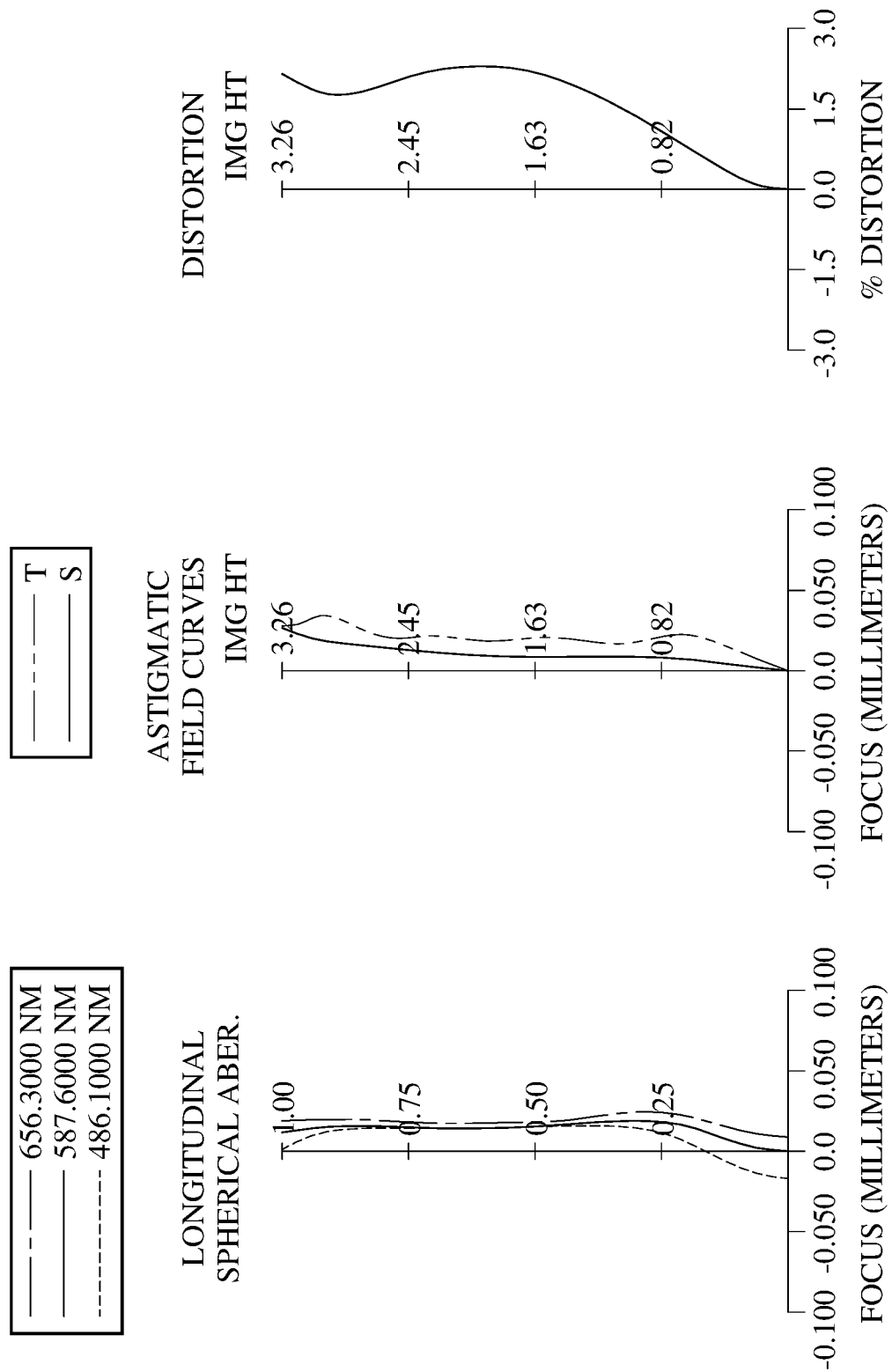
FIG. 2 shows spherical aberration curves, astigmatic field curves and a distortion curve of the image capturing unit according to the 1st embodiment.

FIG. 1 is a schematic view of an image capturing unit according to the 1st embodiment of the present disclosure. FIG. 2 shows, in order from left to right, spherical aberration curves, astigmatic field curves and a distortion curve of the image capturing unit according to the 1st embodiment. In FIG. 1, the image capturing unit includes the imaging lens assembly (its reference numeral is omitted) of the present disclosure and an image sensor 195. The imaging lens assembly includes, in order from an object side to an image side, an aperture stop 100, a first lens element 110, a second lens element 120, a third lens element 130, a fourth lens element 140, a fifth lens element 150, a sixth lens element 160, a seventh lens element 170, an IR-cut filter 180 and an image surface 190. The imaging lens assembly includes seven lens elements (110, 120, 130, 140, 150, 160 and 170) with no additional lens element disposed between each of the adjacent seven lens elements.

The first lens element 110 with positive refractive power has an object-side surface 111 being convex in a paraxial region thereof and an image-side surface 112 being concave in a paraxial region thereof. The first lens element 110 is made of plastic material and has the object-side surface 111 and the image-side surface 112 being both aspheric.

The second lens element 120 with negative refractive power has an object-side surface 121 being convex in a paraxial region thereof and an image-side surface 122 being concave in a paraxial region thereof. The second lens element 120 is made of plastic material and has the object-side surface 121 and the image-side surface 122 being both aspheric.

The third lens element 130 with negative refractive power has an object-side surface 131 being concave in a paraxial region thereof and an image-side surface 132 being concave in a paraxial region thereof. The third lens element 130 is made of plastic material and has the object-side surface 131 and the image-side surface 132 being both aspheric.

The fourth lens element 140 with positive refractive power has an object-side surface 141 being convex in a paraxial region thereof and an image-side surface 142 being concave in a paraxial region thereof. The fourth lens element 140 is made of plastic material and has the object-side surface 141 and the image-side surface 142 being both aspheric. The image-side surface 142 of the fourth lens element 140 has at least one inflection point.

The fifth lens element 150 with negative refractive power has an object-side surface 151 being convex in a paraxial region thereof and an image-side surface 152 being concave in a paraxial region thereof. The fifth lens element 150 is made of plastic material and has the object-side surface 151 and the image-side surface 152 being both aspheric. The image-side surface 152 of the fifth lens element 150 has at least one inflection point.

The sixth lens element 160 with positive refractive power has an object-side surface 161 being convex in a paraxial region thereof and an image-side surface 162 being convex in a paraxial region thereof. The sixth lens element 160 is made of plastic material and has the object-side surface 161 and the image-side surface 162 being both aspheric.

The seventh lens element 170 with negative refractive power has an object-side surface 171 being concave in a paraxial region thereof and an image-side surface 172 being concave in a paraxial region thereof. The seventh lens element 170 is made of plastic material and has the object-side surface 171 and the image-side surface 172 being both aspheric. The image-side surface 172 of the seventh lens element 170 has at least one convex shape in an off-axis region thereof.

The IR-cut filter 180 is made of glass material and located between the seventh lens element 170 and the image surface 190, and will not affect the focal length of the imaging lens assembly. The image sensor 195 is disposed on or near the image surface 190 of the imaging lens assembly.

The equation of the aspheric surface profiles of the aforementioned lens elements of the 1st embodiment is expressed as follows:

$$X(Y) = (Y^2/R)/(1 + sqrt(1 - (1+k) \times (Y/R)^2)) + \sum_i (Ai) \times (Y^i),$$

where,

X is the relative distance between a point on the aspheric surface spaced at a distance Y from an optical axis and the tangential plane at the aspheric surface vertex on the optical axis;

Y is the vertical distance from the point on the aspheric surface to the optical axis;

R is the curvature radius;

k is the conic coefficient; and

Ai is the i-th aspheric coefficient, and in the embodiments, i may be, but is not limited to, 4, 6, 8, 10, 12, 14, 16, 18 and 20.

In the imaging lens assembly of the image capturing unit according to the 1st embodiment, when a focal length of the imaging lens assembly is f, an f-number of the imaging lens assembly is Fno, and half of a maximum field of view of the imaging lens assembly is HFOV, these parameters have the following values: f=4.19 millimeters (mm), Fno=1.75, HFOV=37.2 degrees (deg.).

When a maximum value among all refractive indices of the seven lens elements of the imaging lens assembly is Nmax, the following condition is satisfied: Nmax=1.671. In this embodiment, the refractive index of the second lens element 120 is equal to the refractive index of the third lens element 130, and both the refractive indices of the second lens element 120 and the third lens element 130 are larger than the refractive indices of the first lens element 110, the fourth lens element 140, the fifth lens element 150, the sixth lens element 160 and the seventh lens element 170. Accordingly, Nmax is equal to either the refractive index of the second lens element 120 or the refractive index of the third lens element 130.

When an Abbe number of the second lens element 120 is V2, an Abbe number of the third lens element 130 is V3, and an Abbe number of the fourth lens element 140 is V4, the following condition is satisfied: V2+V3+V4=94.5.

When the number of lens elements having an Abbe number smaller than 40 among the seven lens elements is V40, the following condition is satisfied: V40=3. In this embodiment, the Abbe numbers of the second lens element 120, the third lens element 130 and the fifth lens element 150 are all smaller than 40.

When the number of lens elements having an Abbe number smaller than 30 among the seven lens elements is V30, the following condition is satisfied: V30=3. In this embodiment, the Abbe numbers of the second lens element 120, the third lens element 130 and the fifth lens element 150 are all smaller than 30.

When the number of lens elements having an Abbe number smaller than 20 among the seven lens elements is V20, the following condition is satisfied: V20=2. In this embodiment, the Abbe numbers of the second lens element 120 and the third lens element 130 are both smaller than 20.

When a curvature radius of the image-side surface 112 of the first lens element 110 is R2, and a central thickness of the first lens element 110 is CT1, the following condition is satisfied: R2/CT1=12.19.

When the focal length of the imaging lens assembly is f, and a curvature radius of the image-side surface 142 of the fourth lens element 140 is R8, the following condition is satisfied: f/R8=0.47.

When the focal length of the imaging lens assembly is f, and a curvature radius of the image-side surface 152 of the fifth lens element 150 is R10, the following condition is satisfied: f/R10=1.34.

When the focal length of the imaging lens assembly is f, the curvature radius of the image-side surface 142 of the fourth lens element 140 is R8, and the curvature radius of the image-side surface 152 of the fifth lens element 150 is R10, the following condition is satisfied: (f/R8)+(f/R10)=1.81.

When an axial distance between the first lens element 110 and the second lens element 120 is T12, and an axial distance between the sixth lens element 160 and the seventh lens element 170 is T67, the following condition is satisfied: T67/T12=11.89. In this embodiment, the axial distance between two adjacent lens elements is the air gap in a paraxial region between the two adjacent lens elements.

When an axial distance between the second lens element 120 and the third lens element 130 is T23, and the axial distance between the sixth lens element 160 and the seventh lens element 170 is T67, the following condition is satisfied: T67/T23=1.14.

When an axial distance between the third lens element 130 and the fourth lens element 140 is T34, and the axial distance between the sixth lens element 160 and the seventh lens element 170 is T67, the following condition is satisfied: T67/T34=3.47.

When an axial distance between the fourth lens element 140 and the fifth lens element 150 is T45, and the axial distance between the sixth lens element 160 and the seventh lens element 170 is T67, the following condition is satisfied: T67/T45=2.13.

When an axial distance between the fifth lens element 150 and the sixth lens element 160 is T56, and the axial distance between the sixth lens element 160 and the seventh lens element 170 is T67, the following condition is satisfied: T67/T56=3.13.

When an axial distance between the object-side surface 111 of the first lens element 110 and the image-side surface 172 of the seventh lens element 170 is Td, and a sum of central thicknesses of the seven lens elements of the imaging lens assembly is $\Sigma CT$, the following condition is satisfied: Td/$\Sigma CT$=1.44.

When an axial distance between the object-side surface 111 of the first lens element 110 and the image surface 190 is TL, and a maximum image height of the imaging lens assembly is ImgH, the following condition is satisfied: TL/ImgH=1.59.

When a focal length of the first lens element 110 is f1, and a focal length of the second lens element 120 is f2, the following condition is satisfied: f1/|f2|=0.25.

When the focal length of the first lens element 110 is f1, the focal length of the second lens element 120 is f2, the maximum image height of the imaging lens assembly is ImgH, and the axial distance between the object-side surface 111 of the first lens element 110 and the image surface 190 is TL, the following condition is satisfied: |(f1/ImgH)×(TL/f2)|=0.39.

When the focal length of the imaging lens assembly is f, the focal length of the first lens element 110 is f1, and the focal length of the second lens element 120 is f2, the following condition is satisfied: f×(|f1|+|f2|)/(|f1|×|f2|)=1.27.

When the focal length of the imaging lens assembly is f, a focal length of the sixth lens element 160 is f6, and a focal length of the seventh lens element 170 is f7, the following condition is satisfied: |f/f6|+|f/f7|=3.38.

The detailed optical data of the 1st embodiment are shown in Table 1 and the aspheric surface data are shown in Table 2 below.

TABLE 1

1st Embodiment
f = 4.19 mm, Fno = 1.75, HFOV = 37.2 deg.

| Surface # | | Curvature Radius | | Thickness | Material | Index | Abbe # | Focal Length |
|---|---|---|---|---|---|---|---|---|
| 0 | Object | Plano | | Infinity | | | | |
| 1 | Ape. Stop | Plano | | −0.430 | | | | |
| 2 | Lens 1 | 1.801 | (ASP) | 0.662 | Plastic | 1.545 | 56.0 | 4.11 |
| 3 | | 8.069 | (ASP) | 0.035 | | | | |
| 4 | Lens 2 | 3.248 | (ASP) | 0.250 | Plastic | 1.671 | 19.3 | −16.61 |
| 5 | | 2.437 | (ASP) | 0.364 | | | | |
| 6 | Lens 3 | −34.463 | (ASP) | 0.250 | Plastic | 1.671 | 19.3 | −19.49 |
| 7 | | 21.129 | (ASP) | 0.120 | | | | |
| 8 | Lens 4 | 6.200 | (ASP) | 0.489 | Plastic | 1.544 | 55.9 | 35.49 |
| 9 | | 8.882 | (ASP) | 0.195 | | | | |
| 10 | Lens 5 | 4.704 | (ASP) | 0.280 | Plastic | 1.584 | 28.2 | −17.06 |
| 11 | | 3.126 | (ASP) | 0.133 | | | | |
| 12 | Lens 6 | 9.473 | (ASP) | 0.595 | Plastic | 1.544 | 55.9 | 2.56 |
| 13 | | −1.598 | (ASP) | 0.416 | | | | |
| 14 | Lens 7 | −5.451 | (ASP) | 0.350 | Plastic | 1.515 | 56.5 | −2.39 |
| 15 | | 1.625 | (ASP) | 0.400 | | | | |
| 16 | IR-cut filter | Plano | | 0.300 | Glass | 1.517 | 64.2 | — |
| 17 | | Plano | | 0.335 | | | | |
| 18 | Image | Plano | | — | | | | |

Note:
Reference wavelength is 587.6 nm (d-line).
An effective radius of the image-side surface 162 (Surface 13) is 1.9125 mm.

TABLE 2

Aspheric Coefficients

| | Surface # | | | | |
|---|---|---|---|---|---|
| | 2 | 3 | 4 | 5 | 6 |
| k = | −3.5677E−01 | 2.0519E+01 | −6.5838E−01 | −9.4845E−01 | 1.0000E+01 |
| A4 = | 7.7721E−03 | −2.6482E−01 | −2.8505E−01 | −6.7345E−02 | −3.0411E−02 |
| A6 = | −1.3172E−02 | 8.4909E−01 | 8.2310E−01 | 1.2789E−02 | −2.1207E−02 |
| A8 = | 8.5405E−02 | −1.8611E+00 | −1.7109E+00 | 5.4235E−01 | 1.4167E−01 |
| A10 = | −2.6562E−01 | 2.8482E+00 | 2.5658E+00 | −2.2519E+00 | −7.0497E−01 |
| A12 = | 4.8120E−01 | −3.0432E+00 | −2.7200E+00 | 4.7616E+00 | 1.6563E+00 |
| A14 = | −5.2952E−01 | 2.2060E+00 | 1.9918E+00 | −6.0497E+00 | −2.3571E+00 |
| A16 = | 3.4664E−01 | −1.0330E+00 | −9.6346E−01 | 4.6620E+00 | 2.0440E+00 |
| A18 = | −1.2453E−01 | 2.8215E−01 | 2.8277E−01 | −2.0190E+00 | −9.6585E−01 |
| A20 = | 1.8781E−02 | −3.4269E−02 | −3.8654E−02 | 3.8443E−01 | 1.9182E−01 |

| | Surface # | | | | |
|---|---|---|---|---|---|
| | 7 | 8 | 9 | 10 | 11 |
| k = | −8.7919E+01 | −3.8034E+01 | −7.1690E+01 | −4.1045E−01 | −3.2677E+01 |
| A4 = | −3.8819E−02 | −7.2153E−02 | −7.3400E−02 | −1.9738E−01 | −8.8848E−02 |
| A6 = | −3.8906E−02 | −7.6564E−03 | −1.2368E−01 | 1.2943E−01 | −9.8787E−02 |
| A8 = | 3.0693E−01 | 1.5134E−02 | 3.9820E−01 | −2.0435E−01 | 2.0034E−01 |
| A10 = | −8.8942E−01 | 8.2174E−02 | −9.4399E−01 | 3.9604E−01 | −2.0014E−01 |
| A12 = | 1.3828E+00 | −4.3049E−01 | 1.3407E+00 | −6.5733E−01 | 9.7130E−02 |
| A14 = | −1.2603E+00 | 7.5931E−01 | −1.2164E+00 | 6.3037E−01 | 2.8824E−03 |
| A16 = | 6.5690E−01 | −7.0703E−01 | 6.9534E−01 | −3.2791E−01 | −2.5970E−02 |
| A18 = | −1.4519E−01 | 3.5499E−01 | −2.2694E−01 | 8.7654E−02 | 1.0773E−02 |
| A20 = | −8.9507E−04 | −7.3557E−02 | 3.2198E−02 | −9.5525E−03 | −1.4274E−03 |

| | Surface # | | | |
|---|---|---|---|---|
| | 12 | 13 | 14 | 15 |
| k = | 9.4302E+00 | −6.3974E+00 | −9.0287E−02 | −5.1898E+00 |
| A4 = | −2.6481E−02 | −4.0804E−03 | −8.7822E−02 | −1.4654E−01 |
| A6 = | −7.2453E−02 | −4.8104E−03 | −6.8403E−02 | 8.9915E−02 |
| A8 = | −1.2564E−02 | −2.8876E−02 | 1.1189E−01 | −4.4661E−02 |
| A10 = | 1.0518E−01 | 2.7645E−02 | −7.5062E−02 | 1.6743E−02 |
| A12 = | −1.3069E−01 | −8.0492E−03 | 3.1391E−02 | −4.6029E−03 |
| A14 = | 1.0120E−01 | 4.3498E−04 | −8.2259E−03 | 8.8136E−04 |
| A16 = | −4.9828E−02 | 1.7843E−04 | 1.2945E−03 | −1.1006E−04 |

TABLE 2-continued

Aspheric Coefficients

| A18 = | 1.3424E−02 | −2.7120E−05 | −1.1162E−04 | 7.9805E−06 |
|---|---|---|---|---|
| A20 = | −1.4675E−03 | 7.2411E−07 | 4.0551E−06 | −2.5222E−07 |

In Table 1, the curvature radius, the thickness and the focal length are shown in millimeters (mm). Surface numbers 0-18 represent the surfaces sequentially arranged from the object side to the image side along the optical axis. In Table 2, k represents the conic coefficient of the equation of the aspheric surface profiles. A4-A20 represent the aspheric coefficients ranging from the 4th order to the 20th order. The tables presented below for each embodiment are the corresponding schematic parameter and aberration curves, and the definitions of the tables are the same as Table 1 and Table 2 of the 1st embodiment. Therefore, an explanation in this regard will not be provided again.

2nd Embodiment

Figure 3:
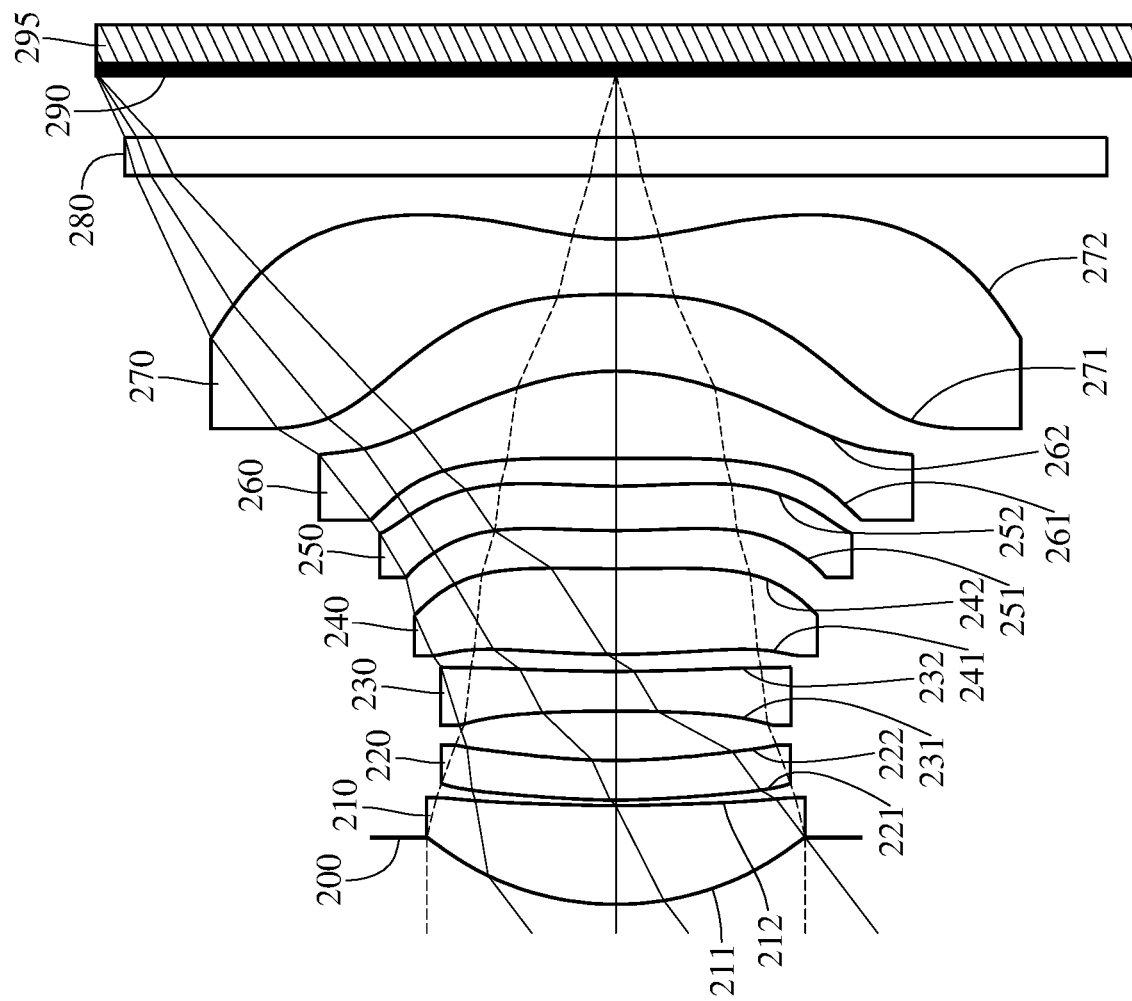
FIG. 3 is a schematic view of an image capturing unit according to the 2nd embodiment of the present disclosure.
Figure 4:
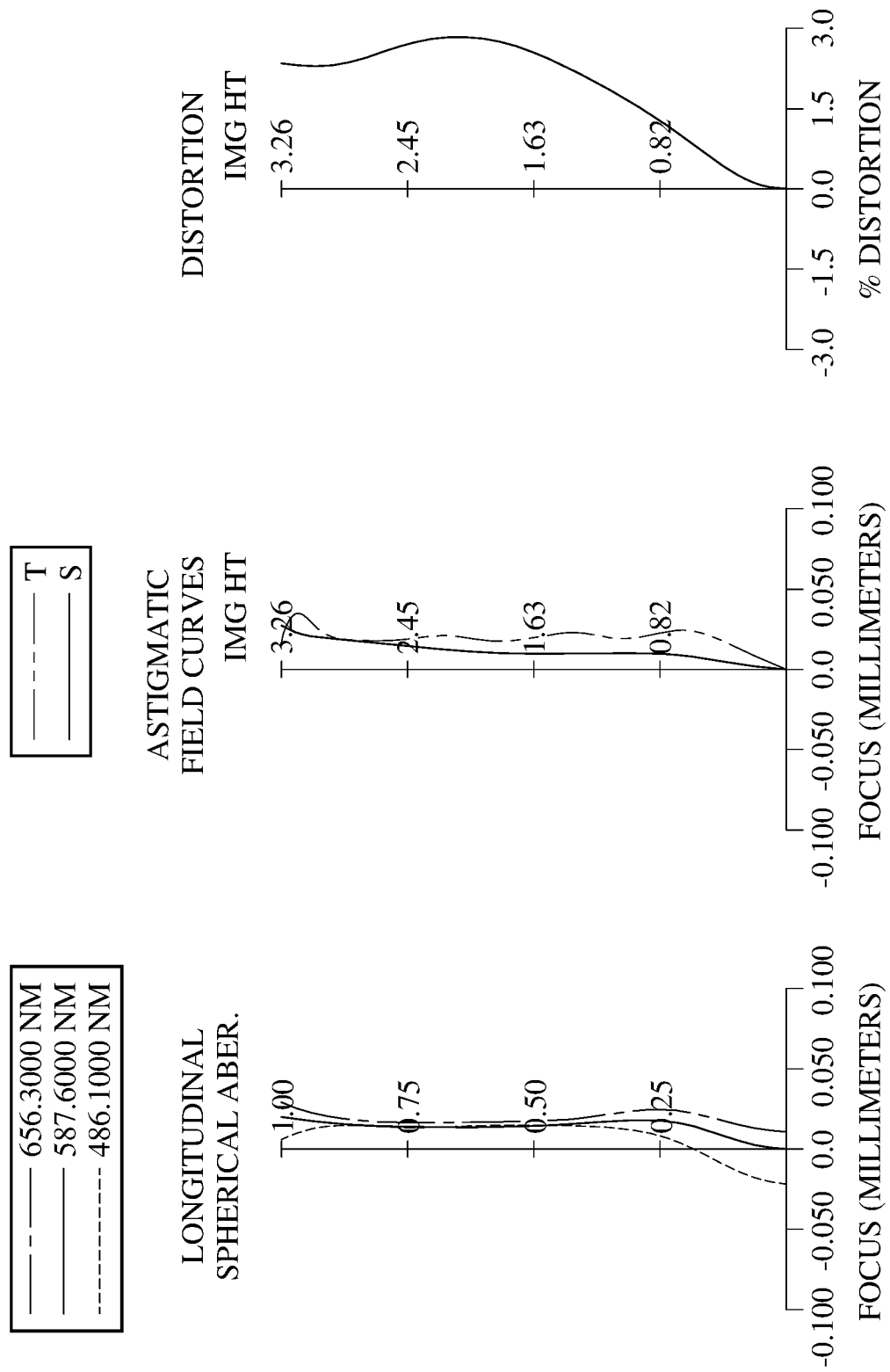
FIG. 4 shows spherical aberration curves, astigmatic field curves and a distortion curve of the image capturing unit according to the 2nd embodiment.

FIG. 3 is a schematic view of an image capturing unit according to the 2nd embodiment of the present disclosure. FIG. 4 shows, in order from left to right, spherical aberration curves, astigmatic field curves and a distortion curve of the image capturing unit according to the 2nd embodiment. In FIG. 3, the image capturing unit includes the imaging lens assembly (its reference numeral is omitted) of the present disclosure and an image sensor 295. The imaging lens assembly includes, in order from an object side to an image side, an aperture stop 200, a first lens element 210, a second lens element 220, a third lens element 230, a fourth lens element 240, a fifth lens element 250, a sixth lens element 260, a seventh lens element 270, an IR-cut filter 280 and an image surface 290. The imaging lens assembly includes seven lens elements (210, 220, 230, 240, 250, 260 and 270) with no additional lens element disposed between each of the adjacent seven lens elements.

The first lens element 210 with positive refractive power has an object-side surface 211 being convex in a paraxial region thereof and an image-side surface 212 being concave in a paraxial region thereof. The first lens element 210 is made of plastic material and has the object-side surface 211 and the image-side surface 212 being both aspheric.

The second lens element 220 with positive refractive power has an object-side surface 221 being convex in a paraxial region thereof and an image-side surface 222 being concave in a paraxial region thereof. The second lens element 220 is made of plastic material and has the object-side surface 221 and the image-side surface 222 being both aspheric.

The third lens element 230 with negative refractive power has an object-side surface 231 being concave in a paraxial region thereof and an image-side surface 232 being concave in a paraxial region thereof. The third lens element 230 is made of plastic material and has the object-side surface 231 and the image-side surface 232 being both aspheric.

The fourth lens element 240 with positive refractive power has an object-side surface 241 being convex in a paraxial region thereof and an image-side surface 242 being concave in a paraxial region thereof. The fourth lens element 240 is made of plastic material and has the object-side surface 241 and the image-side surface 242 being both aspheric. The image-side surface 242 of the fourth lens element 240 has at least one inflection point.

The fifth lens element 250 with negative refractive power has an object-side surface 251 being convex in a paraxial region thereof and an image-side surface 252 being concave in a paraxial region thereof. The fifth lens element 250 is made of plastic material and has the object-side surface 251 and the image-side surface 252 being both aspheric. The image-side surface 252 of the fifth lens element 250 has at least one inflection point.

The sixth lens element 260 with positive refractive power has an object-side surface 261 being convex in a paraxial region thereof and an image-side surface 262 being convex in a paraxial region thereof. The sixth lens element 260 is made of plastic material and has the object-side surface 261 and the image-side surface 262 being both aspheric.

The seventh lens element 270 with negative refractive power has an object-side surface 271 being concave in a paraxial region thereof and an image-side surface 272 being concave in a paraxial region thereof. The seventh lens element 270 is made of plastic material and has the object-side surface 271 and the image-side surface 272 being both aspheric. The image-side surface 272 of the seventh lens element 270 has at least one convex shape in an off-axis region thereof.

The IR-cut filter 280 is made of glass material and located between the seventh lens element 270 and the image surface 290, and will not affect the focal length of the imaging lens assembly. The image sensor 295 is disposed on or near the image surface 290 of the imaging lens assembly.

The detailed optical data of the 2nd embodiment are shown in Table 3 and the aspheric surface data are shown in Table 4 below.

TABLE 3

2nd Embodiment
f = 4.18 mm, Fno = 1.75, HFOV = 37.2 deg.

| Surface # | | Curvature Radius | | Thickness | Material | Index | Abbe # | Focal Length |
|---|---|---|---|---|---|---|---|---|
| 0 | Object | Plano | | Infinity | | | | |
| 1 | Ape. Stop | Plano | | −0.420 | | | | |
| 2 | Lens 1 | 1.893 | (ASP) | 0.621 | Plastic | 1.545 | 56.1 | 4.95 |
| 3 | | 5.614 | (ASP) | 0.035 | | | | |
| 4 | Lens 2 | 3.614 | (ASP) | 0.250 | Plastic | 1.671 | 19.3 | 73.23 |
| 5 | | 3.793 | (ASP) | 0.311 | | | | |
| 6 | Lens 3 | −12.282 | (ASP) | 0.250 | Plastic | 1.671 | 19.3 | −8.20 |
| 7 | | 10.048 | (ASP) | 0.107 | | | | |

TABLE 3-continued

2nd Embodiment
f = 4.18 mm, Fno = 1.75, HFOV = 37.2 deg.

| Surface # | | Curvature Radius | | Thickness | Material | Index | Abbe # | Focal Length |
|---|---|---|---|---|---|---|---|---|
| 8 | Lens 4 | 4.953 | (ASP) | 0.540 | Plastic | 1.544 | 56.0 | 14.17 |
| 9 | | 13.314 | (ASP) | 0.240 | | | | |
| 10 | Lens 5 | 4.862 | (ASP) | 0.280 | Plastic | 1.671 | 19.3 | −59.36 |
| 11 | | 4.233 | (ASP) | 0.174 | | | | |
| 12 | Lens 6 | 29.750 | (ASP) | 0.550 | Plastic | 1.544 | 56.0 | 2.91 |
| 13 | | −1.659 | (ASP) | 0.483 | | | | |
| 14 | Lens 7 | −5.714 | (ASP) | 0.350 | Plastic | 1.515 | 56.5 | −2.44 |
| 15 | | 1.640 | (ASP) | 0.400 | | | | |
| 16 | IR-cut filter | Plano | | 0.240 | Glass | 1.517 | 64.2 | — |
| 17 | | Plano | | 0.387 | | | | |
| 18 | Image | Plano | | — | | | | |

Note:
Reference wavelength is 587.6 nm (d-line).
An effective radius of the image-side surface 232 (Surface 7) is 1.1025 mm.

TABLE 4

Aspheric Coefficients

| | Surface # | | | | |
|---|---|---|---|---|---|
| | 2 | 3 | 4 | 5 | 6 |
| k = | −2.2146E−01 | 1.0117E+01 | −1.5926E+00 | −3.5088E+00 | 1.0000E+01 |
| A4 = | 8.0513E−03 | −3.3361E−01 | −3.4588E−01 | −8.8600E−02 | −5.4403E−02 |
| A6 = | −3.1913E−02 | 1.1219E+00 | 1.0997E+00 | 6.1778E−02 | 1.3819E−01 |
| A8 = | 1.7665E−01 | −2.7253E+00 | −2.6625E+00 | 4.9851E−01 | −5.9319E−01 |
| A10 = | −4.8012E−01 | 4.9776E+00 | 5.0569E+00 | −2.5785E+00 | 1.5348E+00 |
| A12 = | 7.9335E−01 | −6.6659E+00 | −7.2300E+00 | 6.1216E+00 | −2.8682E+00 |
| A14 = | −8.1381E−01 | 6.2247E+00 | 7.3109E+00 | −8.5395E+00 | 3.5906E+00 |
| A16 = | 5.0547E−01 | −3.7855E+00 | −4.8218E+00 | 7.1947E+00 | −2.7728E+00 |
| A18 = | −1.7377E−01 | 1.3340E+00 | 1.8368E+00 | −3.4022E+00 | 1.1821E+00 |
| A20 = | 2.5120E−02 | −2.0533E−01 | −3.0324E−01 | 7.0002E−01 | −2.0917E−01 |

| | Surface # | | | | |
|---|---|---|---|---|---|
| | 7 | 8 | 9 | 10 | 11 |
| k = | −4.2050E+01 | −2.1119E+01 | −9.9000E+01 | −8.1555E+00 | −6.7108E+01 |
| A4 = | −5.8970E−02 | −1.0365E−01 | −1.4296E−01 | −2.5317E−01 | −1.6839E−01 |
| A6 = | 1.9198E−01 | 2.7171E−01 | 1.3862E−01 | 3.4182E−01 | 1.0380E−01 |
| A8 = | −5.0356E−01 | −9.7660E−01 | −3.1443E−01 | −6.6305E−01 | −3.3629E−02 |
| A10 = | 1.0119E+00 | 2.5753E+00 | 4.1901E−01 | 9.7382E−01 | −1.0289E−01 |
| A12 = | −1.7227E+00 | −4.7357E+00 | −3.8002E−01 | −1.1028E+00 | 1.7288E−01 |
| A14 = | 2.1760E+00 | 5.6393E+00 | 2.0784E−01 | 8.8789E−01 | −1.2506E−01 |
| A16 = | −1.7727E+00 | −4.1413E+00 | −5.4003E−02 | −4.6608E−01 | 4.7542E−02 |
| A18 = | 8.1428E−01 | 1.6974E+00 | −7.4938E−05 | 1.4332E−01 | −8.9633E−03 |
| A20 = | −1.5815E−01 | −2.9412E−01 | 2.2302E−03 | −1.9681E−02 | 6.3855E−04 |

| | Surface # | | | |
|---|---|---|---|---|
| | 12 | 13 | 14 | 15 |
| k = | 9.0000E+01 | −6.4520E+00 | 1.5281E+00 | −4.3404E+00 |
| A4 = | −8.1955E−02 | −3.6497E−02 | −1.4851E−01 | −1.8317E−01 |
| A6 = | −1.7314E−02 | −2.1841E−02 | −2.4280E−02 | 1.2511E−01 |
| A8 = | 6.5769E−02 | 5.1135E−02 | 1.2928E−01 | −6.2675E−02 |
| A10 = | −2.9392E−02 | −2.8217E−02 | −1.1877E−01 | 2.1937E−02 |
| A12 = | −6.2853E−02 | −8.8019E−05 | 5.8287E−02 | −5.3385E−03 |
| A14 = | 9.8864E−02 | 7.2040E−03 | −1.6552E−02 | 8.7468E−04 |
| A16 = | −6.1951E−02 | −3.2924E−03 | 2.7172E−03 | −9.1096E−05 |
| A18 = | 1.8513E−02 | 6.1017E−04 | −2.3996E−04 | 5.3626E−06 |
| A20 = | −2.1472E−03 | −4.1994E−05 | 8.4452E−06 | −1.3260E−07 |

In the 2nd embodiment, the equation of the aspheric surface profiles of the aforementioned lens elements is the same as the equation of the 1st embodiment. Also, the definitions of these parameters shown in the following table are the same as those stated in the 1st embodiment with corresponding values for the 2nd embodiment, so an explanation in this regard will not be provided again.

Moreover, these parameters can be calculated from Table 3 and Table 4 as the following values and satisfy the following conditions:

| 2nd Embodiment | | | |
|---|---|---|---|
| f [mm] | 4.18 | T67/T12 | 13.80 |
| Fno | 1.75 | T67/T23 | 1.55 |
| HFOV [deg.] | 37.2 | T67/T34 | 4.51 |
| Nmax | 1.671 | T67/T45 | 2.01 |
| V2 + V3 + V4 | 94.6 | T67/T56 | 2.78 |
| V40 | 3 | Td/ΣCT | 1.48 |
| V30 | 3 | TL/ImgH | 1.60 |
| V20 | 3 | f1/|f2| | 0.07 |
| R2/CT1 | 9.04 | |(f1/ImgH) × (TL/f2)| | 0.11 |
| f/R8 | 0.31 | f × (|f1| × |f2|)/(|f1| × |f2|) | 0.90 |
| f/R10 | 0.99 | |f/f6| + |f/f7| | 3.15 |
| (f/R8) + (f/R10) | 1.30 | — | — |

3rd Embodiment

Figure 5:
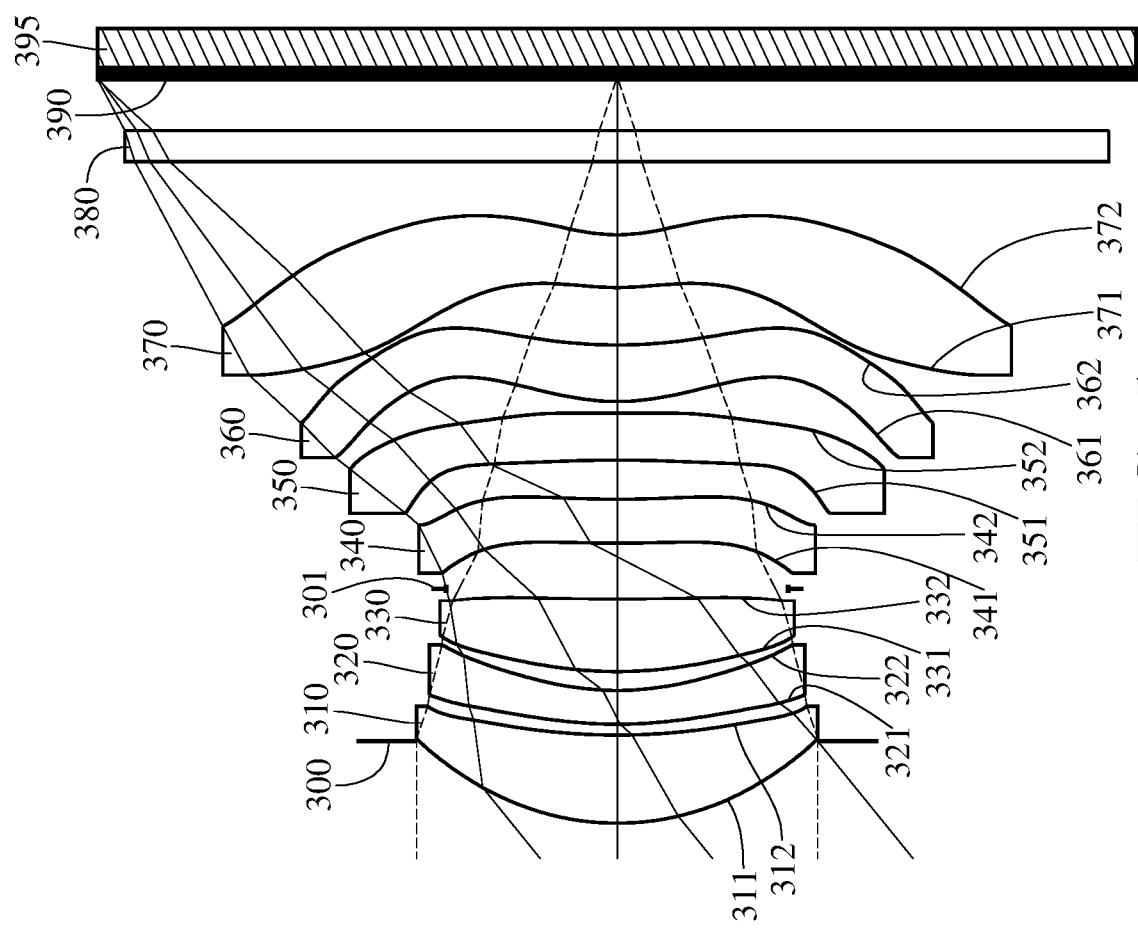
FIG. 5 is a schematic view of an image capturing unit according to the 3rd embodiment of the present disclosure.
Figure 6:
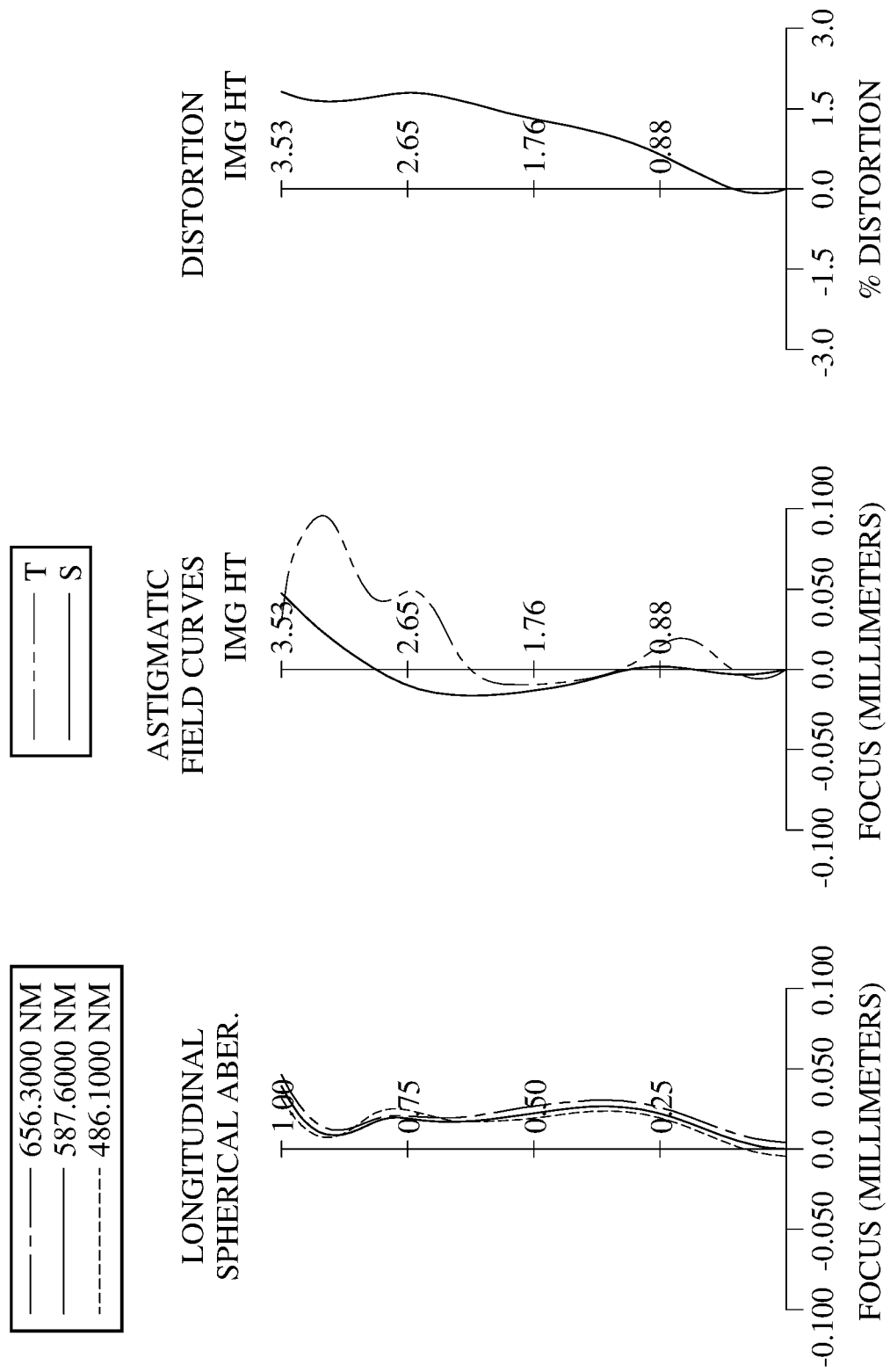
FIG. 6 shows spherical aberration curves, astigmatic field curves and a distortion curve of the image capturing unit according to the 3rd embodiment.

FIG. 5 is a schematic view of an image capturing unit according to the 3rd embodiment of the present disclosure. FIG. 6 shows, in order from left to right, spherical aberration curves, astigmatic field curves and a distortion curve of the image capturing unit according to the 3rd embodiment. In FIG. 5, the image capturing unit includes the imaging lens assembly (its reference numeral is omitted) of the present disclosure and an image sensor 395. The imaging lens assembly includes, in order from an object side to an image side, an aperture stop 300, a first lens element 310, a second lens element 320, a third lens element 330, a stop 301, a fourth lens element 340, a fifth lens element 350, a sixth lens element 360, a seventh lens element 370, an IR-cut filter 380 and an image surface 390. The imaging lens assembly includes seven lens elements (310, 320, 330, 340, 350, 360 and 370) with no additional lens element disposed between each of the adjacent seven lens elements.

The first lens element 310 with positive refractive power has an object-side surface 311 being convex in a paraxial region thereof and an image-side surface 312 being concave in a paraxial region thereof. The first lens element 310 is made of plastic material and has the object-side surface 311 and the image-side surface 312 being both aspheric.

The second lens element 320 with negative refractive power has an object-side surface 321 being convex in a paraxial region thereof and an image-side surface 322 being concave in a paraxial region thereof. The second lens element 320 is made of plastic material and has the object-side surface 321 and the image-side surface 322 being both aspheric.

The third lens element 330 with positive refractive power has an object-side surface 331 being convex in a paraxial region thereof and an image-side surface 332 being concave in a paraxial region thereof. The third lens element 330 is made of plastic material and has the object-side surface 331 and the image-side surface 332 being both aspheric.

The fourth lens element 340 with negative refractive power has an object-side surface 341 being convex in a paraxial region thereof and an image-side surface 342 being concave in a paraxial region thereof. The fourth lens element 340 is made of plastic material and has the object-side surface 341 and the image-side surface 342 being both aspheric. The image-side surface 342 of the fourth lens element 340 has at least one inflection point.

The fifth lens element 350 with negative refractive power has an object-side surface 351 being concave in a paraxial region thereof and an image-side surface 352 being concave in a paraxial region thereof. The fifth lens element 350 is made of plastic material and has the object-side surface 351 and the image-side surface 352 being both aspheric. The image-side surface 352 of the fifth lens element 350 has at least one inflection point.

The sixth lens element 360 with positive refractive power has an object-side surface 361 being convex in a paraxial region thereof and an image-side surface 362 being concave in a paraxial region thereof. The sixth lens element 360 is made of plastic material and has the object-side surface 361 and the image-side surface 362 being both aspheric.

The seventh lens element 370 with negative refractive power has an object-side surface 371 being convex in a paraxial region thereof and an image-side surface 372 being concave in a paraxial region thereof. The seventh lens element 370 is made of plastic material and has the object-side surface 371 and the image-side surface 372 being both aspheric. The image-side surface 372 of the seventh lens element 370 has at least one convex shape in an off-axis region thereof.

The IR-cut filter 380 is made of glass material and located between the seventh lens element 370 and the image surface 390, and will not affect the focal length of the imaging lens assembly. The image sensor 395 is disposed on or near the image surface 390 of the imaging lens assembly.

The detailed optical data of the 3rd embodiment are shown in Table 5 and the aspheric surface data are shown in Table 6 below.

TABLE 5

3rd Embodiment
f = 4.26 mm, Fno = 1.56, HFOV = 39.0 deg.

| Surface # | | Curvature Radius | | Thickness | Material | Index | Abbe # | Focal Length |
|---|---|---|---|---|---|---|---|---|
| 0 | Object | Plano | | Infinity | | | | |
| 1 | Ape. Stop | Plano | | −0.560 | | | | |
| 2 | Lens 1 | 1.827 | (ASP) | 0.601 | Plastic | 1.545 | 56.0 | 5.43 |
| 3 | | 4.222 | (ASP) | 0.074 | | | | |
| 4 | Lens 2 | 2.847 | (ASP) | 0.230 | Plastic | 1.669 | 19.5 | −8.52 |
| 5 | | 1.837 | (ASP) | 0.129 | | | | |
| 6 | Lens 3 | 2.699 | (ASP) | 0.496 | Plastic | 1.544 | 56.0 | 6.63 |
| 7 | | 10.046 | (ASP) | 0.073 | | | | |
| 8 | Stop | Plano | | 0.311 | | | | |
| 9 | Lens 4 | 7.680 | (ASP) | 0.300 | Plastic | 1.669 | 19.5 | −60.62 |
| 10 | | 6.356 | (ASP) | 0.267 | | | | |
| 11 | Lens 5 | −8.695 | (ASP) | 0.320 | Plastic | 1.584 | 28.2 | −9.17 |
| 12 | | 14.161 | (ASP) | 0.080 | | | | |
| 13 | Lens 6 | 1.524 | (ASP) | 0.386 | Plastic | 1.544 | 56.0 | 4.77 |
| 14 | | 3.365 | (ASP) | 0.391 | | | | |
| 15 | Lens 7 | 1.955 | (ASP) | 0.360 | Plastic | 1.544 | 56.0 | −5.61 |

TABLE 5-continued

3rd Embodiment
f = 4.26 mm, Fno = 1.56, HFOV = 39.0 deg.

| Surface # | | Curvature Radius | Thickness | Material | Index | Abbe # | Focal Length |
|---|---|---|---|---|---|---|---|
| 16 | | 1.114 (ASP) | 0.500 | | | | |
| 17 | IR-cut filter | Plano | 0.210 | Glass | 1.517 | 64.2 | — |
| 18 | | Plano | 0.348 | | | | |
| 19 | Image | Plano | — | | | | |

Note:
Reference wavelength is 587.6 nm (d-line).
An effective radius of the stop 301 (Surface 8) is 1.165 mm.

TABLE 6

Aspheric Coefficients

| | Surface # | | | | |
|---|---|---|---|---|---|
| | 2 | 3 | 4 | 5 | 6 |
| k = | −3.6282E−01 | 7.2016E+00 | −2.6901E+01 | −1.2244E+01 | −6.7139E+00 |
| A4 = | 1.8523E−03 | −7.1460E−02 | −3.0430E−02 | 4.5343E−02 | −4.2813E−02 |
| A6 = | 9.5536E−03 | 2.0869E−01 | 2.5882E−01 | 1.0957E−01 | 1.1711E−01 |
| A8 = | −1.1684E−02 | −3.4574E−01 | −5.0574E−01 | −2.7002E−01 | −1.1073E−01 |
| A10 = | 1.0548E−02 | 2.4656E−01 | 4.0948E−01 | 1.8775E−01 | −1.4079E−02 |
| A12 = | −8.2327E−03 | −8.0763E−02 | −1.4193E−01 | −2.0570E−02 | 6.3828E−02 |
| A14 = | 2.4391E−03 | 1.0871E−02 | 1.6890E−02 | −1.2024E−02 | −1.8691E−02 |

| | Surface # | | | | |
|---|---|---|---|---|---|
| | 7 | 9 | 10 | 11 | 12 |
| k = | 5.3829E+01 | 4.4375E+00 | 1.2079E+01 | −6.3617E+01 | −1.1257E+01 |
| A4 = | −7.3634E−02 | −1.6920E−01 | −1.1781E−01 | 2.7072E−02 | −2.6639E−01 |
| A6 = | 1.0381E−01 | 2.9023E−01 | 1.1875E−01 | −4.9290E−02 | 2.4863E−01 |
| A8 = | −2.4237E−01 | −9.8817E−01 | −3.2556E−01 | 1.8057E−01 | −6.5618E−02 |
| A10 = | 2.9142E−01 | 1.6946E+00 | 3.8951E−01 | −2.8685E−01 | −3.1413E−02 |
| A12 = | −1.8529E−01 | −1.6191E+00 | −2.6623E−01 | 2.0525E−01 | 2.2549E−02 |
| A14 = | 4.8942E−02 | 8.0755E−01 | 9.7703E−02 | −7.6868E−02 | −4.7349E−03 |
| A16 = | — | −1.6233E−01 | −1.3868E−02 | 1.1903E−02 | 3.2785E−04 |

| | Surface # | | | |
|---|---|---|---|---|
| | 13 | 14 | 15 | 16 |
| k = | −2.0790E+00 | −8.9975E+01 | −1.8353E+01 | −6.8800E+00 |
| A4 = | −2.1972E−01 | 1.7242E−01 | −4.6886E−01 | −2.6823E−01 |
| A6 = | 2.9562E−01 | −1.8627E−01 | 4.5021E−01 | 2.3564E−01 |
| A8 = | −4.7224E−01 | 2.0773E−02 | −3.1351E−01 | −1.5292E−01 |
| A10 = | 4.6860E−01 | 7.2428E−02 | 1.4933E−01 | 6.6619E−02 |
| A12 = | −2.9873E−01 | −6.4785E−02 | −4.5357E−02 | −1.8616E−02 |
| A14 = | 1.2172E−01 | 2.7175E−02 | 8.5998E−03 | 3.2704E−03 |
| A16 = | −3.0263E−02 | −6.1859E−03 | −9.8655E−04 | −3.4886E−04 |
| A18 = | 4.1479E−03 | 7.2902E−04 | 6.2743E−05 | 2.0651E−05 |
| A20 = | −2.3889E−04 | −3.4760E−05 | −1.7005E−06 | −5.2057E−07 |

In the 3rd embodiment, the equation of the aspheric surface profiles of the aforementioned lens elements is the same as the equation of the 1st embodiment. Also, the definitions of these parameters shown in the following table are the same as those stated in the 1st embodiment with corresponding values for the 3rd embodiment, so an explanation in this regard will not be provided again.

Moreover, these parameters can be calculated from Table 5 and Table 6 as the following values and satisfy the following conditions:

| 3rd Embodiment | | | |
|---|---|---|---|
| f [mm] | 4.26 | T67/T12 | 5.28 |
| Fno | 1.56 | T67/T23 | 3.03 |
| HFOV [deg.] | 39.0 | T67/T34 | 1.02 |
| Nmax | 1.669 | T67/T45 | 1.46 |
| V2 + V3 + V4 | 94.9 | T67/T56 | 4.89 |
| V40 | 3 | Td/ΣCT | 1.49 |
| V30 | 3 | TL/ImgH | 1.44 |
| V20 | 2 | f1/|f2| | 0.64 |
| R2/CT1 | 7.02 | |(f1/ImgH) × (TL/f2)| | 0.92 |
| f/R8 | 0.67 | f × (|f1| + |f2|)/(|f| × |f2|) | 1.28 |
| f/R10 | 0.30 | |f/f6| + |f/f7| | 1.65 |
| (f/R8) + (f/R10) | 0.97 | — | — |

4th Embodiment

Figure 7:
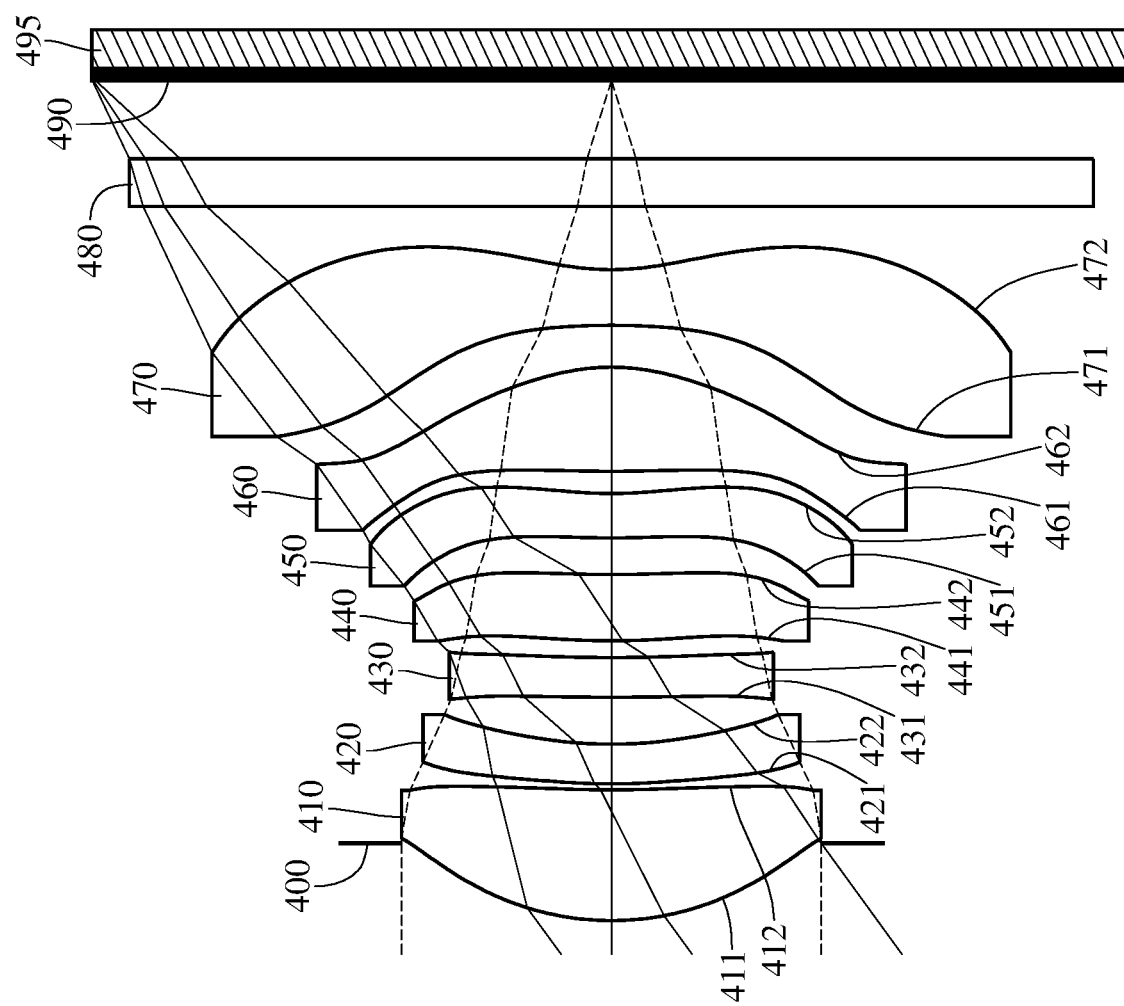
FIG. 7 is a schematic view of an image capturing unit according to the 4th embodiment of the present disclosure.
Figure 8:
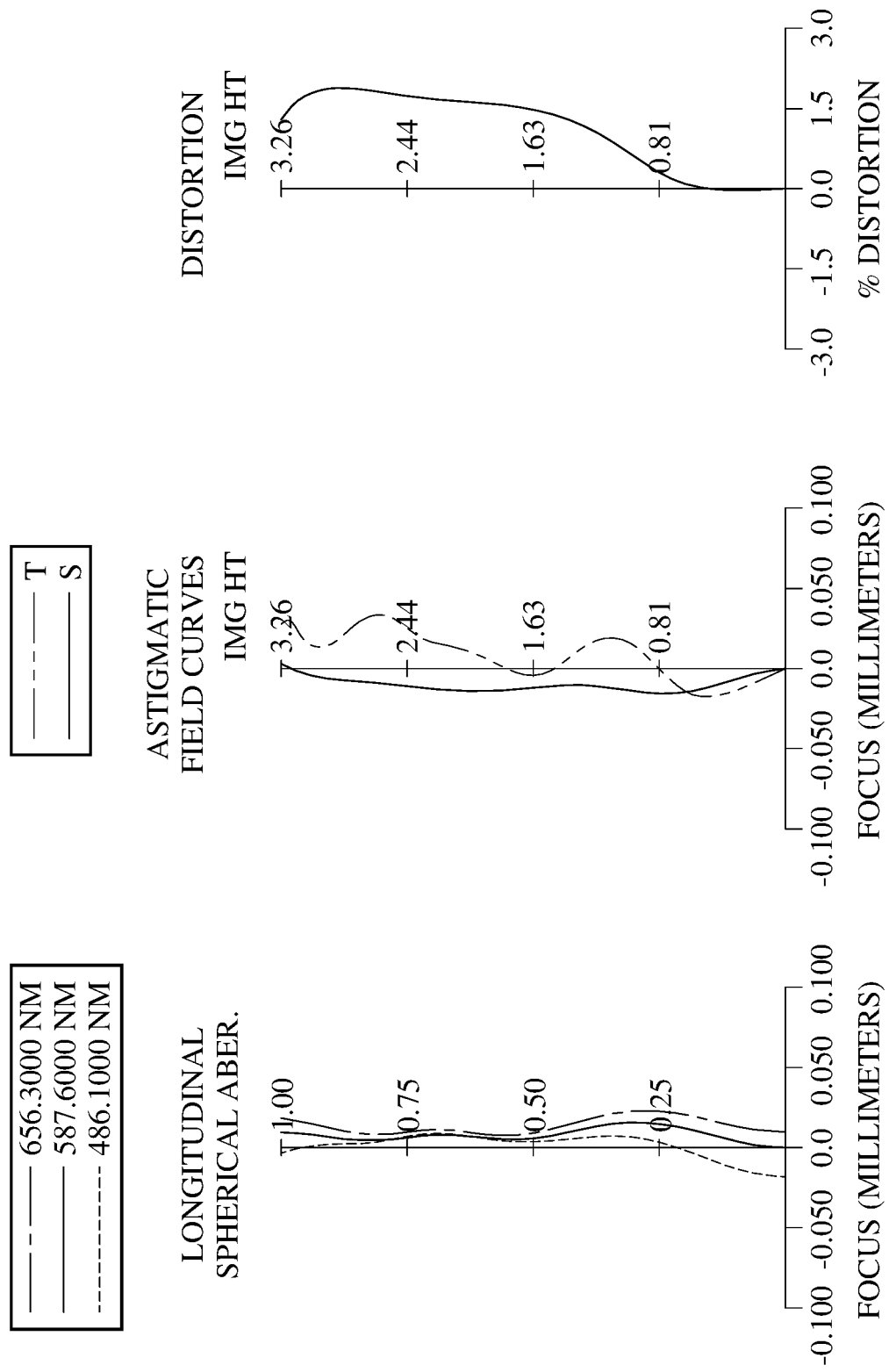
FIG. 8 shows spherical aberration curves, astigmatic field curves and a distortion curve of the image capturing unit according to the 4th embodiment.

FIG. 7 is a schematic view of an image capturing unit according to the 4th embodiment of the present disclosure. FIG. 8 shows, in order from left to right, spherical aberration curves, astigmatic field curves and a distortion curve of the image capturing unit according to the 4th embodiment. In FIG. 7, the image capturing unit includes the imaging lens assembly (its reference numeral is omitted) of the present disclosure and an image sensor 495. The imaging lens assembly includes, in order from an object side to an image side, an aperture stop 400, a first lens element 410, a second lens element 420, a third lens element 430, a fourth lens element 440, a fifth lens element 450, a sixth lens element 460, a seventh lens element 470, an IR-cut filter 480 and an image surface 490. The imaging lens assembly includes seven lens elements (410, 420, 430, 440, 450, 460 and 470) with no additional lens element disposed between each of the adjacent seven lens elements.

The first lens element 410 with positive refractive power has an object-side surface 411 being convex in a paraxial region thereof and an image-side surface 412 being concave in a paraxial region thereof. The first lens element 410 is made of plastic material and has the object-side surface 411 and the image-side surface 412 being both aspheric.

The second lens element 420 with negative refractive power has an object-side surface 421 being convex in a paraxial region thereof and an image-side surface 422 being concave in a paraxial region thereof. The second lens element 420 is made of plastic material and has the object-side surface 421 and the image-side surface 422 being both aspheric.

The third lens element 430 with negative refractive power has an object-side surface 431 being convex in a paraxial region thereof and an image-side surface 432 being concave in a paraxial region thereof. The third lens element 430 is made of plastic material and has the object-side surface 431 and the image-side surface 432 being both aspheric.

The fourth lens element 440 with positive refractive power has an object-side surface 441 being convex in a paraxial region thereof and an image-side surface 442 being concave in a paraxial region thereof. The fourth lens element 440 is made of plastic material and has the object-side surface 441 and the image-side surface 442 being both aspheric. The image-side surface 442 of the fourth lens element 440 has at least one inflection point.

The fifth lens element 450 with negative refractive power has an object-side surface 451 being convex in a paraxial region thereof and an image-side surface 452 being concave in a paraxial region thereof. The fifth lens element 450 is made of plastic material and has the object-side surface 451 and the image-side surface 452 being both aspheric. The image-side surface 452 of the fifth lens element 450 has at least one inflection point.

The sixth lens element 460 with positive refractive power has an object-side surface 461 being convex in a paraxial region thereof and an image-side surface 462 being convex in a paraxial region thereof. The sixth lens element 460 is made of plastic material and has the object-side surface 461 and the image-side surface 462 being both aspheric.

The seventh lens element 470 with negative refractive power has an object-side surface 471 being concave in a paraxial region thereof and an image-side surface 472 being concave in a paraxial region thereof. The seventh lens element 470 is made of plastic material and has the object-side surface 471 and the image-side surface 472 being both aspheric. The image-side surface 472 of the seventh lens element 470 has at least one convex shape in an off-axis region thereof.

The IR-cut filter 480 is made of glass material and located between the seventh lens element 470 and the image surface 490, and will not affect the focal length of the imaging lens assembly. The image sensor 495 is disposed on or near the image surface 490 of the imaging lens assembly.

The detailed optical data of the 4th embodiment are shown in Table 7 and the aspheric surface data are shown in Table 8 below.

TABLE 7

4th Embodiment
f = 4.43 mm, Fno = 1.68, HFOV = 36.0 deg.

| Surface # | | Curvature Radius | | Thickness | Material | Index | Abbe # | Focal Length |
|---|---|---|---|---|---|---|---|---|
| 0 | Object | Plano | | Infinity | | | | |
| 1 | Ape. Stop | Plano | | −0.487 | | | | |
| 2 | Lens 1 | 1.768 | (ASP) | 0.824 | Plastic | 1.545 | 56.0 | 4.16 |
| 3 | | 6.699 | (ASP) | 0.038 | | | | |
| 4 | Lens 2 | 3.830 | (ASP) | 0.250 | Plastic | 1.671 | 19.3 | −16.06 |
| 5 | | 2.751 | (ASP) | 0.296 | | | | |
| 6 | Lens 3 | 21.908 | (ASP) | 0.250 | Plastic | 1.671 | 19.3 | −26.73 |
| 7 | | 9.816 | (ASP) | 0.106 | | | | |
| 8 | Lens 4 | 4.508 | (ASP) | 0.417 | Plastic | 1.544 | 56.0 | 21.71 |
| 9 | | 7.053 | (ASP) | 0.231 | | | | |
| 10 | Lens 5 | 5.398 | (ASP) | 0.280 | Plastic | 1.671 | 19.3 | −7.29 |
| 11 | | 2.512 | (ASP) | 0.140 | | | | |
| 12 | Lens 6 | 9.560 | (ASP) | 0.656 | Plastic | 1.566 | 37.4 | 2.08 |
| 13 | | −1.313 | (ASP) | 0.264 | | | | |
| 14 | Lens 7 | −5.062 | (ASP) | 0.350 | Plastic | 1.534 | 55.9 | −2.15 |
| 15 | | 1.518 | (ASP) | 0.400 | | | | |
| 16 | IR-cut filter | Plano | | 0.300 | Glass | 1.517 | 64.2 | — |
| 17 | | Plano | | 0.490 | | | | |
| 18 | Image | Plano | | — | | | | |

Note:
Reference wavelength is 587.6 nm (d-line).
An effective radius of the image-side surface 432 (Surface 7) is 1.020 mm.

TABLE 8

Aspheric Coefficients

| Surface # | | | | | |
|---|---|---|---|---|---|
| | 2 | 3 | 4 | 5 | 6 |
| k = | −3.8719E−01 | 1.9898E+01 | 1.3726E−01 | −4.6638E−01 | −5.0000E+01 |
| A4 = | 3.6811E−03 | −1.3835E−01 | −1.4276E−01 | −2.4827E−02 | 1.0671E−02 |
| A6 = | 5.2908E−03 | 1.5839E−01 | 1.3585E−01 | −5.4518E−02 | −4.4205E−02 |
| A8 = | −1.1054E−03 | −1.3589E−01 | −5.4856E−02 | 1.4495E−01 | −1.1498E−01 |
| A10 = | −8.2032E−03 | 7.6065E−02 | 7.3422E−03 | −1.4692E−01 | 3.6024E−01 |
| A12 = | 7.5217E−03 | −2.8576E−02 | 6.8379E−03 | 6.1780E−02 | −5.3363E−01 |
| A14 = | −2.7615E−03 | 4.3495E−03 | −2.2532E−03 | — | 3.9783E−01 |
| A16 = | — | — | — | — | −1.0850E−01 |

| Surface # | | | | | |
|---|---|---|---|---|---|
| | 7 | 8 | 9 | 10 | 11 |
| k = | −9.0000E+01 | −2.5743E+01 | 2.7395E+01 | 2.5969E+00 | −2.2336E+01 |
| A4 = | −7.3701E−03 | −8.0783E−02 | −1.3576E−01 | −3.0139E−01 | −2.1484E−01 |
| A6 = | −5.1361E−02 | 5.1805E−02 | 1.1761E−01 | 2.6963E−01 | 1.8640E−01 |
| A8 = | 1.4938E−01 | −1.7962E−01 | −2.2085E−01 | 2.9033E−02 | −2.2192E−02 |
| A10 = | −3.3646E−01 | 2.8590E−01 | 1.0141E−01 | −6.2403E−01 | −1.9879E−01 |
| A12 = | 4.3669E−01 | −2.2934E−01 | 6.5838E−02 | 7.4210E−01 | 1.9217E−01 |
| A14 = | −2.8185E−01 | 7.4728E−02 | −8.1360E−02 | −3.5359E−01 | −6.9868E−02 |
| A16 = | 7.9472E−02 | — | 2.2782E−02 | 6.1513E−02 | 9.0328E−03 |

| Surface # | | | | |
|---|---|---|---|---|
| | 12 | 13 | 14 | 15 |
| k = | −6.6488E+00 | −6.2515E+00 | 1.9778E+00 | −1.0544E+01 |
| A4 = | −7.8695E−02 | −7.1522E−02 | −9.2927E−02 | −8.4773E−02 |
| A6 = | −9.6190E−02 | 8.0377E−02 | 1.7214E−03 | 2.5220E−02 |
| A8 = | 3.4799E−01 | −1.2542E−01 | −2.8599E−03 | −2.6664E−03 |
| A10 = | −5.3635E−01 | 1.1221E−01 | 1.5391E−02 | −2.0361E−03 |
| A12 = | 4.5255E−01 | −5.7559E−02 | −7.6393E−03 | 1.2195E−03 |
| A14 = | −2.3778E−01 | 1.9204E−02 | 1.5659E−03 | −3.3257E−04 |
| A16 = | 7.9851E−02 | −4.1884E−03 | −1.4288E−04 | 5.1302E−05 |
| A18 = | −1.5622E−02 | 5.3223E−04 | 3.9784E−06 | −4.2858E−06 |
| A20 = | 1.3272E−03 | −2.9276E−05 | 7.5321E−08 | 1.4956E−07 |

In the 4th embodiment, the equation of the aspheric surface profiles of the aforementioned lens elements is the same as the equation of the 1st embodiment. Also, the definitions of these parameters shown in the following table are the same as those stated in the 1st embodiment with corresponding values for the 4th embodiment, so an explanation in this regard will not be provided again.

Moreover, these parameters can be calculated from Table 7 and Table 8 as the following values and satisfy the following conditions:

| 4th Embodiment | | | |
|---|---|---|---|
| f [mm] | 4.43 | T67/T12 | 6.95 |
| Fno | 1.68 | T67/T23 | 0.89 |
| HFOV [deg.] | 36.0 | T67/T34 | 2.49 |
| Nmax | 1.671 | T67/T45 | 1.14 |
| V2 + V3 + V4 | 94.6 | T67/T56 | 1.89 |
| V40 | 4 | Td/ΣCT | 1.36 |
| V30 | 3 | TL/ImgH | 1.62 |
| V20 | 3 | f1/\|f2\| | 0.26 |
| R2/CT1 | 8.13 | \|(f1/ImgH) × (TL/f2)\| | 0.42 |
| f/R8 | 0.63 | f × (\|f1\| + \|f2\|)/(\|f\| × \|f2\|) | 1.34 |
| f/R10 | 1.76 | \|f/f6\| + \|f/f7\| | 4.18 |
| (f/R8) + (f/R10) | 2.39 | — | — |

5th Embodiment

Figure 9:
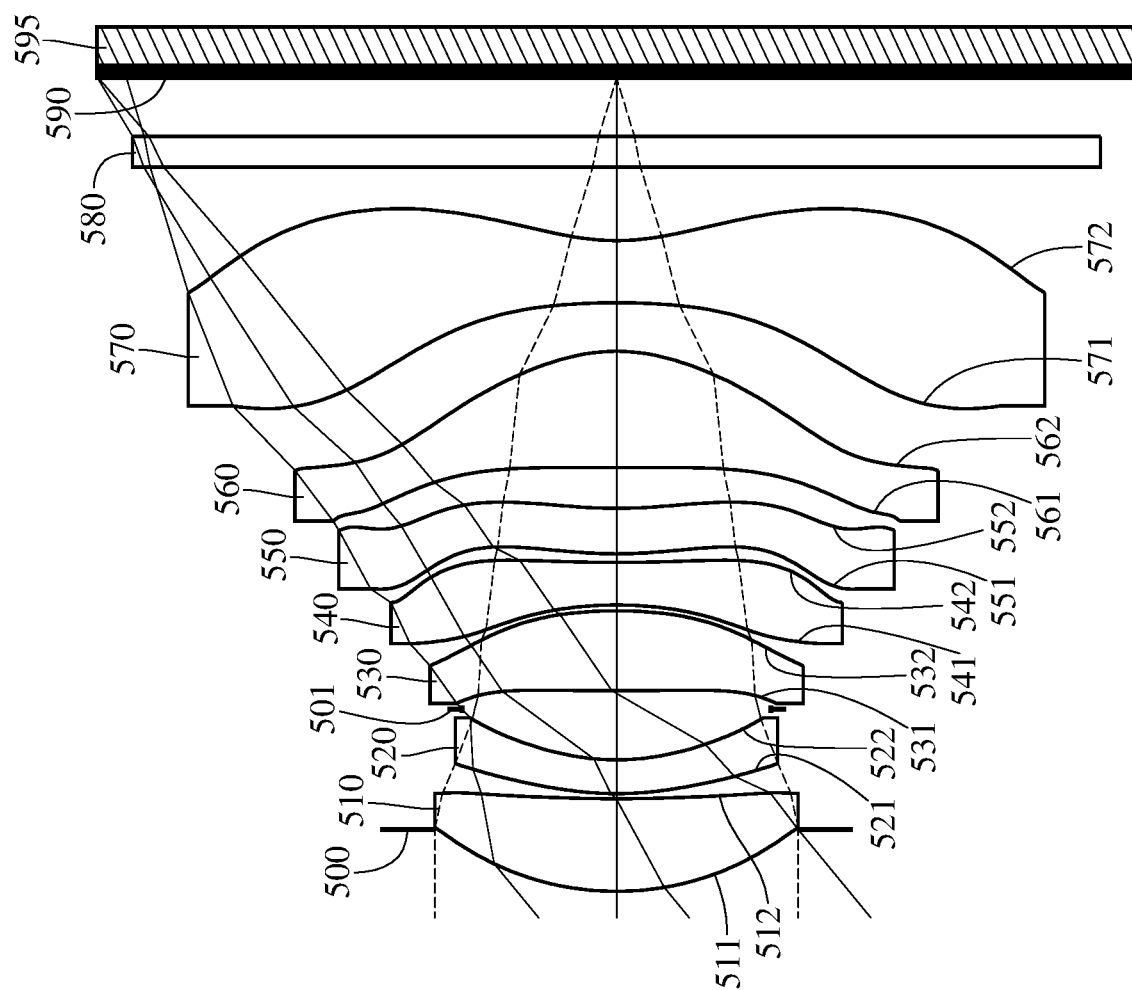
FIG. 9 is a schematic view of an image capturing unit according to the 5th embodiment of the present disclosure.
Figure 10:
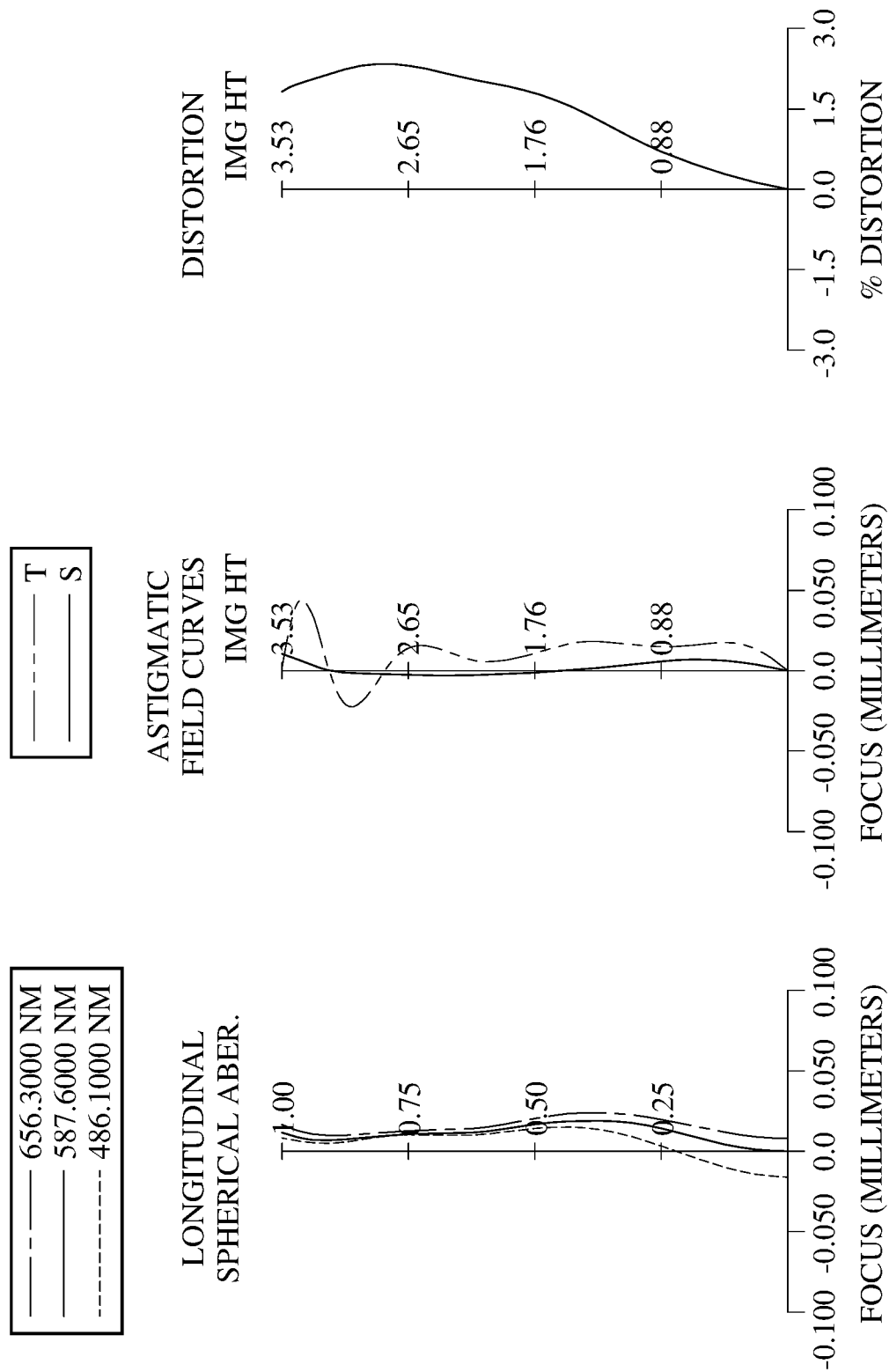
FIG. 10 shows spherical aberration curves, astigmatic field curves and a distortion curve of the image capturing unit according to the 5th embodiment.

FIG. 9 is a schematic view of an image capturing unit according to the 5th embodiment of the present disclosure. FIG. 10 shows, in order from left to right, spherical aberration curves, astigmatic field curves and a distortion curve of the image capturing unit according to the 5th embodiment. In FIG. 9, the image capturing unit includes the imaging lens assembly (its reference numeral is omitted) of the present disclosure and an image sensor 595. The imaging lens assembly includes, in order from an object side to an image side, an aperture stop 500, a first lens element 510, a second lens element 520, a stop 501, a third lens element 530, a fourth lens element 540, a fifth lens element 550, a sixth lens element 560, a seventh lens element 570, an IR-cut filter 580 and an image surface 590. The imaging lens assembly includes seven lens elements (510, 520, 530, 540, 550, 560 and 570) with no additional lens element disposed between each of the adjacent seven lens elements.

The first lens element 510 with positive refractive power has an object-side surface 511 being convex in a paraxial region thereof and an image-side surface 512 being concave in a paraxial region thereof. The first lens element 510 is made of plastic material and has the object-side surface 511 and the image-side surface 512 being both aspheric.

The second lens element 520 with negative refractive power has an object-side surface 521 being convex in a paraxial region thereof and an image-side surface 522 being concave in a paraxial region thereof. The second lens element 520 is made of plastic material and has the object-side surface 521 and the image-side surface 522 being both aspheric.

The third lens element 530 with positive refractive power has an object-side surface 531 being convex in a paraxial region thereof and an image-side surface 532 being convex in a paraxial region thereof. The third lens element 530 is made of plastic material and has the object-side surface 531 and the image-side surface 532 being both aspheric.

The fourth lens element 540 with negative refractive power has an object-side surface 541 being concave in a paraxial region thereof and an image-side surface 542 being concave in a paraxial region thereof. The fourth lens element 540 is made of plastic material and has the object-side surface 541 and the image-side surface 542 being both aspheric. The image-side surface 542 of the fourth lens element 540 has at least one inflection point.

The fifth lens element 550 with positive refractive power has an object-side surface 551 being convex in a paraxial region thereof and an image-side surface 552 being concave in a paraxial region thereof. The fifth lens element 550 is made of plastic material and has the object-side surface 551 and the image-side surface 552 being both aspheric. The image-side surface 552 of the fifth lens element 550 has at least one inflection point.

The sixth lens element 560 with positive refractive power has an object-side surface 561 being convex in a paraxial region thereof and an image-side surface 562 being convex in a paraxial region thereof. The sixth lens element 560 is made of plastic material and has the object-side surface 561 and the image-side surface 562 being both aspheric.

The seventh lens element 570 with negative refractive power has an object-side surface 571 being concave in a paraxial region thereof and an image-side surface 572 being concave in a paraxial region thereof. The seventh lens element 570 is made of plastic material and has the object-side surface 571 and the image-side surface 572 being both aspheric. The image-side surface 572 of the seventh lens element 570 has at least one convex shape in an off-axis region thereof.

The IR-cut filter 580 is made of glass material and located between the seventh lens element 570 and the image surface 590, and will not affect the focal length of the imaging lens assembly. The image sensor 595 is disposed on or near the image surface 590 of the imaging lens assembly.

The detailed optical data of the 5th embodiment are shown in Table 9 and the aspheric surface data are shown in Table 10 below.

TABLE 9

5th Embodiment
f = 4.20 mm, Fno = 1.70, HFOV = 39.5 deg.

| Surface # | | Curvature Radius | | Thickness | Material | Index | Abbe # | Focal Length |
|---|---|---|---|---|---|---|---|---|
| 0 | Object | Plano | | Infinity | | | | |
| 1 | Ape. Stop | Plano | | −0.420 | | | | |
| 2 | Lens 1 | 1.973 | (ASP) | 0.630 | Plastic | 1.545 | 56.0 | 4.51 |
| 3 | | 8.922 | (ASP) | 0.035 | | | | |
| 4 | Lens 2 | 2.177 | (ASP) | 0.230 | Plastic | 1.660 | 20.4 | −11.36 |
| 5 | | 1.616 | (ASP) | 0.345 | | | | |
| 6 | Stop | Plano | | 0.125 | | | | |
| 7 | Lens 3 | 17.865 | (ASP) | 0.544 | Plastic | 1.544 | 56.0 | 4.83 |
| 8 | | −3.049 | (ASP) | 0.040 | | | | |
| 9 | Lens 4 | −2.539 | (ASP) | 0.290 | Plastic | 1.543 | 33.8 | −3.85 |
| 10 | | 12.317 | (ASP) | 0.058 | | | | |
| 11 | Lens 5 | 2.922 | (ASP) | 0.310 | Plastic | 1.660 | 20.4 | 37.50 |
| 12 | | 3.173 | (ASP) | 0.277 | | | | |
| 13 | Lens 6 | 67.336 | (ASP) | 0.792 | Plastic | 1.544 | 56.0 | 2.18 |
| 14 | | −1.202 | (ASP) | 0.330 | | | | |
| 15 | Lens 7 | −4.981 | (ASP) | 0.423 | Plastic | 1.534 | 55.9 | −2.11 |
| 16 | | 1.495 | (ASP) | 0.500 | | | | |
| 17 | IR-cut filter | Plano | | 0.210 | Glass | 1.517 | 64.2 | — |
| 18 | | Plano | | 0.397 | | | | |
| 19 | Image | Plano | | — | | | | |

Note:
Reference wavelength is 587.6 nm (d-line).
An effective radius of the stop 501 (Surface 6) is 1.050 mm.

TABLE 10

Aspheric Coefficients

| | Surface # | | | | |
|---|---|---|---|---|---|
| | 2 | 3 | 4 | 5 | 7 |
| k = | −6.0608E−02 | 8.1062E+00 | 4.9832E−02 | −3.9588E−02 | 6.6347E+01 |
| A4 = | 1.0307E−02 | −9.2112E−02 | −1.6642E−01 | −9.6538E−02 | −4.6790E−02 |
| A6 = | −2.0252E−02 | 2.2578E−01 | 2.4110E−01 | 4.4529E−02 | 4.5990E−03 |
| A8 = | 5.3692E−02 | −3.1289E−01 | −3.0202E−01 | 1.5866E−03 | −4.9254E−02 |
| A10 = | −7.0748E−02 | 2.4831E−01 | 2.5504E−01 | −1.4148E−02 | −8.5128E−03 |
| A12 = | 4.5714E−02 | −1.0719E−01 | −1.2233E−01 | 8.1647E−03 | 1.9225E−02 |
| A14 = | −1.2055E−02 | 1.7927E−02 | 2.4104E−02 | — | — |

TABLE 10-continued

| Aspheric Coefficients | | | | | |
|---|---|---|---|---|---|
| Surface # | | | | | |
| | 8 | 9 | 10 | 11 | 12 |
| k = | −3.2500E+00 | −1.2928E+00 | 6.1771E+01 | −3.2451E+01 | −3.0034E+01 |
| A4 = | −9.1551E−02 | 2.4613E−02 | 7.4971E−03 | −5.5258E−02 | −8.5705E−02 |
| A6 = | −1.2422E−01 | −2.8917E−01 | −9.4320E−02 | −5.0047E−02 | 3.9429E−03 |
| A8 = | 2.6944E−01 | 4.5242E−01 | 5.9025E−02 | 1.0078E−01 | 3.1757E−02 |
| A10 = | −2.1428E−01 | −2.4617E−01 | −2.8511E−02 | −1.5425E−01 | −5.3740E−02 |
| A12 = | 9.2057E−02 | 5.0594E−02 | 6.2064E−03 | 9.8776E−02 | 3.3115E−02 |
| A14 = | −1.6837E−02 | −2.0489E−03 | −8.6487E−04 | −2.6524E−02 | −8.2929E−03 |
| A16 = | — | — | 3.0736E−04 | 2.5454E−03 | 7.2937E−04 |
| Surface # | | | | | |
| | | 13 | 14 | 15 | 16 |
| k = | | −1.7456E+01 | −5.1694E+00 | −1.1787E+00 | −8.2631E+00 |
| A4 = | | −4.6015E−02 | −1.1487E−01 | −4.4215E−02 | −6.0343E−02 |
| A6 = | | 1.4084E−02 | 1.2657E−01 | −1.1354E−02 | 2.1483E−02 |
| A8 = | | −4.5809E−02 | −1.2121E−01 | 1.1220E−02 | −6.5713E−03 |
| A10 = | | 4.7447E−02 | 6.8347E−02 | −2.4360E−03 | 1.3643E−03 |
| A12 = | | −2.2542E−02 | −1.9847E−02 | 2.2533E−04 | −1.7331E−04 |
| A14 = | | 5.2040E−03 | 2.8344E−03 | −7.8277E−06 | 1.1813E−05 |
| A16 = | | −4.6557E−04 | −1.5903E−04 | — | −3.2376E−07 |

In the 5th embodiment, the equation of the aspheric surface profiles of the aforementioned lens elements is the same as the equation of the 1st embodiment. Also, the definitions of these parameters shown in the following table are the same as those stated in the 1st embodiment with corresponding values for the 5th embodiment, so an explanation in this regard will not be provided again.

Moreover, these parameters can be calculated from Table 9 and Table 10 as the following values and satisfy the following conditions:

| 5th Embodiment | | | |
|---|---|---|---|
| f [mm] | 4.20 | T67/T12 | 9.43 |
| Fno | 1.70 | T67/T23 | 0.70 |
| HFOV [deg.] | 39.5 | T67/T34 | 8.25 |
| Nmax | 1.660 | T67/T45 | 5.69 |
| V2 + V3 + V4 | 110.2 | T67/T56 | 1.19 |
| V40 | 3 | Td/ΣCT | 1.38 |
| V30 | 2 | TL/ImgH | 1.57 |
| V20 | 0 | f1/|f2| | 0.40 |
| R2/CT1 | 14.16 | |(f1/ImgH) × (TL/f2)| | 0.62 |
| f/R8 | 0.34 | f × (|f1| + |f2|)/(|f1| × |f2|) | 1.30 |
| f/R10 | 1.32 | |f/f6| + |f/f7| | 3.92 |
| (f/R8) + (f/R10) | 1.66 | — | — |

6th Embodiment

Figure 11:
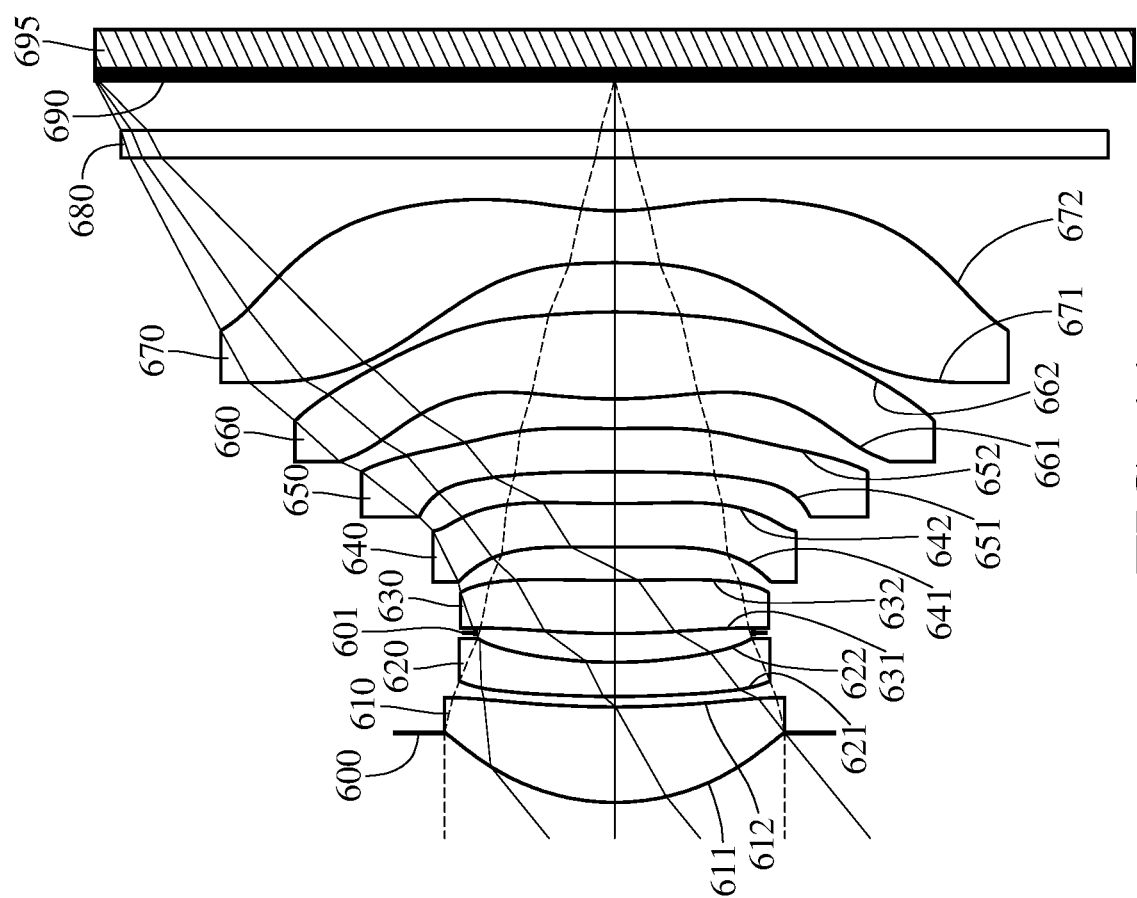
FIG. 11 is a schematic view of an image capturing unit according to the 6th embodiment of the present disclosure.
Figure 12:
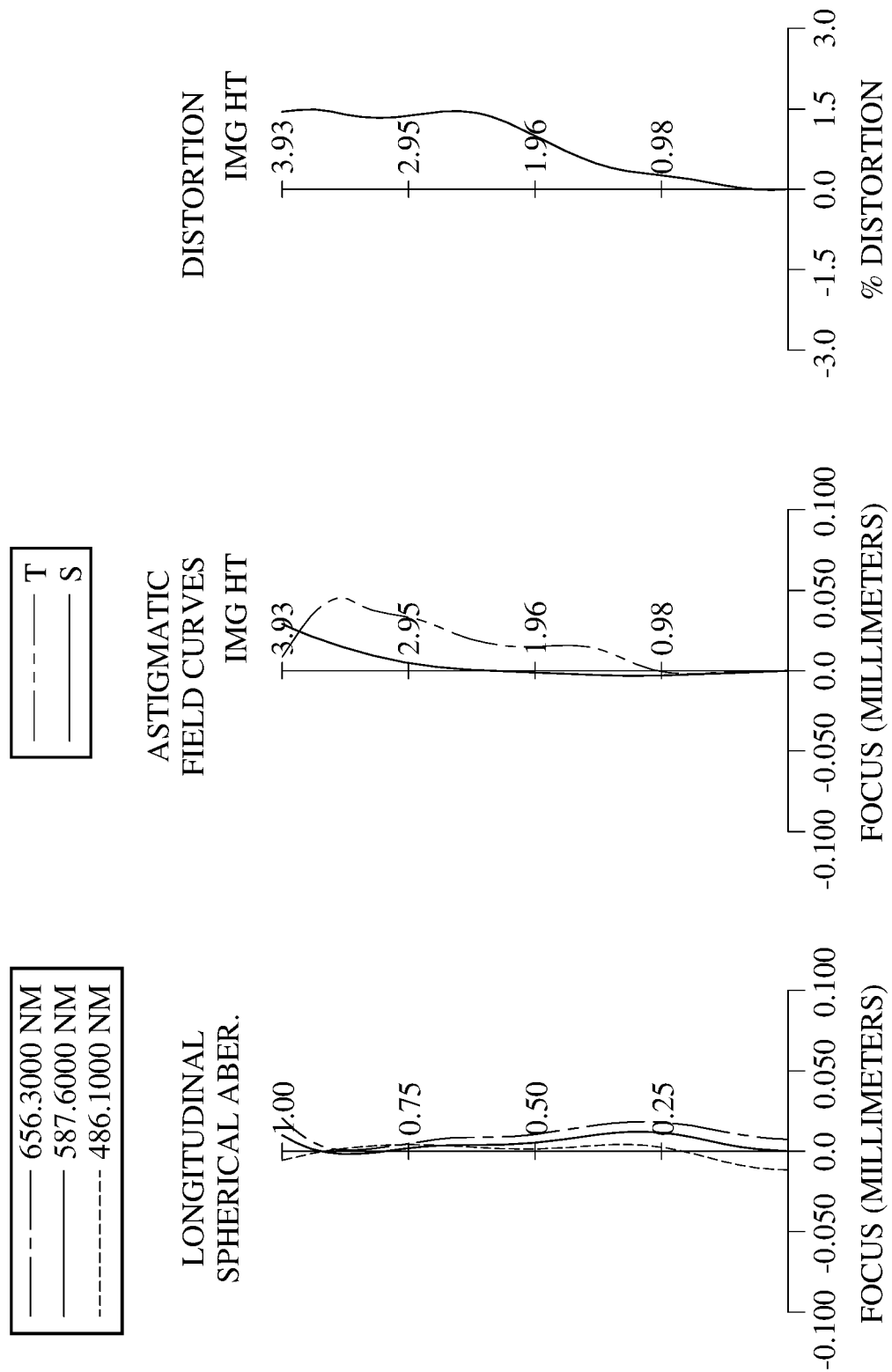
FIG. 12 shows spherical aberration curves, astigmatic field curves and a distortion curve of the image capturing unit according to the 6th embodiment.

FIG. 11 is a schematic view of an image capturing unit according to the 6th embodiment of the present disclosure. FIG. 12 shows, in order from left to right, spherical aberration curves, astigmatic field curves and a distortion curve of the image capturing unit according to the 6th embodiment. In FIG. 11, the image capturing unit includes the imaging lens assembly (its reference numeral is omitted) of the present disclosure and an image sensor 695. The imaging lens assembly includes, in order from an object side to an image side, an aperture stop 600, a first lens element 610, a second lens element 620, a stop 601, a third lens element 630, a fourth lens element 640, a fifth lens element 650, a sixth lens element 660, a seventh lens element 670, an IR-cut filter 680 and an image surface 690. The imaging lens assembly includes seven lens elements (610, 620, 630, 640, 650, 660 and 670) with no additional lens element disposed between each of the adjacent seven lens elements.

The first lens element 610 with positive refractive power has an object-side surface 611 being convex in a paraxial region thereof and an image-side surface 612 being concave in a paraxial region thereof. The first lens element 610 is made of plastic material and has the object-side surface 611 and the image-side surface 612 being both aspheric.

The second lens element 620 with negative refractive power has an object-side surface 621 being convex in a paraxial region thereof and an image-side surface 622 being concave in a paraxial region thereof. The second lens element 620 is made of plastic material and has the object-side surface 621 and the image-side surface 622 being both aspheric.

The third lens element 630 with positive refractive power has an object-side surface 631 being convex in a paraxial region thereof and an image-side surface 632 being concave in a paraxial region thereof. The third lens element 630 is made of plastic material and has the object-side surface 631 and the image-side surface 632 being both aspheric.

The fourth lens element 640 with negative refractive power has an object-side surface 641 being convex in a paraxial region thereof and an image-side surface 642 being concave in a paraxial region thereof. The fourth lens element 640 is made of plastic material and has the object-side surface 641 and the image-side surface 642 being both aspheric. The image-side surface 642 of the fourth lens element 640 has at least one inflection point.

The fifth lens element 650 with negative refractive power has an object-side surface 651 being convex in a paraxial region thereof and an image-side surface 652 being concave in a paraxial region thereof. The fifth lens element 650 is made of plastic material and has the object-side surface 651 and the image-side surface 652 being both aspheric. The image-side surface 652 of the fifth lens element 650 has at least one inflection point.

The sixth lens element 660 with positive refractive power has an object-side surface 661 being convex in a paraxial region thereof and an image-side surface 662 being convex in a paraxial region thereof. The sixth lens element 660 is made of plastic material and has the object-side surface 661 and the image-side surface 662 being both aspheric.

The seventh lens element 670 with negative refractive power has an object-side surface 671 being concave in a paraxial region thereof and an image-side surface 672 being concave in a paraxial region thereof. The seventh lens element 670 is made of plastic material and has the object-side surface 671 and the image-side surface 672 being both aspheric. The image-side surface 672 of the seventh lens element 670 has at least one convex shape in an off-axis region thereof.

The IR-cut filter 680 is made of glass material and located between the seventh lens element 670 and the image surface 690, and will not affect the focal length of the imaging lens assembly. The image sensor 695 is disposed on or near the image surface 690 of the imaging lens assembly.

The detailed optical data of the 6th embodiment are shown in Table 11 and the aspheric surface data are shown in Table 12 below.

TABLE 11

6th Embodiment
f = 4.78 mm, Fno = 1.85, HFOV = 39.0 deg.

| Surface # | | Curvature Radius | | Thickness | Material | Index | Abbe # | Focal Length |
|---|---|---|---|---|---|---|---|---|
| 0 | Object | Plano | | Infinity | | | | |
| 1 | Ape. Stop | Plano | | −0.527 | | | | |
| 2 | Lens 1 | 1.755 | (ASP) | 0.725 | Plastic | 1.545 | 56.0 | 4.09 |
| 3 | | 7.054 | (ASP) | 0.079 | | | | |
| 4 | Lens 2 | 7.496 | (ASP) | 0.260 | Plastic | 1.669 | 19.5 | −10.23 |
| 5 | | 3.527 | (ASP) | 0.224 | | | | |
| 6 | Stop | Plano | | −0.006 | | | | |
| 7 | Lens 3 | 5.842 | (ASP) | 0.404 | Plastic | 1.544 | 56.0 | 18.58 |
| 8 | | 13.509 | (ASP) | 0.253 | | | | |
| 9 | Lens 4 | 19.945 | (ASP) | 0.330 | Plastic | 1.669 | 19.5 | −24.20 |
| 10 | | 8.876 | (ASP) | 0.240 | | | | |
| 11 | Lens 5 | 317.828 | (ASP) | 0.330 | Plastic | 1.580 | 34.5 | −22.18 |
| 12 | | 12.351 | (ASP) | 0.225 | | | | |
| 13 | Lens 6 | 3.685 | (ASP) | 0.660 | Plastic | 1.558 | 44.6 | 3.65 |
| 14 | | −4.272 | (ASP) | 0.374 | | | | |
| 15 | Lens 7 | −5.599 | (ASP) | 0.395 | Plastic | 1.544 | 55.8 | −2.74 |
| 16 | | 2.088 | (ASP) | 0.400 | | | | |
| 17 | IR-cut filter | Plano | | 0.210 | Glass | 1.517 | 64.2 | — |
| 18 | | Plano | | 0.376 | | | | |
| 19 | Image | Plano | | — | | | | |

Note:
Reference wavelength is 587.6 nm (d-line).
An effective radius of the stop 601 (Surface 6) is 1.055 mm.

TABLE 12

Aspheric Coefficients

| | Surface # | | | | |
|---|---|---|---|---|---|
| | 2 | 3 | 4 | 5 | 7 |
| k = | −5.6891E−01 | 7.3096E+00 | 7.4465E+00 | −3.0568E−01 | 1.9160E+01 |
| A4 = | 9.6457E−03 | −3.9633E−02 | −6.6960E−02 | −4.8047E−02 | −6.6781E−02 |
| A6 = | 1.6475E−02 | 5.8963E−02 | 1.1616E−01 | 9.1524E−02 | 2.1488E−02 |
| A8 = | −2.2463E−02 | −4.1481E−02 | −6.9900E−02 | −3.2348E−02 | −1.1186E−02 |
| A10 = | 1.8560E−02 | −7.7651E−03 | −1.4289E−02 | −3.7720E−02 | −1.8860E−02 |
| A12 = | −6.6929E−03 | 1.8559E−02 | 4.1193E−02 | 5.0450E−02 | 1.3007E−02 |
| A14 = | — | −5.6930E−03 | −1.2546E−02 | −9.0732E−03 | 1.9008E−04 |

| | Surface # | | | | |
|---|---|---|---|---|---|
| | 8 | 9 | 10 | 11 | 12 |
| k = | 7.7611E+01 | 5.9811E+01 | 2.3465E+01 | −9.9000E+01 | −9.9000E+01 |
| A4 = | −7.4411E−02 | −1.4593E−01 | −1.2851E−01 | −1.3363E−01 | −2.1045E−01 |
| A6 = | 2.5157E−02 | 4.8009E−02 | 7.6748E−02 | 1.5347E−01 | 1.1233E−01 |
| A8 = | −3.1757E−02 | −1.4173E−01 | −1.3007E−01 | −1.0490E−01 | −4.2774E−03 |
| A10 = | 2.0640E−02 | 1.9962E−01 | 1.2476E−01 | 3.8651E−02 | −1.2633E−02 |
| A12 = | −1.5050E−02 | −1.4397E−01 | −6.4967E−02 | −7.5008E−03 | 3.1062E−03 |
| A14 = | 3.5206E−03 | 3.8849E−02 | 1.4106E−02 | −5.5164E−05 | −4.5884E−05 |
| A16 = | — | — | — | — | −3.4596E−05 |

TABLE 12-continued

Aspheric Coefficients

| | Surface # | | | |
|---|---|---|---|---|
| | 13 | 14 | 15 | 16 |
| k = | −2.6292E+01 | 1.6795E−02 | 1.8229E−01 | −1.4400E+01 |
| A4 = | 9.5238E−03 | 1.3809E−01 | −1.6578E−01 | −1.1631E−01 |
| A6 = | −1.5386E−01 | −1.8070E−01 | 6.2476E−02 | 5.6557E−02 |
| A8 = | 1.3103E−01 | 9.9813E−02 | −7.8548E−03 | −1.7062E−02 |
| A10 = | −5.9287E−02 | −2.9953E−02 | −9.8665E−05 | 3.1839E−03 |
| A12 = | 1.5063E−02 | 5.1106E−03 | 1.2284E−04 | −3.7189E−04 |
| A14 = | −1.9704E−03 | −4.6612E−04 | −1.1552E−05 | 2.4651E−05 |
| A16 = | 1.0261E−04 | 1.7613E−05 | 3.5302E−07 | −6.9084E−07 |

In the 6th embodiment, the equation of the aspheric surface profiles of the aforementioned lens elements is the same as the equation of the 1st embodiment. Also, the definitions of these parameters shown in the following table are the same as those stated in the 1st embodiment with corresponding values for the 6th embodiment, so an explanation in this regard will not be provided again.

Moreover, these parameters can be calculated from Table 11 and Table 12 as the following values and satisfy the following conditions:

| 6th Embodiment | | | |
|---|---|---|---|
| f [mm] | 4.78 | T67/T12 | 4.73 |
| Fno | 1.85 | T67/T23 | 1.72 |
| HFOV [deg.] | 39.0 | T67/T34 | 1.48 |
| Nmax | 1.669 | T67/T45 | 1.56 |
| V2 + V3 + V4 | 94.9 | T67/T56 | 1.66 |
| V40 | 3 | Td/ΣCT | 1.45 |
| V30 | 2 | TL/ImgH | 1.39 |
| V20 | 2 | f1/|f2| | 0.40 |
| R2/CT1 | 9.73 | |(f1/ImgH) × (TL/f2)| | 0.56 |
| f/R8 | 0.54 | f × (|f1| + |f2|)/(|f1| × |f2|) | 1.63 |
| f/R10 | 0.39 | |f/f6| + |f/f7| | 3.05 |
| (f/R8) + (f/R10) | 0.92 | — | — |

7th Embodiment

Figure 13:
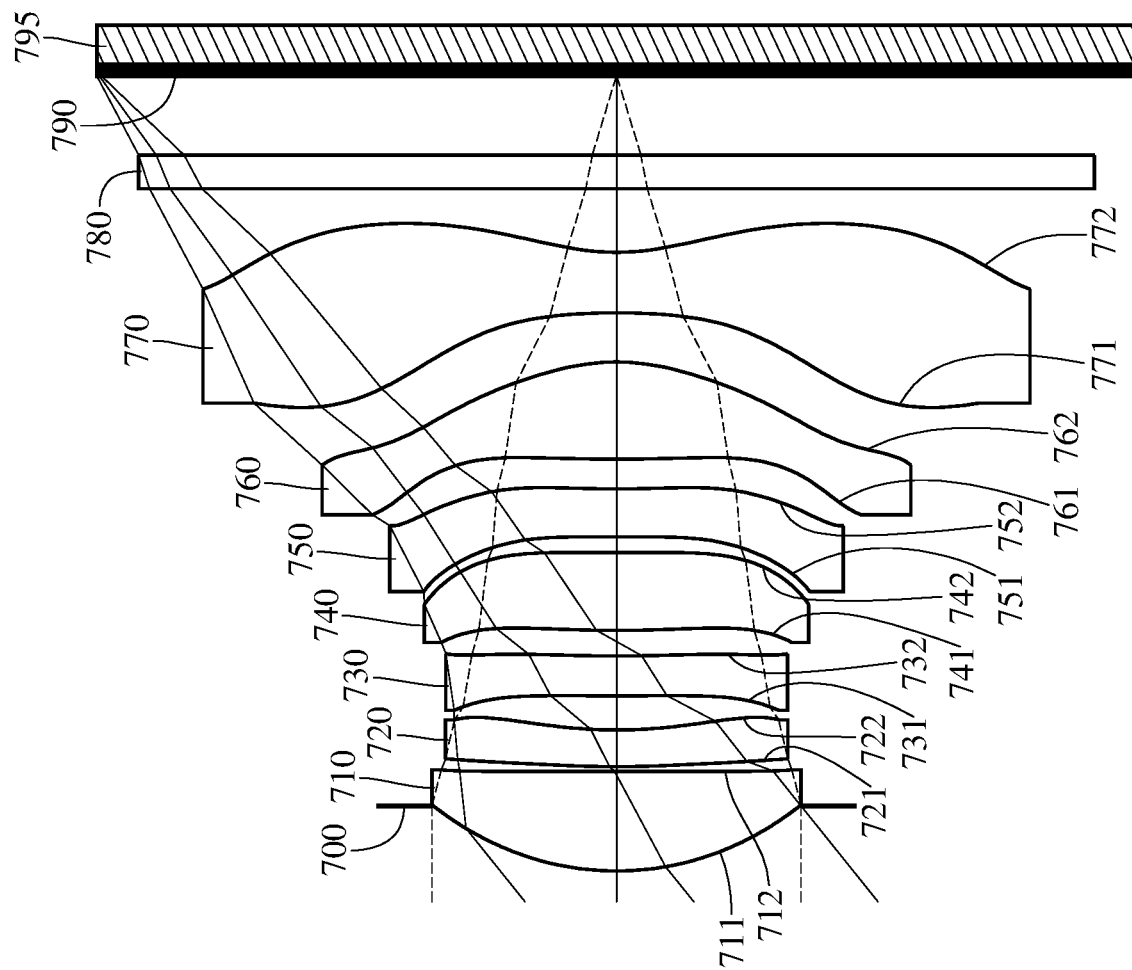
FIG. 13 is a schematic view of an image capturing unit according to the 7th embodiment of the present disclosure.
Figure 14:
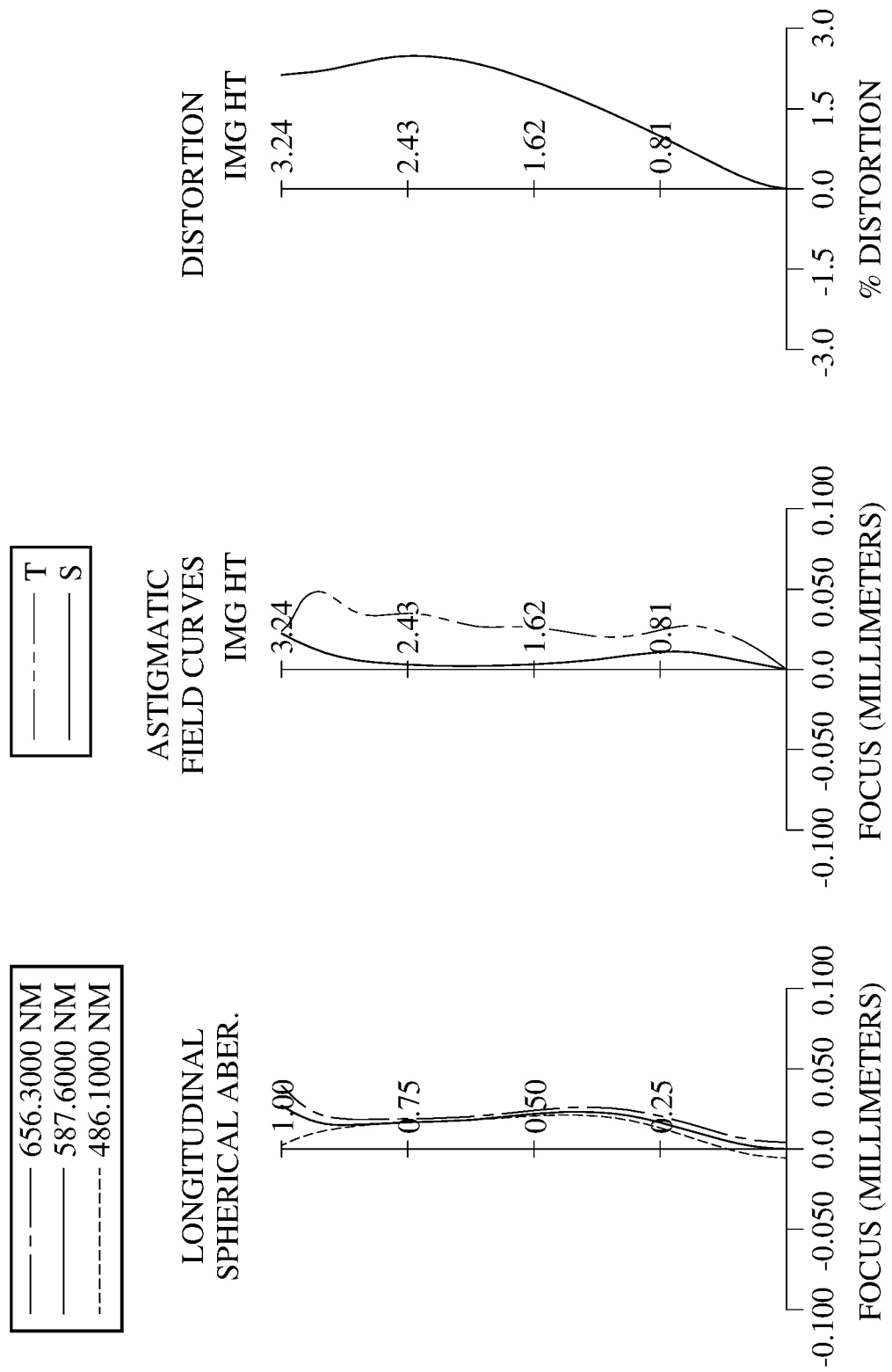
FIG. 14 shows spherical aberration curves, astigmatic field curves and a distortion curve of the image capturing unit according to the 7th embodiment.

FIG. 13 is a schematic view of an image capturing unit according to the 7th embodiment of the present disclosure. FIG. 14 shows, in order from left to right, spherical aberration curves, astigmatic field curves and a distortion curve of the image capturing unit according to the 7th embodiment. In FIG. 13, the image capturing unit includes the imaging lens assembly (its reference numeral is omitted) of the present disclosure and an image sensor 795. The imaging lens assembly includes, in order from an object side to an image side, an aperture stop 700, a first lens element 710, a second lens element 720, a third lens element 730, a fourth lens element 740, a fifth lens element 750, a sixth lens element 760, a seventh lens element 770, an IR-cut filter 780 and an image surface 790. The imaging lens assembly includes seven lens elements (710, 720, 730, 740, 750, 760 and 770) with no additional lens element disposed between each of the adjacent seven lens elements.

The first lens element 710 with positive refractive power has an object-side surface 711 being convex in a paraxial region thereof and an image-side surface 712 being concave in a paraxial region thereof. The first lens element 710 is made of plastic material and has the object-side surface 711 and the image-side surface 712 being both aspheric.

The second lens element 720 with negative refractive power has an object-side surface 721 being convex in a paraxial region thereof and an image-side surface 722 being concave in a paraxial region thereof. The second lens element 720 is made of plastic material and has the object-side surface 721 and the image-side surface 722 being both aspheric.

The third lens element 730 with negative refractive power has an object-side surface 731 being convex in a paraxial region thereof and an image-side surface 732 being concave in a paraxial region thereof. The third lens element 730 is made of plastic material and has the object-side surface 731 and the image-side surface 732 being both aspheric.

The fourth lens element 740 with positive refractive power has an object-side surface 741 being convex in a paraxial region thereof and an image-side surface 742 being concave in a paraxial region thereof. The fourth lens element 740 is made of plastic material and has the object-side surface 741 and the image-side surface 742 being both aspheric. The image-side surface 742 of the fourth lens element 740 has at least one inflection point.

The fifth lens element 750 with negative refractive power has an object-side surface 751 being convex in a paraxial region thereof and an image-side surface 752 being concave in a paraxial region thereof. The fifth lens element 750 is made of plastic material and has the object-side surface 751 and the image-side surface 752 being both aspheric. The image-side surface 752 of the fifth lens element 750 has at least one inflection point.

The sixth lens element 760 with positive refractive power has an object-side surface 761 being convex in a paraxial region thereof and an image-side surface 762 being convex in a paraxial region thereof. The sixth lens element 760 is made of plastic material and has the object-side surface 761 and the image-side surface 762 being both aspheric.

The seventh lens element 770 with negative refractive power has an object-side surface 771 being concave in a paraxial region thereof and an image-side surface 772 being concave in a paraxial region thereof. The seventh lens element 770 is made of plastic material and has the object-side surface 771 and the image-side surface 772 being both aspheric. The image-side surface 772 of the seventh lens element 770 has at least one convex shape in an off-axis region thereof.

The IR-cut filter 780 is made of glass material and located between the seventh lens element 770 and the image surface 790, and will not affect the focal length of the imaging lens assembly. The image sensor 795 is disposed on or near the image surface 790 of the imaging lens assembly.

The detailed optical data of the 7th embodiment are shown in Table 13 and the aspheric surface data are shown in Table 14 below.

TABLE 13

7th Embodiment
f = 3.93 mm, Fno = 1.70, HFOV = 38.8 deg.

| Surface # | | Curvature Radius | | Thickness | Material | Index | Abbe # | Focal Length |
|---|---|---|---|---|---|---|---|---|
| 0 | Object | Plano | | Infinity | | | | |
| 1 | Ape. Stop | Plano | | −0.408 | | | | |
| 2 | Lens 1 | 1.779 | (ASP) | 0.624 | Plastic | 1.545 | 56.0 | 3.43 |
| 3 | | 32.824 | (ASP) | 0.030 | | | | |
| 4 | Lens 2 | 5.957 | (ASP) | 0.230 | Plastic | 1.615 | 24.4 | −9.55 |
| 5 | | 2.915 | (ASP) | 0.214 | | | | |
| 6 | Lens 3 | 31.062 | (ASP) | 0.250 | Plastic | 1.660 | 20.3 | −19.67 |
| 7 | | 9.128 | (ASP) | 0.160 | | | | |
| 8 | Lens 4 | 6.924 | (ASP) | 0.489 | Plastic | 1.544 | 55.9 | 13.59 |
| 9 | | 106.536 | (ASP) | 0.098 | | | | |
| 10 | Lens 5 | 1306.401 | (ASP) | 0.300 | Plastic | 1.660 | 20.3 | −9.83 |
| 11 | | 6.454 | (ASP) | 0.187 | | | | |
| 12 | Lens 6 | 12.253 | (ASP) | 0.609 | Plastic | 1.553 | 48.0 | 2.15 |
| 13 | | −1.292 | (ASP) | 0.308 | | | | |
| 14 | Lens 7 | −4.537 | (ASP) | 0.379 | Plastic | 1.517 | 56.0 | −2.00 |
| 15 | | 1.379 | (ASP) | 0.400 | | | | |
| 16 | IR-cut filter | Plano | | 0.210 | Glass | 1.517 | 64.2 | — |
| 17 | | Plano | | 0.492 | | | | |
| 18 | Image | Plano | | — | | | | |

Note:
Reference wavelength is 587.6 nm (d-line).
An effective radius of the image-side surface 732 (Surface 7) is 1.070 mm.

TABLE 14

Aspheric Coefficients

| | Surface # | | | | |
|---|---|---|---|---|---|
| | 2 | 3 | 4 | 5 | 6 |
| k = | 2.6229E−01 | 8.1123E+01 | 1.2442E+01 | −1.0294E+01 | −9.9000E+01 |
| A4 = | −1.2609E−02 | −7.3075E−02 | −1.2224E−01 | −1.8418E−02 | −5.8469E−02 |
| A6 = | 2.2305E−02 | 1.3663E−01 | 1.2329E−01 | −5.5858E−02 | −4.9344E−02 |
| A8 = | −6.4315E−02 | −1.1339E−01 | 9.7475E−03 | 9.3473E−02 | 2.3847E−02 |
| A10 = | 7.9848E−02 | 3.8050E−02 | −1.8032E−01 | −1.6546E−01 | −4.6592E−02 |
| A12 = | −5.1773E−02 | 2.1952E−04 | 1.7624E−01 | 8.3699E−02 | 3.1748E−02 |
| A14 = | 1.2874E−02 | — | −5.5925E−02 | −1.0052E−02 | — |

| | Surface # | | | | |
|---|---|---|---|---|---|
| | 7 | 8 | 9 | 10 | 11 |
| k = | −6.6852E+00 | 3.1707E+01 | −9.9000E+01 | 9.0000E+01 | −1.1022E+01 |
| A4 = | −7.2883E−02 | −8.2910E−02 | −9.0886E−03 | −1.2564E−01 | −1.4525E−01 |
| A6 = | 1.3097E−02 | −4.5750E−02 | −5.2905E−01 | −4.3334E−01 | −1.9590E−01 |
| A8 = | −3.4711E−02 | 1.1651E−02 | 1.1773E+00 | 9.9843E−01 | 3.9645E−01 |
| A10 = | 6.5760E−02 | −1.4375E−02 | −1.6196E+00 | −1.0225E+00 | −2.8560E−01 |
| A12 = | −1.8386E−02 | 1.3364E−02 | 1.3030E+00 | 5.3312E−01 | 9.2536E−02 |
| A14 = | — | −7.2932E−03 | −5.6000E−01 | −1.1634E−01 | −1.0542E−02 |
| A16 = | — | — | 9.7840E−02 | — | — |

| | Surface # | | | |
|---|---|---|---|---|
| | 12 | 13 | 14 | 15 |
| k = | 5.8876E+01 | −7.1833E+00 | −8.6761E+00 | −7.6176E+00 |
| A4 = | −7.6552E−03 | −1.1451E−01 | −1.2124E−01 | −1.0995E−01 |
| A6 = | −5.9715E−02 | 2.2912E−01 | −1.8359E−02 | 5.5603E−02 |
| A8 = | −1.7537E−01 | −3.3446E−01 | 5.2933E−02 | −1.9546E−02 |
| A10 = | 3.2402E−01 | 2.4909E−01 | −2.1264E−02 | 4.4756E−03 |
| A12 = | −2.3458E−01 | −9.3995E−02 | 3.9252E−03 | −6.5033E−04 |
| A14 = | 7.9753E−02 | 1.7581E−02 | −3.5559E−04 | 5.3472E−05 |
| A16 = | −1.0341E−02 | −1.3093E−03 | 1.2752E−05 | −1.8363E−06 |

In the 7th embodiment, the equation of the aspheric surface profiles of the aforementioned lens elements is the same as the equation of the 1st embodiment. Also, the definitions of these parameters shown in the following table are the same as those stated in the 1st embodiment with corresponding values for the 7th embodiment, so an explanation in this regard will not be provided again.

Moreover, these parameters can be calculated from Table 13 and Table 14 as the following values and satisfy the following conditions:

| 7th Embodiment | | | |
|---|---|---|---|
| f [mm] | 3.93 | T67/T12 | 10.27 |
| Fno | 1.70 | T67/T23 | 1.44 |
| HFOV [deg.] | 38.8 | T67/T34 | 1.93 |
| Nmax | 1.660 | T67/T45 | 3.14 |
| V2 + V3 + V4 | 100.6 | T67/T56 | 1.65 |
| V40 | 3 | Td/ΣCT | 1.35 |
| V30 | 3 | TL/ImgH | 1.54 |
| V20 | 0 | f1/|f2| | 0.36 |
| R2/CT1 | 52.60 | |(f1/ImgH) × (TL/f2)| | 0.55 |
| f/R8 | 0.04 | f × (|f1| + |f2|)/(|f1| × |f2|) | 1.56 |
| f/R10 | 0.61 | |f/f6| + |f/f7| | 3.79 |
| (f/R8) + (f/R10) | 0.65 | — | — |

8th Embodiment

Figure 15:
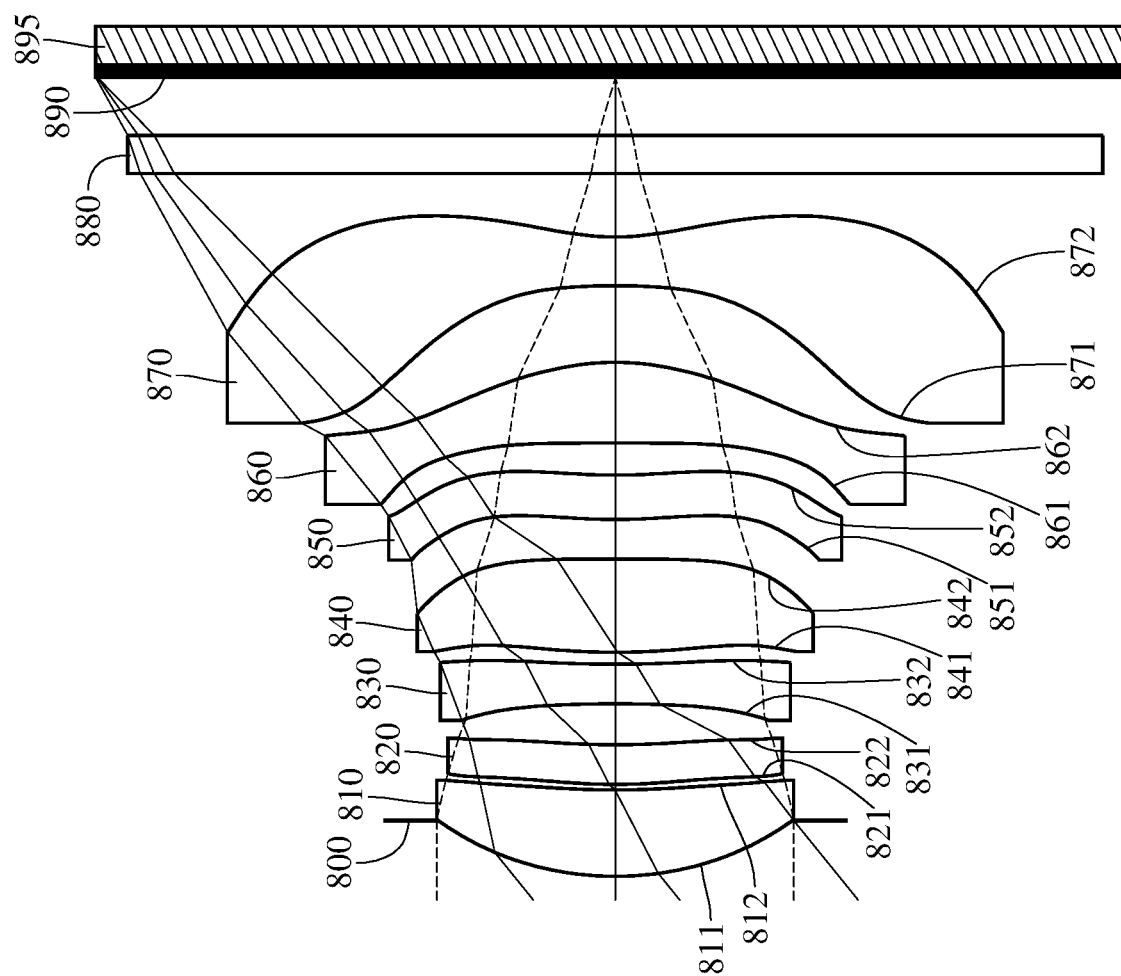
FIG. 15 is a schematic view of an image capturing unit according to the 8th embodiment of the present disclosure.
Figure 16:
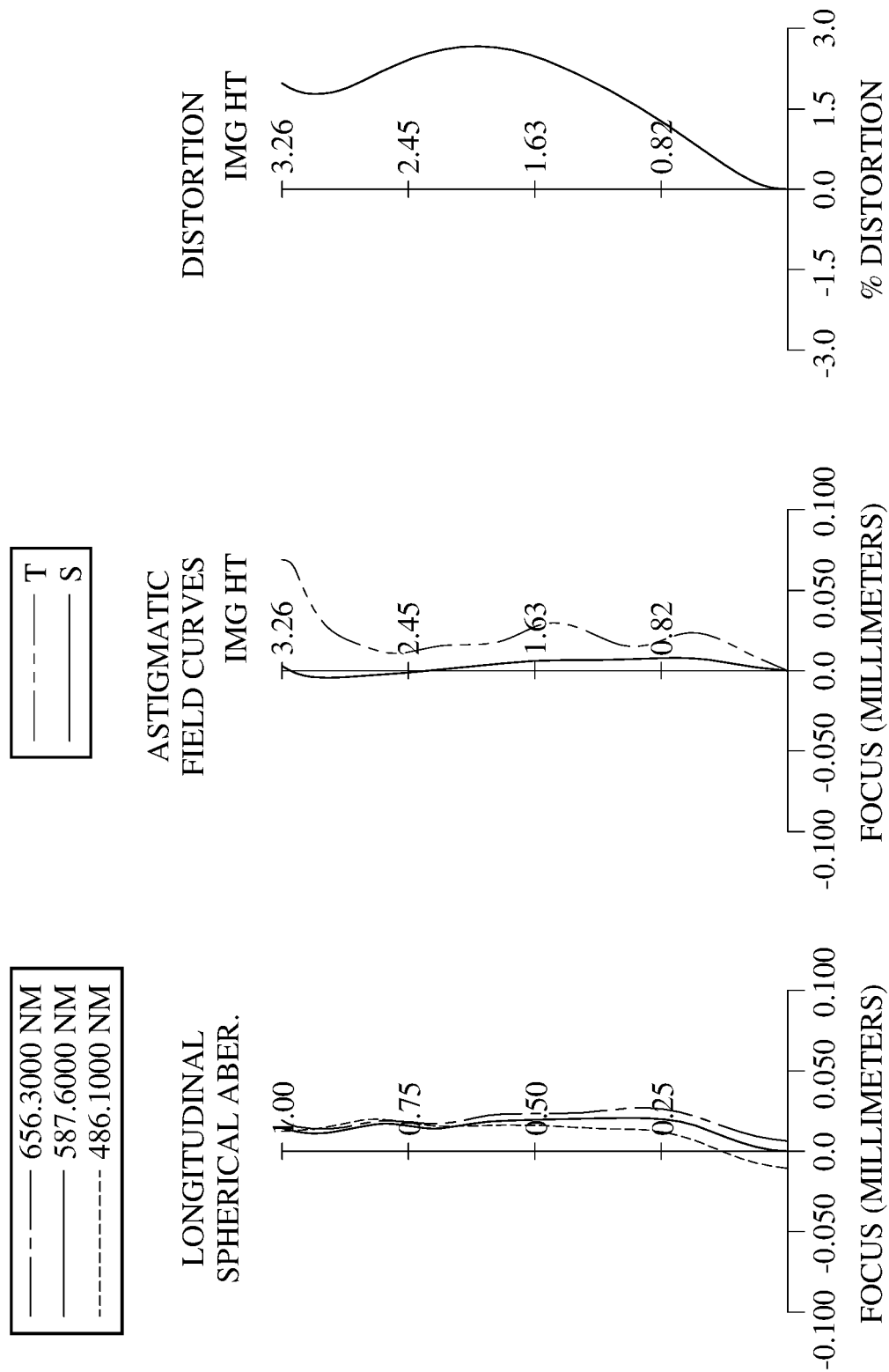
FIG. 16 shows spherical aberration curves, astigmatic field curves and a distortion curve of the image capturing unit according to the 8th embodiment.

FIG. 15 is a schematic view of an image capturing unit according to the 8th embodiment of the present disclosure. FIG. 16 shows, in order from left to right, spherical aberration curves, astigmatic field curves and a distortion curve of the image capturing unit according to the 8th embodiment. In FIG. 15, the image capturing unit includes the imaging lens assembly (its reference numeral is omitted) of the present disclosure and an image sensor 895. The imaging lens assembly includes, in order from an object side to an image side, an aperture stop 800, a first lens element 810, a second lens element 820, a third lens element 830, a fourth lens element 840, a fifth lens element 850, a sixth lens element 860, a seventh lens element 870, an IR-cut filter 880 and an image surface 890. The imaging lens assembly includes seven lens elements (810, 820, 830, 840, 850, 860 and 870) with no additional lens element disposed between each of the adjacent seven lens elements.

The first lens element 810 with positive refractive power has an object-side surface 811 being convex in a paraxial region thereof and an image-side surface 812 being concave in a paraxial region thereof. The first lens element 810 is made of plastic material and has the object-side surface 811 and the image-side surface 812 being both aspheric.

The second lens element 820 with positive refractive power has an object-side surface 821 being convex in a paraxial region thereof and an image-side surface 822 being concave in a paraxial region thereof. The second lens element 820 is made of plastic material and has the object-side surface 821 and the image-side surface 822 being both aspheric.

The third lens element 830 with negative refractive power has an object-side surface 831 being concave in a paraxial region thereof and an image-side surface 832 being concave in a paraxial region thereof. The third lens element 830 is made of plastic material and has the object-side surface 831 and the image-side surface 832 being both aspheric.

The fourth lens element 840 with positive refractive power has an object-side surface 841 being convex in a paraxial region thereof and an image-side surface 842 being concave in a paraxial region thereof. The fourth lens element 840 is made of plastic material and has the object-side surface 841 and the image-side surface 842 being both aspheric. The image-side surface 842 of the fourth lens element 840 has at least one inflection point.

The fifth lens element 850 with positive refractive power has an object-side surface 851 being convex in a paraxial region thereof and an image-side surface 852 being concave in a paraxial region thereof. The fifth lens element 850 is made of plastic material and has the object-side surface 851 and the image-side surface 852 being both aspheric. The image-side surface 852 of the fifth lens element 850 has at least one inflection point.

The sixth lens element 860 with positive refractive power has an object-side surface 861 being concave in a paraxial region thereof and an image-side surface 862 being convex in a paraxial region thereof. The sixth lens element 860 is made of plastic material and has the object-side surface 861 and the image-side surface 862 being both aspheric.

The seventh lens element 870 with negative refractive power has an object-side surface 871 being concave in a paraxial region thereof and an image-side surface 872 being concave in a paraxial region thereof. The seventh lens element 870 is made of plastic material and has the object-side surface 871 and the image-side surface 872 being both aspheric. The image-side surface 872 of the seventh lens element 870 has at least one convex shape in an off-axis region thereof.

The IR-cut filter 880 is made of glass material and located between the seventh lens element 870 and the image surface 890, and will not affect the focal length of the imaging lens assembly. The image sensor 895 is disposed on or near the image surface 890 of the imaging lens assembly.

The detailed optical data of the 8th embodiment are shown in Table 15 and the aspheric surface data are shown in Table 16 below.

TABLE 15

8th Embodiment
f = 3.93 mm, Fno = 1.75, HFOV = 39.0 deg.

| Surface # | | Curvature Radius | | Thickness | Material | Index | Abbe # | Focal Length |
|---|---|---|---|---|---|---|---|---|
| 0 | Object | Plano | | Infinity | | | | |
| 1 | Ape. Stop | Plano | | −0.352 | | | | |
| 2 | Lens 1 | 2.000 | (ASP) | 0.545 | Plastic | 1.545 | 56.1 | 5.50 |
| 3 | | 5.429 | (ASP) | 0.035 | | | | |
| 4 | Lens 2 | 3.800 | (ASP) | 0.250 | Plastic | 1.544 | 56.0 | 22.72 |
| 5 | | 5.359 | (ASP) | 0.258 | | | | |
| 6 | Lens 3 | −8.473 | (ASP) | 0.250 | Plastic | 1.671 | 19.3 | −6.40 |
| 7 | | 8.819 | (ASP) | 0.075 | | | | |
| 8 | Lens 4 | 4.406 | (ASP) | 0.587 | Plastic | 1.544 | 56.0 | 8.73 |
| 9 | | 58.082 | (ASP) | 0.250 | | | | |
| 10 | Lens 5 | 3.442 | (ASP) | 0.280 | Plastic | 1.671 | 19.3 | 60.15 |
| 11 | | 3.640 | (ASP) | 0.202 | | | | |
| 12 | Lens 6 | −100.000 | (ASP) | 0.509 | Plastic | 1.544 | 56.0 | 2.98 |
| 13 | | −1.597 | (ASP) | 0.483 | | | | |

TABLE 15-continued

8th Embodiment
f = 3.93 mm, Fno = 1.75, HFOV = 39.0 deg.

| Surface # | | Curvature Radius | | Thickness | Material | Index | Abbe # | Focal Length |
|---|---|---|---|---|---|---|---|---|
| 14 | Lens 7 | −5.054 | (ASP) | 0.308 | Plastic | 1.544 | 56.0 | −2.18 |
| 15 | | 1.583 | (ASP) | 0.400 | | | | |
| 16 | IR-cut filter | Plano | | 0.240 | Glass | 1.517 | 64.2 | — |
| 17 | | Plano | | 0.366 | | | | |
| 18 | Image | Plano | | — | | | | |

Note:
Reference wavelength is 587.6 nm (d-line).
An effective radius of the image-side surface 832 (Surface 7) is 1.1025 mm.

TABLE 16

Aspheric Coefficients

| | Surface # | | | | |
|---|---|---|---|---|---|
| | 2 | 3 | 4 | 5 | 6 |
| k = | −1.4577E−01 | 1.3070E+01 | −4.1169E+00 | −1.4657E+01 | 1.0000E+01 |
| A4 = | 4.7719E−03 | −6.3521E−03 | −1.0473E−02 | 1.5824E−02 | 2.6060E−02 |
| A6 = | 4.1006E−03 | −4.4205E−01 | −4.9958E−01 | −3.8052E−01 | −1.6501E−01 |
| A8 = | 1.8622E−02 | 1.1992E+00 | 8.7994E−01 | 8.4779E−01 | −5.5930E−01 |
| A10 = | −1.3276E−01 | −1.3032E+00 | 5.5762E−01 | −1.1249E+00 | 3.6512E+00 |
| A12 = | 3.9764E−01 | −2.4101E−01 | −4.6408E+00 | 7.7655E−01 | −9.2295E+00 |
| A14 = | −6.0772E−01 | 2.3840E+00 | 8.3705E+00 | 1.3654E−01 | 1.3300E+01 |
| A16 = | 5.0764E−01 | −2.8126E+00 | −7.6337E+00 | −6.4032E−01 | −1.1344E+01 |
| A18 = | −2.1948E−01 | 1.4720E+00 | 3.6112E+00 | 3.9574E−01 | 5.3411E+00 |
| A20 = | 3.7739E−02 | −3.0149E−01 | −7.0199E−01 | −6.8439E−02 | −1.0757E+00 |

| | Surface # | | | | |
|---|---|---|---|---|---|
| | 7 | 8 | 9 | 10 | 11 |
| k = | −8.3933E+01 | −1.7359E+01 | −9.2502E+01 | −1.6355E+01 | −6.3790E+01 |
| A4 = | 7.8693E−02 | 2.2581E−02 | −1.5025E−01 | −2.1843E−01 | −5.8513E−02 |
| A6 = | −3.4014E−01 | −2.6925E−01 | 1.1637E−01 | 2.3926E−01 | −2.9638E−01 |
| A8 = | 2.7757E−01 | 6.9934E−01 | −2.8387E−01 | −6.7855E−01 | 6.6926E−01 |
| A10 = | 7.0340E−01 | −1.7455E+00 | 4.9990E−01 | 1.5002E+00 | −9.0108E−01 |
| A12 = | −2.3772E+00 | 3.1639E+00 | −7.9347E−01 | −2.2718E+00 | 8.0691E−01 |
| A14 = | 3.2505E+00 | −3.7341E+00 | 8.9228E−01 | 2.1451E+00 | −4.8996E−01 |
| A16 = | −2.4729E+00 | 2.6010E+00 | −6.1979E−01 | −1.2082E+00 | 1.9361E−01 |
| A18 = | 1.0437E+00 | −9.3473E−01 | 2.3864E−01 | 3.7742E−01 | −4.4280E−02 |
| A20 = | −1.9330E−01 | 1.2878E−01 | −3.8839E−02 | −5.1092E−02 | 4.4187E−03 |

| | Surface # | | | |
|---|---|---|---|---|
| | 12 | 13 | 14 | 15 |
| k = | 9.0000E+01 | −7.4335E+00 | 8.7892E−01 | −4.9151E+00 |
| A4 = | −9.9927E−03 | −4.4089E−02 | −1.8120E−01 | −2.1611E−01 |
| A6 = | −1.8576E−01 | −2.4642E−02 | −6.3077E−02 | 1.6442E−01 |
| A8 = | 1.4779E−01 | 2.2696E−02 | 2.6045E−01 | −8.7217E−02 |
| A10 = | 1.3761E−01 | 4.4389E−02 | −2.6538E−01 | 3.0983E−02 |
| A12 = | −3.3518E−01 | −6.1047E−02 | 1.4475E−01 | −7.3336E−03 |
| A14 = | 2.7719E−01 | 3.3160E−02 | −4.5529E−02 | 1.1151E−03 |
| A16 = | −1.2428E−01 | −9.4669E−03 | 8.2593E−03 | −1.0054E−04 |
| A18 = | 2.9800E−02 | 1.3999E−03 | −8.0439E−04 | 4.4096E−06 |
| A20 = | −2.9462E−03 | −8.4590E−05 | 3.2633E−05 | −4.4802E−08 |

In the 8th embodiment, the equation of the aspheric surface profiles of the aforementioned lens elements is the same as the equation of the 1st embodiment. Also, the definitions of these parameters shown in the following table are the same as those stated in the 1st embodiment with corresponding values for the 8th embodiment, so an explanation in this regard will not be provided again.

Moreover, these parameters can be calculated from Table 15 and Table 16 as the following values and satisfy the following conditions:

| 8th Embodiment | | | |
|---|---|---|---|
| f [mm] | 3.93 | T67/T12 | 13.80 |
| Fno | 1.75 | T67/T23 | 1.87 |
| HFOV [deg.] | 39.0 | T67/T34 | 6.44 |
| Nmax | 1.671 | T67/T45 | 1.93 |
| V2 + V3 + V4 | 131.3 | T67/T56 | 2.39 |
| V40 | 2 | Td/ΣCT | 1.48 |
| V30 | 2 | TL/ImgH | 1.54 |
| V20 | 2 | f1/|f2| | 0.24 |

-continued

| 8th Embodiment | | | |
|---|---|---|---|
| R2/CT1 | 9.96 | \|(f1/ImgH) × (TL/f2)\| | 0.37 |
| f/R8 | 0.07 | f × (\|f1\| + \|f2\|)/(\|f1\| × \|f2\|) | 0.89 |
| f/R10 | 1.08 | \|f/f6\| + \|f/f7\| | 3.13 |
| (f/R8) + (f/R10) | 1.15 | — | — |

9th Embodiment

Figure 17:
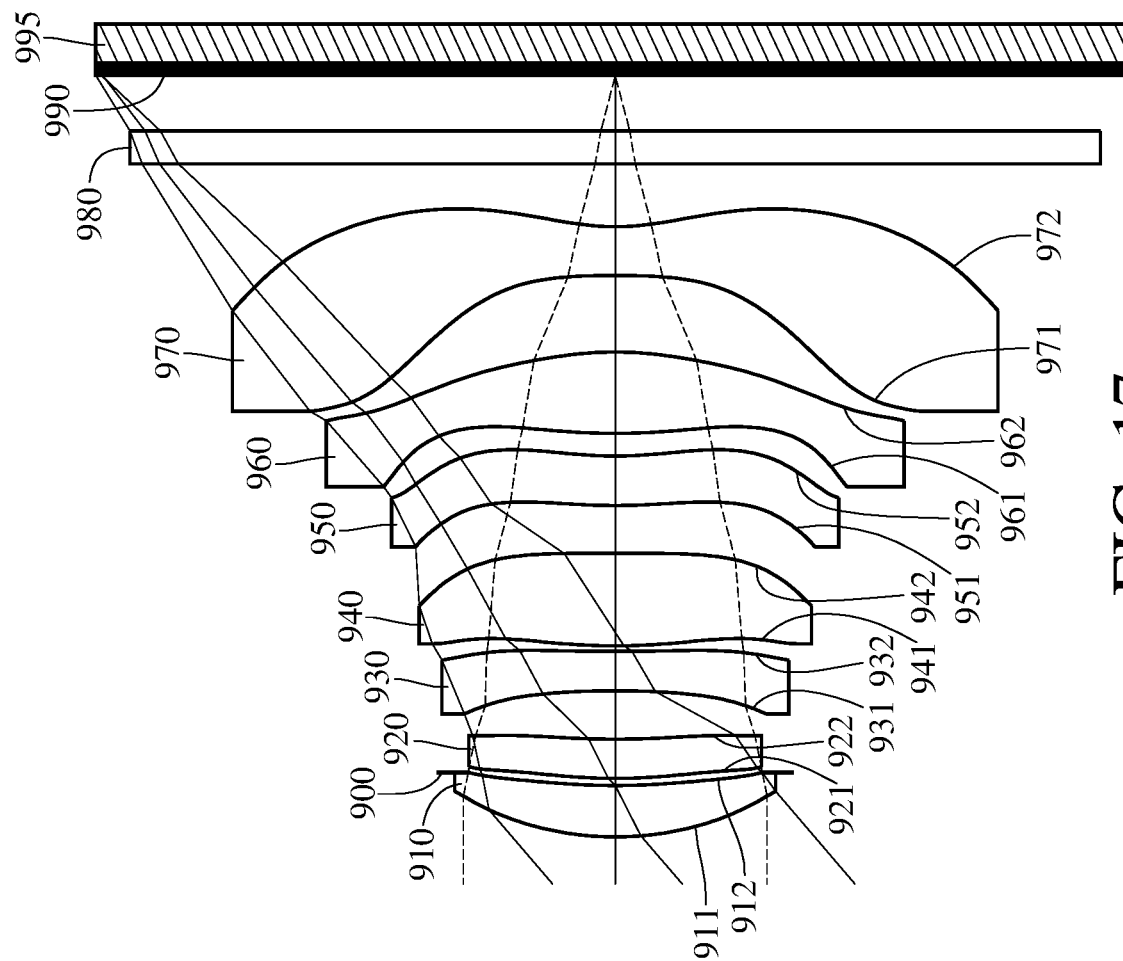
FIG. 17 is a schematic view of an image capturing unit according to the 9th embodiment of the present disclosure.
Figure 18:
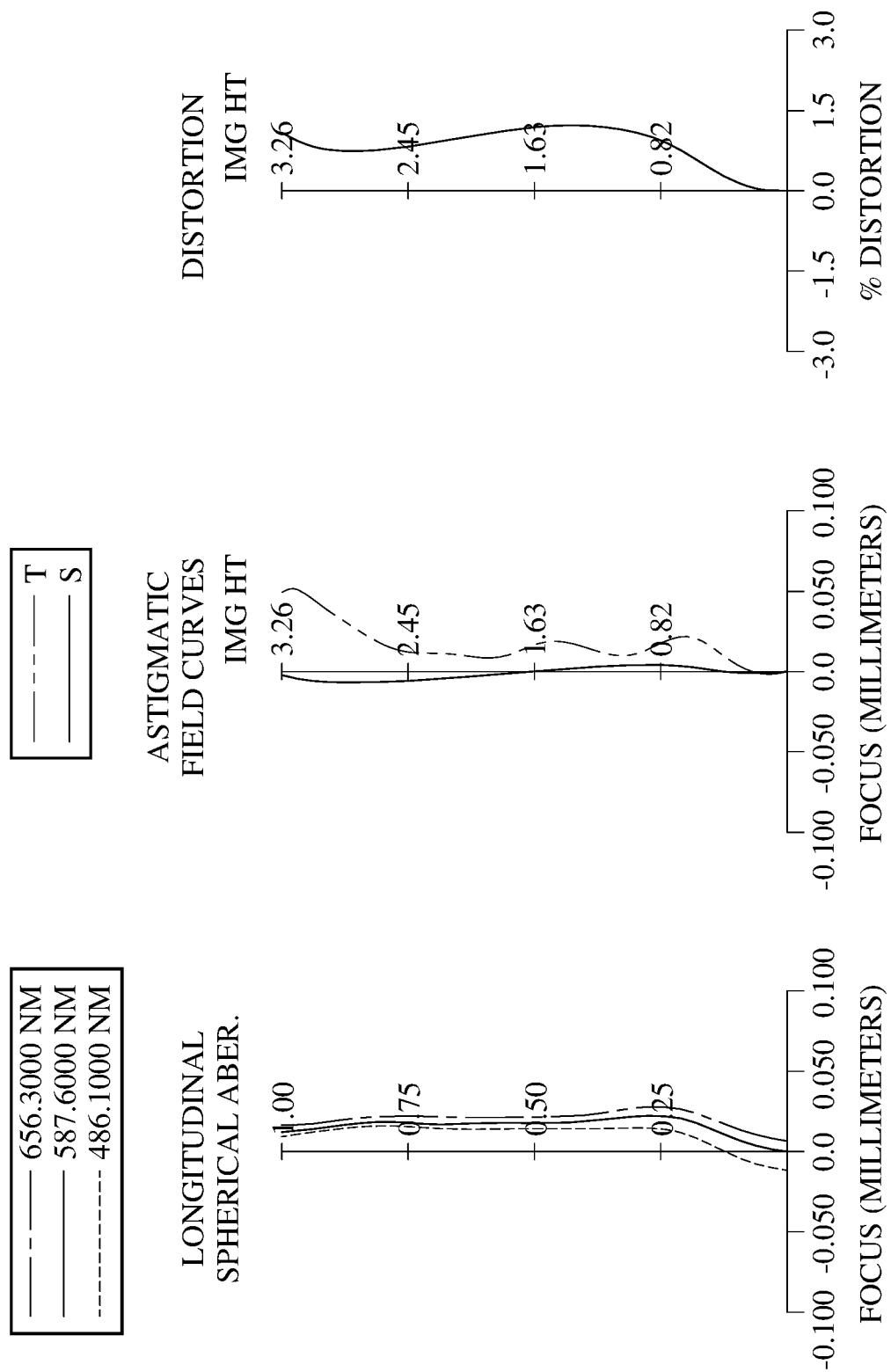
FIG. 18 shows spherical aberration curves, astigmatic field curves and a distortion curve of the image capturing unit according to the 9th embodiment.

FIG. 17 is a schematic view of an image capturing unit according to the 9th embodiment of the present disclosure. FIG. 18 shows, in order from left to right, spherical aberration curves, astigmatic field curves and a distortion curve of the image capturing unit according to the 9th embodiment. In FIG. 17, the image capturing unit includes the imaging lens assembly (its reference numeral is omitted) of the present disclosure and an image sensor 995. The imaging lens assembly includes, in order from an object side to an image side, a first lens element 910, an aperture stop 900, a second lens element 920, a third lens element 930, a fourth lens element 940, a fifth lens element 950, a sixth lens element 960, a seventh lens element 970, an IR-cut filter 980 and an image surface 990. The imaging lens assembly includes seven lens elements (910, 920, 930, 940, 950, 960 and 970) with no additional lens element disposed between each of the adjacent seven lens elements.

The first lens element 910 with positive refractive power has an object-side surface 911 being convex in a paraxial region thereof and an image-side surface 912 being concave in a paraxial region thereof. The first lens element 910 is made of plastic material and has the object-side surface 911 and the image-side surface 912 being both aspheric.

The second lens element 920 with positive refractive power has an object-side surface 921 being convex in a paraxial region thereof and an image-side surface 922 being concave in a paraxial region thereof. The second lens element 920 is made of plastic material and has the object-side surface 921 and the image-side surface 922 being both aspheric.

The third lens element 930 with negative refractive power has an object-side surface 931 being concave in a paraxial region thereof and an image-side surface 932 being concave in a paraxial region thereof. The third lens element 930 is made of plastic material and has the object-side surface 931 and the image-side surface 932 being both aspheric.

The fourth lens element 940 with positive refractive power has an object-side surface 941 being convex in a paraxial region thereof and an image-side surface 942 being planar in a paraxial region thereof. The fourth lens element 940 is made of plastic material and has the object-side surface 941 and the image-side surface 942 being both aspheric. The image-side surface 942 of the fourth lens element 940 has at least one inflection point.

The fifth lens element 950 with negative refractive power has an object-side surface 951 being convex in a paraxial region thereof and an image-side surface 952 being concave in a paraxial region thereof. The fifth lens element 950 is made of plastic material and has the object-side surface 951 and the image-side surface 952 being both aspheric. The image-side surface 952 of the fifth lens element 950 has at least one inflection point.

The sixth lens element 960 with positive refractive power has an object-side surface 961 being convex in a paraxial region thereof and an image-side surface 962 being convex in a paraxial region thereof. The sixth lens element 960 is made of plastic material and has the object-side surface 961 and the image-side surface 962 being both aspheric.

The seventh lens element 970 with negative refractive power has an object-side surface 971 being concave in a paraxial region thereof and an image-side surface 972 being concave in a paraxial region thereof. The seventh lens element 970 is made of plastic material and has the object-side surface 971 and the image-side surface 972 being both aspheric. The image-side surface 972 of the seventh lens element 970 has at least one convex shape in an off-axis region thereof.

The IR-cut filter 980 is made of glass material and located between the seventh lens element 970 and the image surface 990, and will not affect the focal length of the imaging lens assembly. The image sensor 995 is disposed on or near the image surface 990 of the imaging lens assembly.

The detailed optical data of the 9th embodiment are shown in Table 17 and the aspheric surface data are shown in Table 18 below.

TABLE 17

9th Embodiment
f = 3.76 mm, Fno = 1.95, HFOV = 40.5 deg.

| Surface # | | Curvature Radius | | Thickness | Material | Index | Abbe # | Focal Length |
|---|---|---|---|---|---|---|---|---|
| 0 | Object | Plano | | Infinity | | | | |
| 1 | Lens 1 | 1.998 | (ASP) | 0.327 | Plastic | 1.545 | 56.0 | 6.29 |
| 2 | Ape. Stop | 4.523 | (ASP) | 0.045 | | | | |
| 3 | Lens 2 | 3.398 | (ASP) | 0.250 | Plastic | 1.544 | 55.9 | 15.81 |
| 4 | | 5.472 | (ASP) | 0.308 | | | | |
| 5 | Lens 3 | −5.432 | (ASP) | 0.251 | Plastic | 1.671 | 19.3 | −6.84 |
| 6 | | 30.098 | (ASP) | 0.035 | | | | |
| 7 | Lens 4 | 4.186 | (ASP) | 0.589 | Plastic | 1.544 | 55.9 | 7.70 |
| 8 | | ∞ | (ASP) | 0.304 | | | | |
| 9 | Lens 5 | 3.516 | (ASP) | 0.315 | Plastic | 1.671 | 19.3 | −13.57 |
| 10 | | 2.445 | (ASP) | 0.144 | | | | |
| 11 | Lens 6 | 4.308 | (ASP) | 0.518 | Plastic | 1.584 | 28.2 | 2.47 |
| 12 | | −2.073 | (ASP) | 0.487 | | | | |
| 13 | Lens 7 | −6.443 | (ASP) | 0.311 | Plastic | 1.584 | 28.2 | −2.08 |

TABLE 17-continued

9th Embodiment
f = 3.76 mm, Fno = 1.95, HFOV = 40.5 deg.

| Surface # | | Curvature Radius | Thickness | Material | Index | Abbe # | Focal Length |
|---|---|---|---|---|---|---|---|
| 14 | | 1.521 (ASP) | 0.400 | | | | |
| 15 | IR-cut filter | Plano | 0.210 | Glass | 1.517 | 64.2 | — |
| 16 | | Plano | 0.354 | | | | |
| 17 | Image | Plano | — | | | | |

Note:
Reference wavelength is 587.6 nm (d-line).
An effective radius of the image-side surface 932 (Surface 6) is 1.1025 mm.

TABLE 18

Aspheric Coefficients

| | Surface # | | | | |
|---|---|---|---|---|---|
| | 1 | 2 | 3 | 4 | 5 |
| k = | −3.9672E−02 | 1.4446E+01 | −2.7310E+00 | −3.0733E+01 | 9.6593E+00 |
| A4 = | 7.7401E−03 | 1.7672E−02 | −1.8162E−03 | 1.0668E−02 | 5.3791E−02 |
| A6 = | 3.0804E−02 | −6.4501E−01 | −5.9840E−01 | −5.2944E−01 | −4.2111E−01 |
| A8 = | −3.0370E−01 | 2.2098E+00 | 1.3370E+00 | 2.1221E+00 | 5.4365E−01 |
| A10 = | 1.4679E+00 | −3.8926E+00 | −1.4049E−01 | −6.9966E+00 | 4.7730E−01 |
| A12 = | −4.0003E+00 | 1.5929E+00 | −6.8742E+00 | 1.6662E+01 | −3.6072E+00 |
| A14 = | 6.6831E+00 | 7.9012E+00 | 1.9414E+01 | −2.5987E+01 | 7.5603E+00 |
| A16 = | −6.7217E+00 | −1.6718E+01 | −2.6125E+01 | 2.5154E+01 | −8.5351E+00 |
| A18 = | 3.7358E+00 | 1.3610E+01 | 1.7889E+01 | −1.3740E+01 | 5.1790E+00 |
| A20 = | −8.8727E−01 | −4.1239E+00 | −4.9336E+00 | 3.2905E+00 | −1.3157E+00 |

| | Surface # | | | | |
|---|---|---|---|---|---|
| | 6 | 7 | 8 | 9 | 10 |
| k = | −9.0000E+01 | −1.8020E+01 | 0.0000E+00 | −1.7874E+01 | −4.1394E+01 |
| A4 = | 2.1519E−01 | 1.6876E−01 | −1.3495E−01 | −2.4936E−01 | 1.5251E−02 |
| A6 = | −1.3982E+00 | −1.2097E+00 | 6.8617E−02 | 3.5163E−01 | −5.9718E−01 |
| A8 = | 4.0526E+00 | 3.7340E+00 | −4.2533E−02 | −8.4699E−01 | 1.2067E+00 |
| A10 = | −8.3118E+00 | −8.1507E+00 | −2.6374E−01 | 1.7223E+00 | −1.4605E+00 |
| A12 = | 1.2229E+01 | 1.2360E+01 | 6.0786E−01 | −2.5677E+00 | 1.1196E+00 |
| A14 = | −1.2367E+01 | −1.2554E+01 | −6.4038E−01 | 2.4181E+00 | −5.6323E−01 |
| A16 = | 7.9708E+00 | 7.9994E+00 | 3.8051E−01 | −1.3624E+00 | 1.8612E−01 |
| A18 = | −2.8796E+00 | −2.8428E+00 | −1.2405E−01 | 4.2754E−01 | −3.6876E−02 |
| A20 = | 4.3498E−01 | 4.2559E−01 | 1.7558E−02 | −5.8473E−02 | 3.3047E−03 |

| | Surface # | | | |
|---|---|---|---|---|
| | 11 | 12 | 13 | 14 |
| k = | −4.1393E+01 | −1.1936E+01 | 4.7041E+00 | −4.2107E+00 |
| A4 = | 8.5400E−02 | 5.2106E−02 | −2.2569E−01 | −2.8072E−01 |
| A6 = | −2.9201E−01 | −7.8041E−02 | −1.0191E−01 | 2.1935E−01 |
| A8 = | 3.2632E−02 | −7.6582E−02 | 3.2903E−01 | −1.1999E−01 |
| A10 = | 5.1046E−01 | 2.0714E−01 | −3.1515E−01 | 4.5902E−02 |
| A12 = | −8.0466E−01 | −1.8080E−01 | 1.7202E−01 | −1.2192E−02 |
| A14 = | 6.1278E−01 | 8.5092E−02 | −5.5769E−02 | 2.1940E−03 |
| A16 = | −2.6184E−01 | −2.2837E−02 | 1.0525E−02 | −2.5504E−04 |
| A18 = | 5.9643E−02 | 3.2789E−03 | −1.0655E−03 | 1.7242E−05 |
| A20 = | −5.5773E−03 | −1.9549E−04 | 4.4637E−05 | −5.1239E−07 |

In the 9th embodiment, the equation of the aspheric surface profiles of the aforementioned lens elements is the same as the equation of the 1st embodiment. Also, the definitions of these parameters shown in the following table are the same as those stated in the 1st embodiment with corresponding values for the 9th embodiment, so an explanation in this regard will not be provided again.

Moreover, these parameters can be calculated from Table 17 and Table 18 as the following values and satisfy the following conditions:

| 9th Embodiment | | | |
|---|---|---|---|
| f [mm] | 3.76 | T67/T12 | 10.82 |
| Fno | 1.95 | T67/T23 | 1.58 |
| HFOV [deg.] | 40.5 | T67/T34 | 13.91 |
| Nmax | 1.671 | T67/T45 | 1.60 |
| V2 + V3 + V4 | 131.2 | T67/T56 | 3.38 |
| V40 | 4 | Td/ΣCT | 1.52 |
| V30 | 4 | TL/ImgH | 1.49 |
| V20 | 2 | |f1/f2| | 0.40 |
| R2/CT1 | 13.83 | |(f1/ImgH) × (TL/f2)| | 0.59 |

-continued

| 9th Embodiment | | | |
|---|---|---|---|
| f/R8 | 0.00 | f × (|f1| + |f2|)/(|f1| × |f2|) | 0.84 |
| f/R10 | 1.54 | |f/f6| + |f/f7| | 3.34 |
| (f/R8) + (f/R10) | 1.54 | — | — |

10th Embodiment

Figure 19:
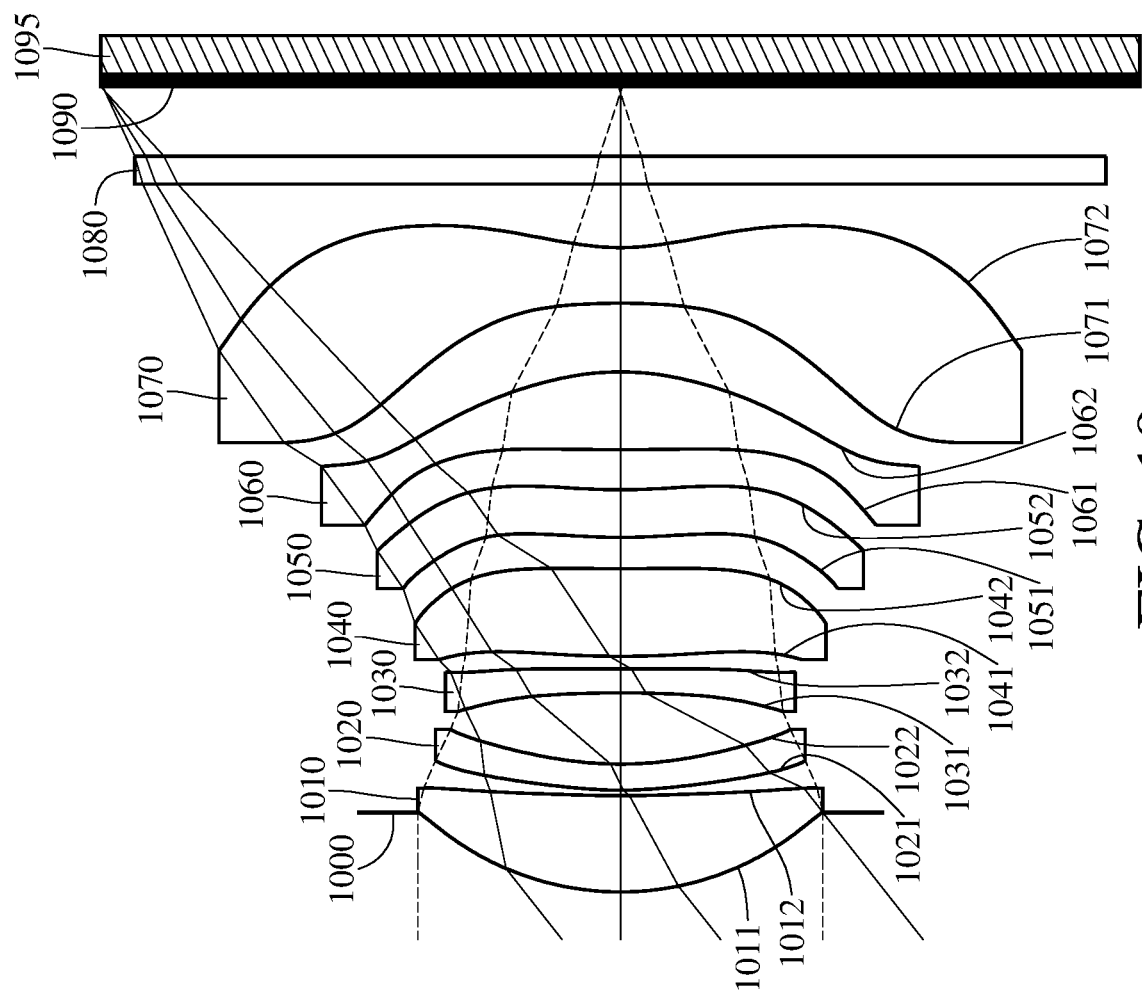
FIG. 19 is a schematic view of an image capturing unit according to the 10th embodiment of the present disclosure.
Figure 20:
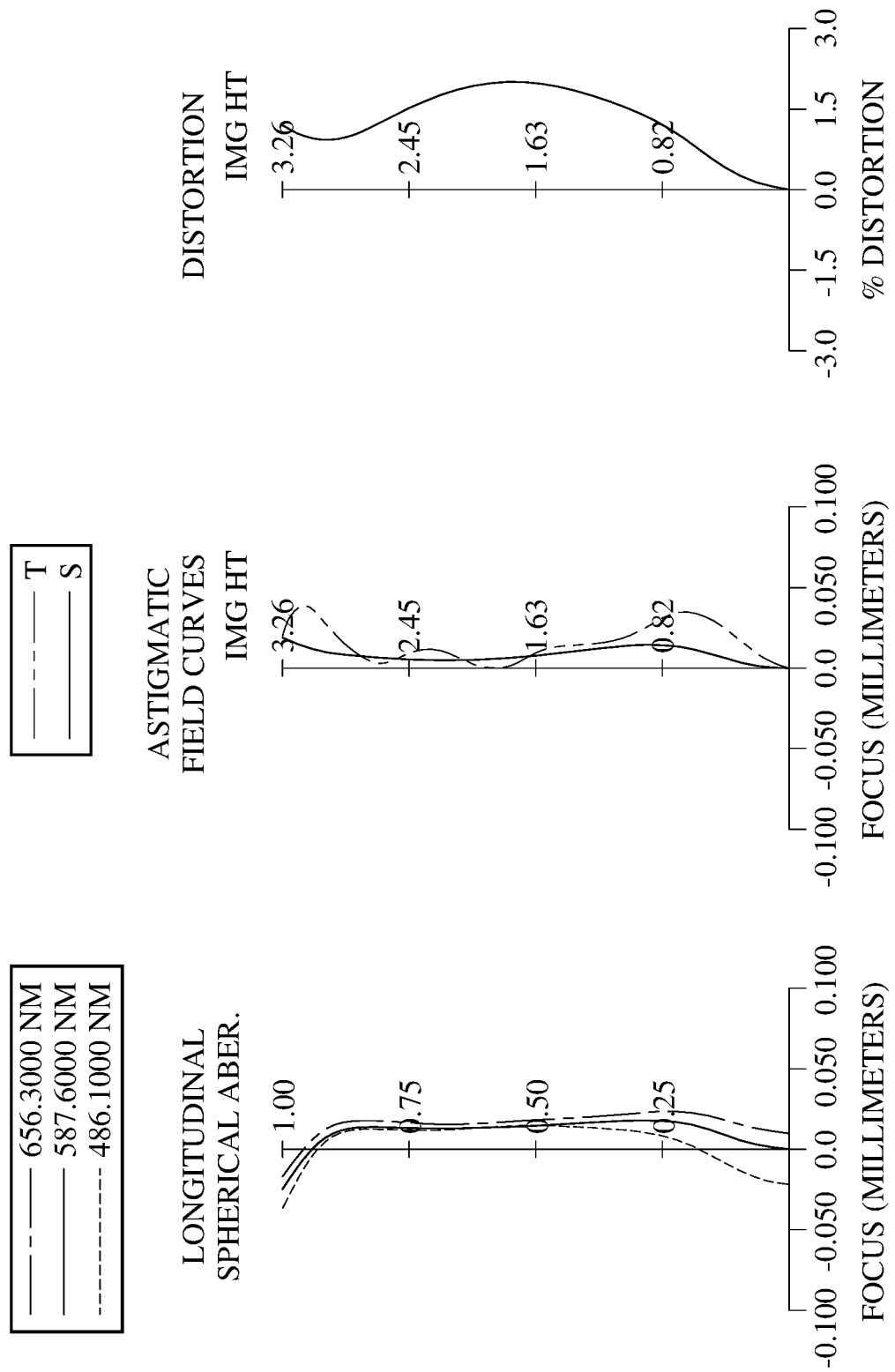
FIG. 20 shows spherical aberration curves, astigmatic field curves and a distortion curve of the image capturing unit according to the 10th embodiment.

FIG. 19 is a schematic view of an image capturing unit according to the 10th embodiment of the present disclosure. FIG. 20 shows, in order from left to right, spherical aberration curves, astigmatic field curves and a distortion curve of the image capturing unit according to the 10th embodiment. In FIG. 19, the image capturing unit includes the imaging lens assembly (its reference numeral is omitted) of the present disclosure and an image sensor 1095. The imaging lens assembly includes, in order from an object side to an image side, an aperture stop 1000, a first lens element 1010, a second lens element 1020, a third lens element 1030, a fourth lens element 1040, a fifth lens element 1050, a sixth lens element 1060, a seventh lens element 1070, an IR-cut filter 1080 and an image surface 1090. The imaging lens assembly includes seven lens elements (1010, 1020, 1030, 1040, 1050, 1060 and 1070) with no additional lens element disposed between each of the adjacent seven lens elements.

The first lens element 1010 with positive refractive power has an object-side surface 1011 being convex in a paraxial region thereof and an image-side surface 1012 being concave in a paraxial region thereof. The first lens element 1010 is made of plastic material and has the object-side surface 1011 and the image-side surface 1012 being both aspheric.

The second lens element 1020 with negative refractive power has an object-side surface 1021 being convex in a paraxial region thereof and an image-side surface 1022 being concave in a paraxial region thereof. The second lens element 1020 is made of plastic material and has the object-side surface 1021 and the image-side surface 1022 being both aspheric.

The third lens element 1030 with negative refractive power has an object-side surface 1031 being concave in a paraxial region thereof and an image-side surface 1032 being concave in a paraxial region thereof. The third lens element 1030 is made of plastic material and has the object-side surface 1031 and the image-side surface 1032 being both aspheric.

The fourth lens element 1040 with positive refractive power has an object-side surface 1041 being convex in a paraxial region thereof and an image-side surface 1042 being concave in a paraxial region thereof. The fourth lens element 1040 is made of plastic material and has the object-side surface 1041 and the image-side surface 1042 being both aspheric. The image-side surface 1042 of the fourth lens element 1040 has at least one inflection point.

The fifth lens element 1050 with positive refractive power has an object-side surface 1051 being convex in a paraxial region thereof and an image-side surface 1052 being concave in a paraxial region thereof. The fifth lens element 1050 is made of plastic material and has the object-side surface 1051 and the image-side surface 1052 being both aspheric. The image-side surface 1052 of the fifth lens element 1050 has at least one inflection point.

The sixth lens element 1060 with positive refractive power has an object-side surface 1061 being convex in a paraxial region thereof and an image-side surface 1062 being convex in a paraxial region thereof. The sixth lens element 1060 is made of plastic material and has the object-side surface 1061 and the image-side surface 1062 being both aspheric.

The seventh lens element 1070 with negative refractive power has an object-side surface 1071 being concave in a paraxial region thereof and an image-side surface 1072 being concave in a paraxial region thereof. The seventh lens element 1070 is made of plastic material and has the object-side surface 1071 and the image-side surface 1072 being both aspheric. The image-side surface 1072 of the seventh lens element 1070 has at least one convex shape in an off-axis region thereof.

The IR-cut filter 1080 is made of glass material and located between the seventh lens element 1070 and the image surface 1090, and will not affect the focal length of the imaging lens assembly. The image sensor 1095 is disposed on or near the image surface 1090 of the imaging lens assembly.

The detailed optical data of the 10th embodiment are shown in Table 19 and the aspheric surface data are shown in Table 20 below.

TABLE 19

10th embodiment
f = 4.08 mm, Fno = 1.60, HFOV = 38.2 deg.

| Surface # | | Curvature Radius | | Thickness | Material | Index | Abbe # | Focal Length |
|---|---|---|---|---|---|---|---|---|
| 0 | Object | Plano | | Infinity | | | | |
| 1 | Ape. Stop | Plano | | −0.499 | | | | |
| 2 | Lens 1 | 1.838 | (ASP) | 0.606 | Plastic | 1.545 | 56.0 | 4.66 |
| 3 | | 5.890 | (ASP) | 0.035 | | | | |
| 4 | Lens 2 | 2.474 | (ASP) | 0.164 | Plastic | 1.660 | 20.4 | −40.62 |
| 5 | | 2.205 | (ASP) | 0.449 | | | | |
| 6 | Lens 3 | −7.780 | (ASP) | 0.150 | Plastic | 1.671 | 19.3 | −10.13 |
| 7 | | 54.055 | (ASP) | 0.080 | | | | |
| 8 | Lens 4 | 5.637 | (ASP) | 0.552 | Plastic | 1.544 | 55.9 | 16.57 |
| 9 | | 14.548 | (ASP) | 0.197 | | | | |
| 10 | Lens 5 | 3.577 | (ASP) | 0.300 | Plastic | 1.639 | 23.5 | 85.30 |
| 11 | | 3.703 | (ASP) | 0.253 | | | | |
| 12 | Lens 6 | 24.620 | (ASP) | 0.490 | Plastic | 1.544 | 55.9 | 2.78 |
| 13 | | −1.599 | (ASP) | 0.432 | | | | |
| 14 | Lens 7 | −5.324 | (ASP) | 0.350 | Plastic | 1.515 | 56.5 | −2.31 |
| 15 | | 1.562 | (ASP) | 0.400 | | | | |
| 16 | IR-cut filter | Plano | | 0.175 | Glass | 1.517 | 64.2 | — |

TABLE 19-continued

10th embodiment
f = 4.08 mm, Fno = 1.60, HFOV = 38.2 deg.

| Surface # | | Curvature Radius | Thickness | Material | Index | Abbe # | Focal Length |
|---|---|---|---|---|---|---|---|
| 17 | | Plano | 0.438 | | | | |
| 18 | Image | Plano | — | | | | |

Note:
Reference wavelength is 587.6 nm (d-line).
An effective radius of the image-side surface 1032 (Surface 7) is 1.100 mm.
An effective radius of the image-side surface 1062 (Surface 13) is 1.880 mm.

TABLE 20

Aspheric Coefficients

| | Surface # | | | | |
|---|---|---|---|---|---|
| | 2 | 3 | 4 | 5 | 6 |
| k = | −2.3827E−01 | 9.9482E+00 | −2.9061E+00 | −2.4912E+00 | −1.4008E+01 |
| A4 = | 1.2247E−02 | −2.9910E−01 | −3.3501E−01 | −8.4918E−02 | −1.6571E−02 |
| A6 = | −4.2449E−02 | 9.9842E−01 | 1.0039E+00 | 3.9769E−02 | −9.1022E−02 |
| A8 = | 1.8282E−01 | −2.3395E+00 | −2.3202E+00 | 5.4892E−01 | −3.4832E−02 |
| A10 = | −4.3814E−01 | 3.8194E+00 | 4.0551E+00 | −2.4483E−01 | 5.8958E−01 |
| A12 = | 6.4697E−01 | −4.2774E+00 | −5.0831E+00 | 5.5019E+00 | −1.4209E+00 |
| A14 = | −5.9296E−01 | 3.2010E+00 | 4.3871E+00 | −7.3770E+00 | 1.7527E+00 |
| A16 = | 3.2733E−01 | −1.5269E+00 | −2.4540E+00 | 5.9403E+00 | −1.1881E+00 |
| A18 = | −9.9221E−02 | 4.1923E−01 | 7.9617E−01 | −2.6561E+00 | 4.1596E−01 |
| A20 = | 1.2518E−02 | −5.0434E−02 | −1.1269E−01 | 5.1035E−01 | −5.7060E−02 |

| | Surface # | | | | |
|---|---|---|---|---|---|
| | 7 | 8 | 9 | 10 | 11 |
| k = | −9.0000E+01 | −1.8266E+01 | −9.9000E+01 | −1.3212E+01 | −6.3629E+01 |
| A4 = | 9.6373E−03 | −3.6182E−02 | −1.3947E−01 | −2.4483E−01 | −7.0539E−02 |
| A6 = | −2.4158E−01 | 4.6047E−02 | 1.4475E−01 | 3.1261E−01 | −2.0920E−01 |
| A8 = | 5.3176E−01 | −6.3754E−01 | −3.0950E−01 | −7.6151E−01 | 4.6481E−01 |
| A10 = | −7.7880E−01 | 2.1777E+00 | 4.1579E−01 | 1.5640E+00 | −5.4872E−01 |
| A12 = | 7.7700E−01 | −4.2185E+00 | −5.2875E−01 | −2.3116E+00 | 3.4233E−01 |
| A14 = | −3.9518E−01 | 4.9869E+00 | 5.3428E−01 | 2.1303E+00 | −8.9887E−02 |
| A16 = | −6.3412E−03 | −3.5521E+00 | −3.4282E−01 | −1.1455E+00 | −8.6594E−03 |
| A18 = | 1.1031E−01 | 1.4011E+00 | 1.2123E−01 | 3.3087E−01 | 9.8455E−03 |
| A20 = | −3.8001E−02 | −2.3496E−01 | −1.8183E−02 | −3.9948E−02 | −1.5230E−03 |

| | Surface # | | | |
|---|---|---|---|---|
| | 12 | 13 | 14 | 15 |
| k = | 7.2527E+01 | −5.5473E+00 | 1.4219E+00 | −6.2812E+00 |
| A4 = | −4.0872E−04 | 1.1137E−02 | −1.7724E−01 | −1.7016E−01 |
| A6 = | −1.1522E−01 | −9.8752E−02 | −1.9736E−02 | 1.1642E−01 |
| A8 = | −6.7170E−03 | 8.2858E−02 | 1.4756E−01 | −5.8387E−02 |
| A10 = | 2.7509E−01 | −1.4617E−02 | −1.3874E−01 | 2.0433E−02 |
| A12 = | −4.3650E−01 | −2.4394E−02 | 6.9299E−02 | −5.0091E−03 |
| A14 = | 3.4326E−01 | 2.1204E−02 | −2.0077E−02 | 8.3915E−04 |
| A16 = | −1.5079E−01 | −7.4682E−03 | 3.3688E−03 | −9.1279E−05 |
| A18 = | 3.5086E−02 | 1.2490E−03 | −3.0439E−04 | 5.7563E−06 |
| A20 = | −3.3547E−03 | −8.1600E−05 | 1.1485E−05 | −1.5699E−07 |

In the 10th embodiment, the equation of the aspheric surface profiles of the aforementioned lens elements is the same as the equation of the 1st embodiment. Also, the definitions of these parameters shown in the following table are the same as those stated in the 1st embodiment with corresponding values for the 10th embodiment, so an explanation in this regard will not be provided again.

Moreover, these parameters can be calculated from Table 19 and Table 20 as the following values and satisfy the following conditions:

| 10th Embodiment | | | |
|---|---|---|---|
| f [mm] | 4.08 | T67/T12 | 12.34 |
| Fno | 1.60 | T67/T23 | 0.96 |
| HFOV [deg.] | 38.2 | T67/T34 | 5.40 |
| Nmax | 1.671 | T67/T45 | 2.19 |
| V2 + V3 + V4 | 95.6 | T67/T56 | 1.71 |
| V40 | 3 | Td/ΣCT | 1.55 |
| V30 | 3 | TL/ImgH | 1.56 |
| V20 | 1 | f1/|f2| | 0.11 |

-continued

| 10th Embodiment | | | |
|---|---|---|---|
| R2/CT1 | 9.72 | \|(f1/ImgH) × (TL/f2)\| | 0.18 |
| f/R8 | 0.28 | f × (\|f1\| + \|f2\|)/(\|f1\| × \|f2\|) | 0.98 |
| f/R10 | 1.10 | \|f/f6\| + \|f/f7\| | 3.23 |
| (f/R8) + (f/R10) | 1.38 | — | — |

11th Embodiment

Figure 21:
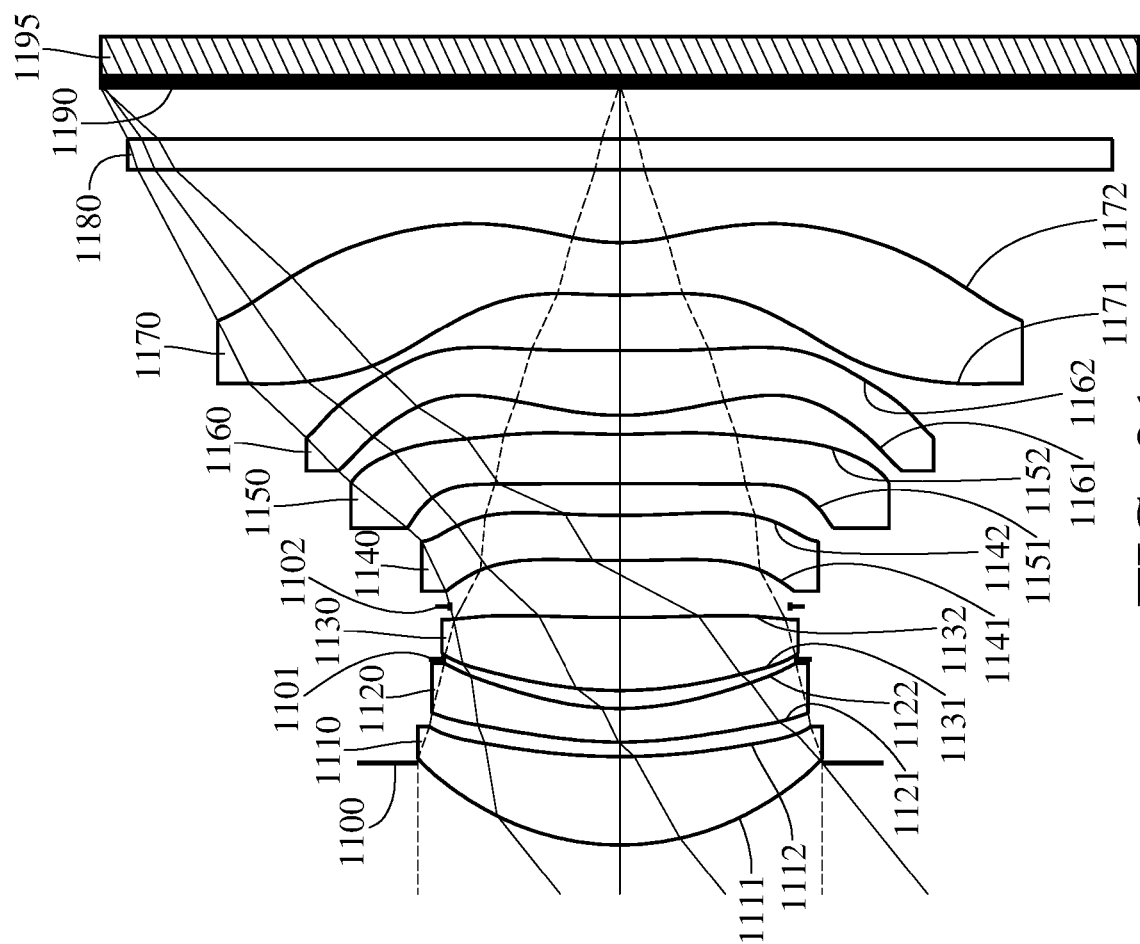
FIG. 21 is a schematic view of an image capturing unit according to the 11th embodiment of the present disclosure.
Figure 22:
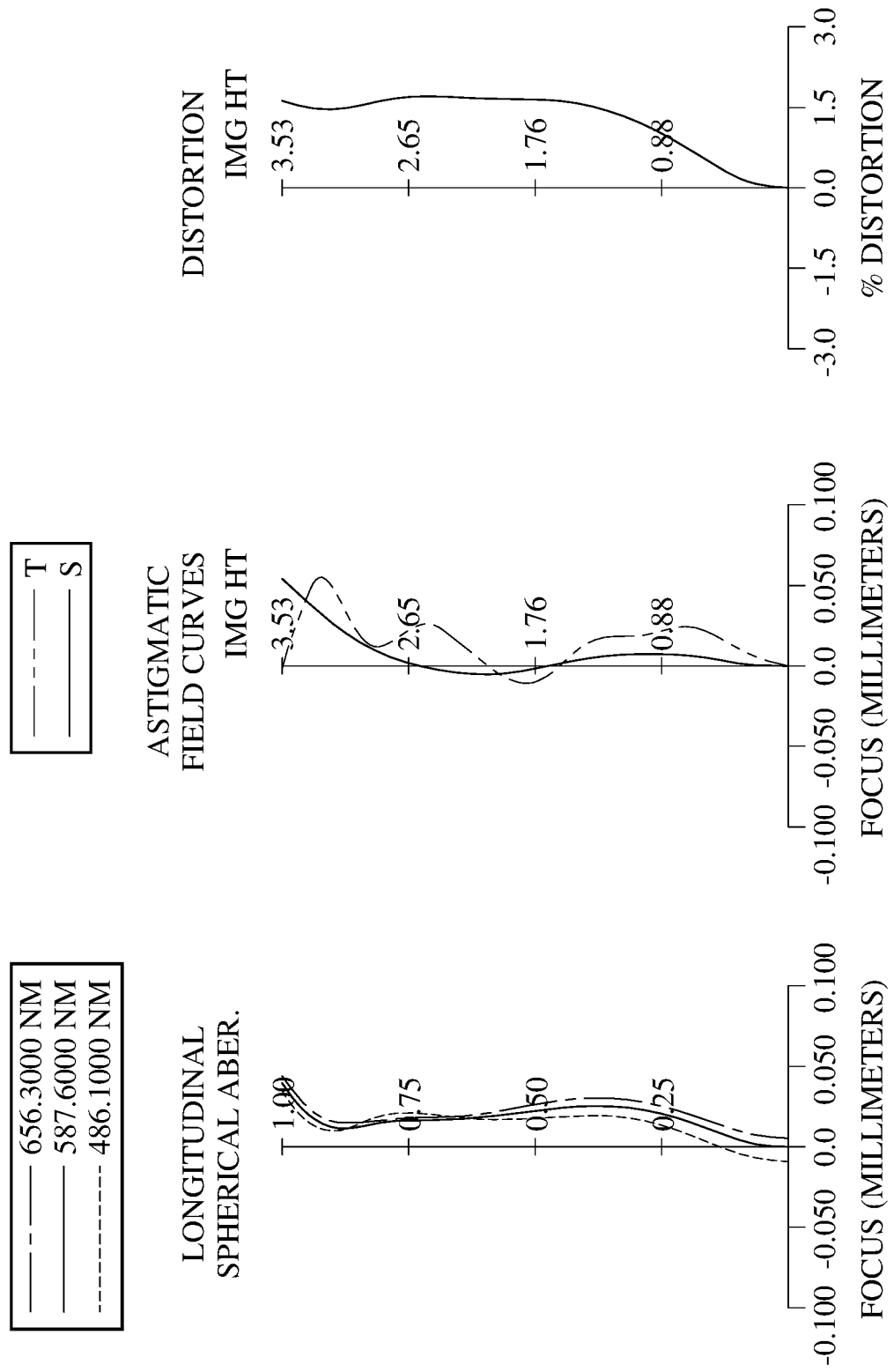
FIG. 22 shows spherical aberration curves, astigmatic field curves and a distortion curve of the image capturing unit according to the 11th embodiment.

FIG. 21 is a schematic view of an image capturing unit according to the 11th embodiment of the present disclosure. FIG. 22 shows, in order from left to right, spherical aberration curves, astigmatic field curves and a distortion curve of the image capturing unit according to the 11th embodiment. In FIG. 21, the image capturing unit includes the imaging lens assembly (its reference numeral is omitted) of the present disclosure and an image sensor 1195. The imaging lens assembly includes, in order from an object side to an image side, an aperture stop 1100, a first lens element 1110, a second lens element 1120, a stop 1101, a third lens element 1130, a stop 1102, a fourth lens element 1140, a fifth lens element 1150, a sixth lens element 1160, a seventh lens element 1170, an IR-cut filter 1180 and an image surface 1190. The imaging lens assembly includes seven lens elements (1110, 1120, 1130, 1140, 1150, 1160 and 1170) with no additional lens element disposed between each of the adjacent seven lens elements.

The first lens element 1110 with positive refractive power has an object-side surface 1111 being convex in a paraxial region thereof and an image-side surface 1112 being concave in a paraxial region thereof. The first lens element 1110 is made of plastic material and has the object-side surface 1111 and the image-side surface 1112 being both aspheric.

The second lens element 1120 with negative refractive power has an object-side surface 1121 being convex in a paraxial region thereof and an image-side surface 1122 being concave in a paraxial region thereof. The second lens element 1120 is made of plastic material and has the object-side surface 1121 and the image-side surface 1122 being both aspheric.

The third lens element 1130 with positive refractive power has an object-side surface 1131 being convex in a paraxial region thereof and an image-side surface 1132 being concave in a paraxial region thereof. The third lens element 1130 is made of plastic material and has the object-side surface 1131 and the image-side surface 1132 being both aspheric.

The fourth lens element 1140 with negative refractive power has an object-side surface 1141 being convex in a paraxial region thereof and an image-side surface 1142 being concave in a paraxial region thereof. The fourth lens element 1140 is made of plastic material and has the object-side surface 1141 and the image-side surface 1142 being both aspheric. The image-side surface 1142 of the fourth lens element 1140 has at least one inflection point.

The fifth lens element 1150 with negative refractive power has an object-side surface 1151 being convex in a paraxial region thereof and an image-side surface 1152 being concave in a paraxial region thereof. The fifth lens element 1150 is made of plastic material and has the object-side surface 1151 and the image-side surface 1152 being both aspheric. The image-side surface 1152 of the fifth lens element 1150 has at least one inflection point.

The sixth lens element 1160 with positive refractive power has an object-side surface 1161 being convex in a paraxial region thereof and an image-side surface 1162 being convex in a paraxial region thereof. The sixth lens element 1160 is made of plastic material and has the object-side surface 1161 and the image-side surface 1162 being both aspheric.

The seventh lens element 1170 with negative refractive power has an object-side surface 1171 being convex in a paraxial region thereof and an image-side surface 1172 being concave in a paraxial region thereof. The seventh lens element 1170 is made of plastic material and has the object-side surface 1171 and the image-side surface 1172 being both aspheric. The image-side surface 1172 of the seventh lens element 1170 has at least one convex shape in an off-axis region thereof.

The IR-cut filter 1180 is made of glass material and located between the seventh lens element 1170 and the image surface 1190, and will not affect the focal length of the imaging lens assembly. The image sensor 1195 is disposed on or near the image surface 1190 of the imaging lens assembly.

The detailed optical data of the 11th embodiment are shown in Table 21 and the aspheric surface data are shown in Table 22 below.

TABLE 21

11th embodiment
f = 4.32 mm, Fno = 1.56, HFOV = 38.7 deg.

| Surface # | | Curvature Radius | | Thickness | Material | Index | Abbe # | Focal Length |
|---|---|---|---|---|---|---|---|---|
| 0 | Object | Plano | | Infinity | | | | |
| 1 | Ape. Stop | Plano | | −0.560 | | | | |
| 2 | Lens 1 | 1.868 | (ASP) | 0.605 | Plastic | 1.545 | 56.0 | 5.53 |
| 3 | | 4.355 | (ASP) | 0.099 | | | | |
| 4 | Lens 2 | 2.849 | (ASP) | 0.230 | Plastic | 1.669 | 19.4 | −8.51 |
| 5 | | 1.837 | (ASP) | 0.336 | | | | |
| 6 | Stop | Plano | | −0.213 | | | | |
| 7 | Lens 3 | 2.711 | (ASP) | 0.500 | Plastic | 1.544 | 56.0 | 6.62 |
| 8 | | 10.257 | (ASP) | 0.076 | | | | |
| 9 | Stop | Plano | | 0.314 | | | | |
| 10 | Lens 4 | 7.974 | (ASP) | 0.309 | Plastic | 1.669 | 19.4 | −33.10 |
| 11 | | 5.772 | (ASP) | 0.218 | | | | |
| 12 | Lens 5 | 100.000 | (ASP) | 0.338 | Plastic | 1.587 | 32.3 | −9.24 |
| 13 | | 5.137 | (ASP) | 0.130 | | | | |
| 14 | Lens 6 | 1.981 | (ASP) | 0.443 | Plastic | 1.564 | 41.2 | 3.45 |

TABLE 21-continued

11th embodiment
f = 4.32 mm, Fno = 1.56, HFOV = 38.7 deg.

| Surface # | | Curvature Radius | | Thickness | Material | Index | Abbe # | Focal Length |
|---|---|---|---|---|---|---|---|---|
| 15 | | −100.000 | (ASP) | 0.384 | | | | |
| 16 | Lens 7 | 3.826 | (ASP) | 0.360 | Plastic | 1.544 | 56.0 | −3.81 |
| 17 | | 1.299 | (ASP) | 0.500 | | | | |
| 18 | IR-cut filter | Plano | | 0.210 | Glass | 1.517 | 64.2 | — |
| 19 | | Plano | | 0.350 | | | | |
| 20 | Image | Plano | | — | | | | |

Note:
Reference wavelength is 587.6 nm (d-line).
An effective radius of the stop 1101 (Surface 6) is 1.210 mm.
An effective radius of the stop 1102 (Surface 9) is 1.165 mm.

TABLE 22

Aspheric Coefficients

| | Surface # | | | | |
|---|---|---|---|---|---|
| | 2 | 3 | 4 | 5 | 7 |
| k = | −3.1266E−01 | 8.0848E+00 | −2.7518E+01 | −1.2494E+01 | −6.5584E+00 |
| A4 = | 1.2444E−03 | −6.4948E−02 | −2.5073E−02 | 4.0990E−02 | −4.3069E−02 |
| A6 = | 6.4151E−03 | 1.6207E−01 | 2.2089E−01 | 1.3173E−01 | 1.3203E−01 |
| A8 = | −4.9901E−03 | −2.5491E−01 | −4.4071E−01 | −3.1279E−01 | −1.2548E−01 |
| A10 = | 2.8172E−03 | 1.7436E−01 | 3.6633E−01 | 2.2985E−01 | −7.9439E−03 |
| A12 = | −3.3543E−03 | −5.3623E−02 | −1.3158E−01 | −4.4975E−02 | 6.1170E−02 |
| A14 = | 1.3617E−03 | 6.6142E−03 | 1.6561E−02 | −5.8835E−03 | −1.8450E−02 |

| | Surface # | | | | |
|---|---|---|---|---|---|
| | 8 | 10 | 11 | 12 | 13 |
| k = | 5.2001E+01 | 4.0508E+00 | 9.1591E+00 | −9.0000E+01 | −2.9279E+01 |
| A4 = | −6.5122E−02 | −1.5798E−01 | −1.0365E−01 | −5.7084E−02 | −2.6978E−01 |
| A6 = | 5.4374E−02 | 1.7549E−01 | 2.7919E−02 | 1.0675E−01 | 2.4321E−01 |
| A8 = | −9.9357E−02 | −6.2656E−01 | −1.1819E−01 | −2.9938E−02 | −8.1365E−02 |
| A10 = | 1.0568E−01 | 1.0923E+00 | 1.4111E−01 | −9.6571E−02 | −4.1500E−03 |
| A12 = | −7.0780E−02 | −1.0481E+00 | −9.6268E−02 | 1.0194E−01 | 8.0896E−03 |
| A14 = | 2.1027E−02 | 5.1905E−01 | 3.4908E−02 | −4.4682E−02 | −1.4720E−03 |
| A16 = | — | −1.0249E−01 | −4.3368E−03 | 7.3838E−03 | 5.6492E−05 |

| | Surface # | | | |
|---|---|---|---|---|
| | 14 | 15 | 16 | 17 |
| k = | −1.6568E+00 | 9.0000E+01 | −1.3808E+01 | −7.1366E+00 |
| A4 = | −1.1793E−01 | 1.1850E−01 | −4.2666E−01 | −2.0832E−01 |
| A6 = | 3.8362E−02 | −1.2257E−01 | 3.3655E−01 | 1.5108E−01 |
| A8 = | −8.3772E−02 | 1.0401E−02 | −1.9857E−01 | −8.0431E−02 |
| A10 = | 1.2626E−01 | 5.1439E−02 | 8.8029E−02 | 2.9512E−02 |
| A12 = | −1.1466E−01 | −4.7628E−02 | −2.6057E−02 | −7.1023E−03 |
| A14 = | 5.9719E−02 | 2.1002E−02 | 4.8843E−03 | 1.0816E−03 |
| A16 = | −1.7329E−02 | −4.9973E−03 | −5.5585E−04 | −9.9502E−05 |
| A18 = | 2.6048E−03 | 6.1117E−04 | 3.5073E−05 | 5.0182E−06 |
| A20 = | −1.5801E−04 | −3.0080E−05 | −9.4214E−07 | −1.0595E−07 |

In the 11th embodiment, the equation of the aspheric surface profiles of the aforementioned lens elements is the same as the equation of the 1st embodiment. Also, the definitions of these parameters shown in the following table are the same as those stated in the 1st embodiment with corresponding values for the 11th embodiment, so an explanation in this regard will not be provided again.

Moreover, these parameters can be calculated from Table 21 and Table 22 as the following values and satisfy the following conditions:

| 11th Embodiment | | | |
|---|---|---|---|
| f [mm] | 4.32 | T67/T12 | 3.88 |
| Fno | 1.56 | T67/T23 | 3.12 |
| HFOV [deg.] | 38.7 | T67/T34 | 0.98 |
| Nmax | 1.669 | T67/T45 | 1.76 |
| V2 + V3 + V4 | 94.8 | T67/T56 | 2.95 |
| V40 | 3 | Td/ΣCT | 1.48 |
| V30 | 2 | TL/ImgH | 1.47 |
| V20 | 2 | f1/\|f2\| | 0.65 |
| R2/CT1 | 7.20 | \|(f1/ImgH) × (TL/f2)\| | 0.96 |

-continued

| 11th Embodiment | | | |
|---|---|---|---|
| f/R8 | 0.75 | f × (|f1| + |f2|)/(|f1| × |f2|) | 1.29 |
| f/R10 | 0.84 | |f/f6| + |f/f7| | 2.39 |
| (f/R8) + (f/R10) | 1.59 | — | — |

12th Embodiment

Figure 23:
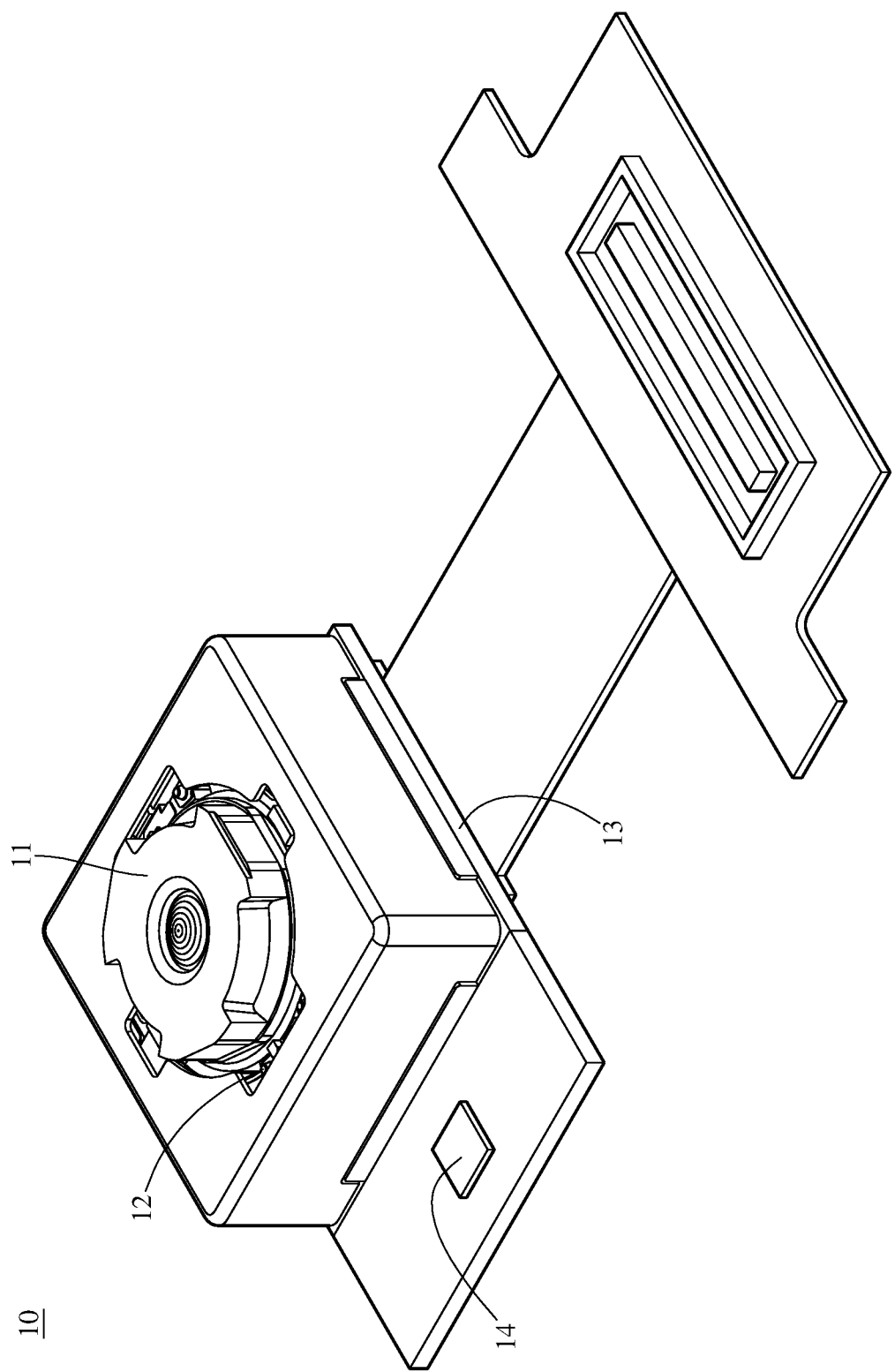
FIG. 23 is a perspective view of an image capturing unit according to the 12th embodiment of the present disclosure.

FIG. 23 is a perspective view of an image capturing unit according to the 12th embodiment of the present disclosure. In this embodiment, an image capturing unit 10 is a camera module including a lens unit 11, a driving device 12, an image sensor 13 and an image stabilizer 14. The lens unit 11 includes the imaging lens assembly disclosed in the 1st embodiment, a barrel and a holder member (their reference numerals are omitted) for holding the imaging lens assembly. The imaging light converges into the lens unit 11 of the image capturing unit 10 to generate an image with the driving device 12 utilized for focusing the image on the image sensor 13, and the generated image is then digitally transmitted to other electronic component for further processing.

The driving device 12 can have auto focusing functionality, and different driving configurations can be obtained through the usages of voice coil motors (VCM), micro electro-mechanical systems (MEMS), piezoelectric systems, or shape memory alloy materials. The driving device 12 is favorable for obtaining a better imaging position of the lens unit 11, so that a clear image of the imaged object can be captured by the lens unit 11 with different object distances. The image sensor 13 (for example, CCD or CMOS), which can feature high photosensitivity and low noise, is disposed on the image surface of the imaging lens assembly to provide higher image quality.

The image stabilizer 14, such as an accelerometer, a gyroscope and a Hall Effect sensor, is configured to work with the driving device 12 to provide optical image stabilization (OIS). The driving device 12 working with the image stabilizer 14 is favorable for compensating for pan and tilt of the lens unit 11 to reduce blurring associated with motion during exposure. In some cases, the compensation can be provided by electronic image stabilization (EIS) with image processing software, thereby improving the image quality while in motion or low-light conditions.

13th Embodiment

Figure 24:
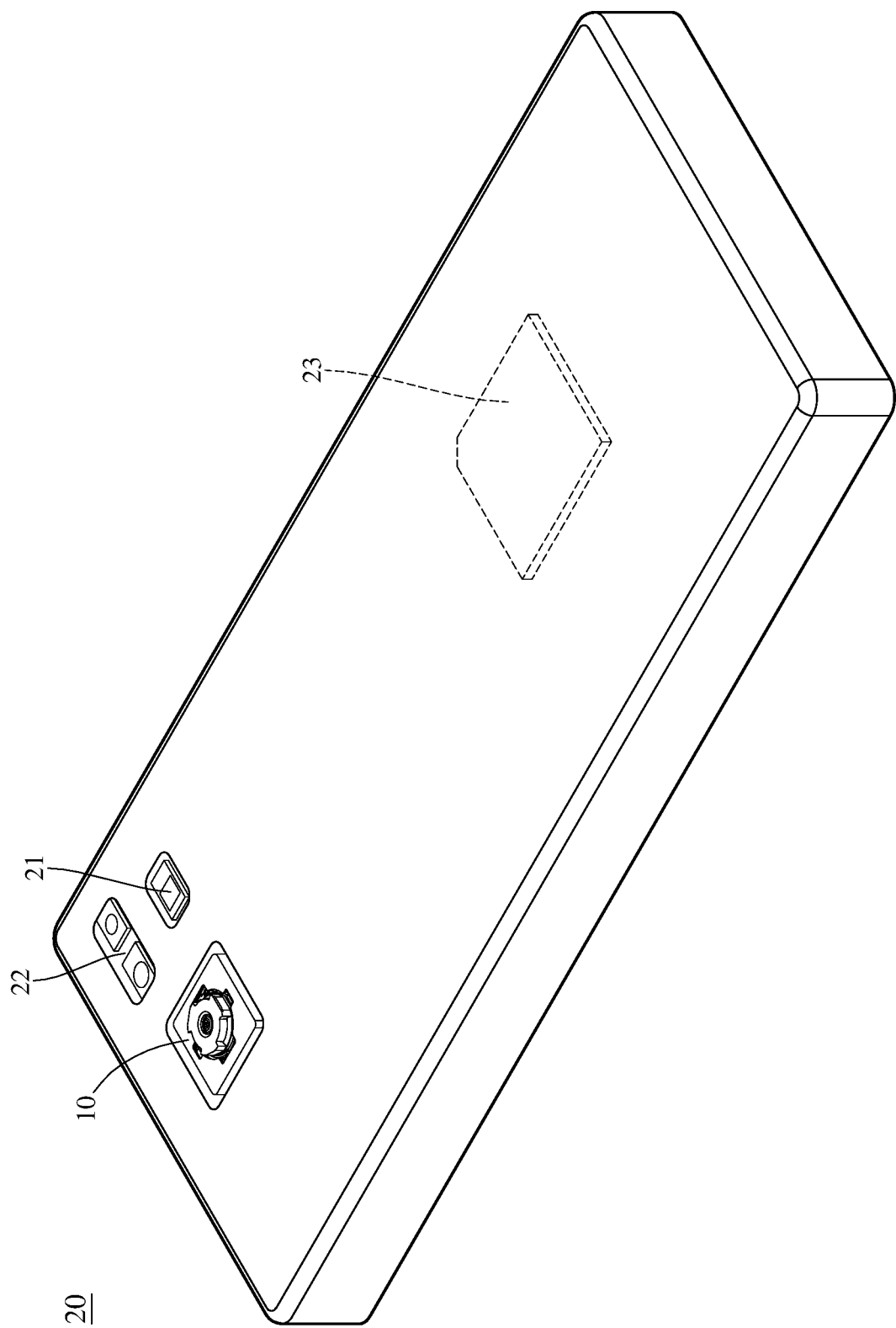
FIG. 24 is one perspective view of an electronic device according to the 13th embodiment of the present disclosure.
Figure 25:
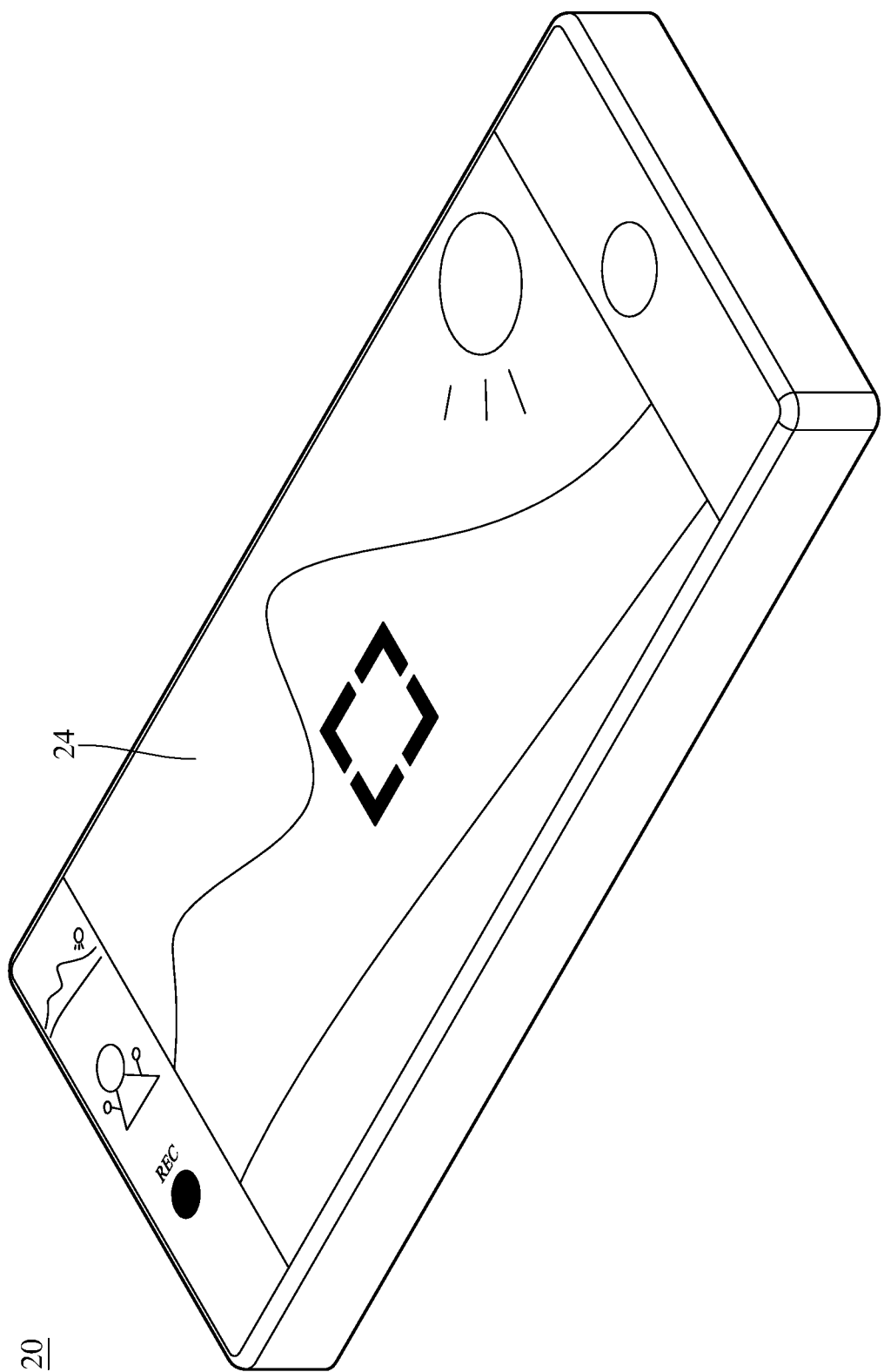
FIG. 25 is another perspective view of the electronic device in FIG. 24.
Figure 26:
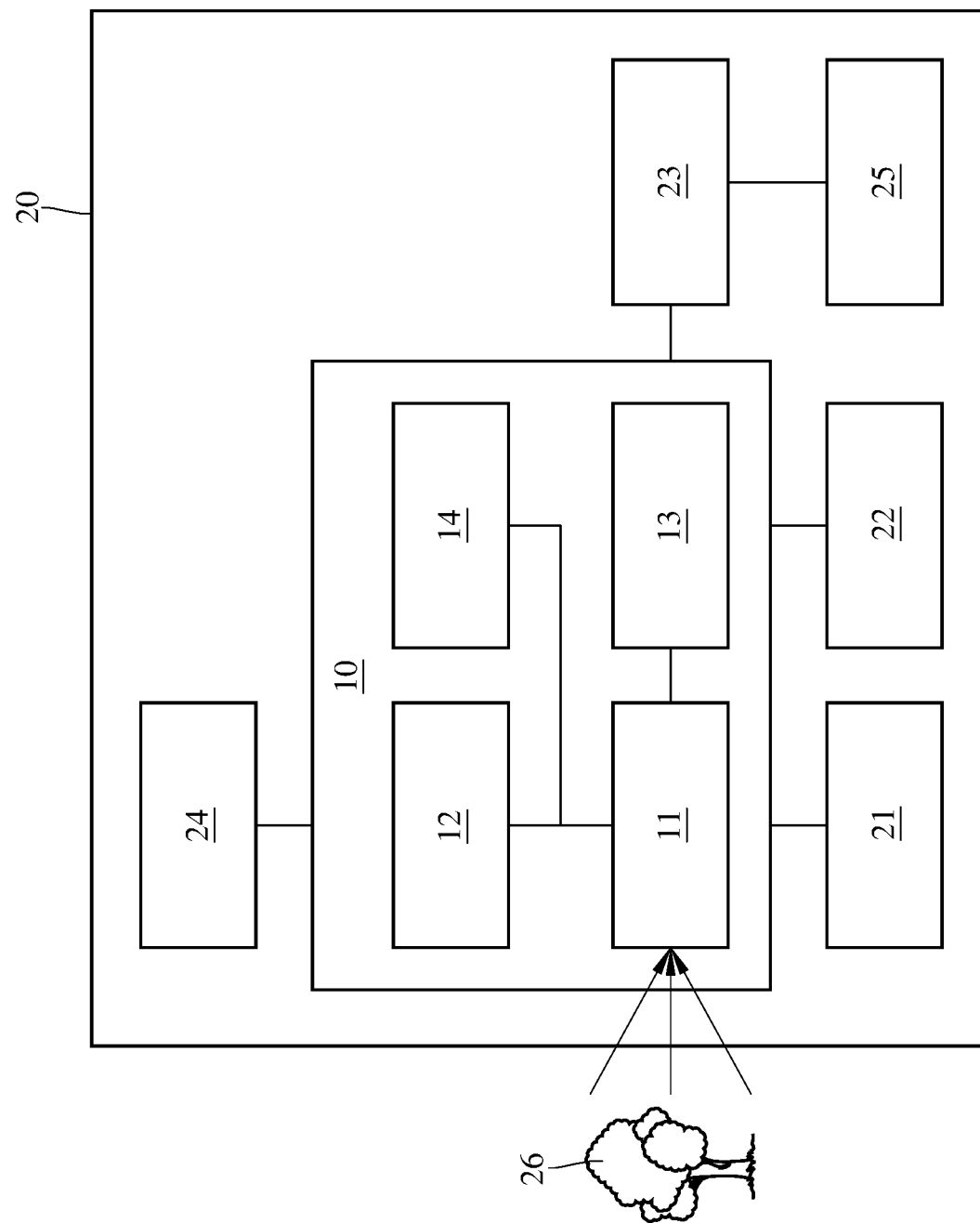
FIG. 26 is a block diagram of the electronic device in FIG. 24.

FIG. 24 is one perspective view of an electronic device according to the 13th embodiment of the present disclosure. FIG. 25 is another perspective view of the electronic device in FIG. 24. FIG. 26 is a block diagram of the electronic device in FIG. 24. In this embodiment, an electronic device 20 is a smartphone including the image capturing unit 10 disclosed in the 12th embodiment, a flash module 21, a focus assist module 22, an image signal processor 23, a user interface 24 and an image software processor 25. In this embodiment, the electronic device 20 includes one image capturing unit 10, but the disclosure is not limited thereto. In some cases, the electronic device 20 can include multiple image capturing units 10, or the electronic device 20 further includes another image capturing unit with different configurations.

When a user captures the images of an object 26 through the user interface 24, the light rays converge in the image capturing unit 10 to generate an image, and the flash module 21 is activated for light supplement. The focus assist module 22 detects the object distance of the imaged object 26 to achieve fast auto focusing. The image signal processor 23 is configured to optimize the captured image to improve the image quality. The light beam emitted from the focus assist module 22 can be either conventional infrared or laser. The user interface 24 can be a touch screen or a physical button. The user is able to interact with the user interface 24 and the image software processor 25 having multiple functions to capture images and complete image processing.

The smartphone in this embodiment is only exemplary for showing the image capturing unit 10 of the present disclosure installed in an electronic device, and the present disclosure is not limited thereto. The image capturing unit 10 can be optionally applied to optical systems with a movable focus. Furthermore, the imaging lens assembly of the image capturing unit 10 features good capability in aberration corrections and high image quality, and can be applied to 3D (three-dimensional) image capturing applications, in products such as digital cameras, mobile devices, digital tablets, smart televisions, network surveillance devices, dashboard cameras, vehicle backup cameras, multi-camera devices, image recognition systems, motion sensing input devices, wearable devices and other electronic imaging devices.

The foregoing description, for the purpose of explanation, has been described with reference to specific embodiments. It is to be noted that TABLES 1-22 show different data of the different embodiments; however, the data of the different embodiments are obtained from experiments. The embodiments were chosen and described in order to best explain the principles of the disclosure and its practical applications, to thereby enable others skilled in the art to best utilize the disclosure and various embodiments with various modifications as are suited to the particular use contemplated. The embodiments depicted above and the appended drawings are exemplary and are not intended to be exhaustive or to limit the scope of the present disclosure to the precise forms disclosed. Many modifications and variations are possible in view of the above teachings.

What is claimed is:

1. An imaging lens assembly comprising seven lens elements, the seven lens elements being, in order from an object side to an image side, a first lens element, a second lens element, a third lens element, a fourth lens element, a fifth lens element, a sixth lens element and a seventh lens element, the first lens element with positive refractive power having an object-side surface being convex in a paraxial region thereof and an image-side surface being concave in a paraxial region thereof, the sixth lens element having an object-side surface being convex in a paraxial region thereof, the seventh lens element having an image-side surface being concave in a paraxial region thereof, the image-side surface of the seventh lens element having at least one convex shape in an off-axis region thereof, and an object-side surface and the image-side surface of the seventh lens element being both aspheric;

wherein at least one of an image-side surface of the fourth lens element and an image-side surface of the fifth lens element has at least one inflection point, a focal length of the imaging lens assembly is f, a curvature radius of the image-side surface of the fourth lens element is R8, a curvature radius of the image-side surface of the fifth lens element is R10, an axial distance between the object-side surface of the first lens element and the image-side surface of the seventh lens element is Td, a sum of central thicknesses of the seven lens elements of the imaging lens assembly is ΣCT, a focal length of the sixth lens element is f6, a focal length of the seventh lens element is t7, an axial distance between the third lens element and the fourth lens element is T34, an axial distance between the sixth lens element and the seventh lens element is T67, and the following conditions are satisfied:

$0 \leq f/R8;$ $0 \leq f/R10,$ $Td/\Sigma CT < 1.65;$ $1.10 < |f/f6| + |f/7|;$ and $1.0 < T67/T34.$ 2. The imaging lens assembly of claim 1, wherein a focal length of the first lens element is f1, a focal length of the second lens element is f2, and the following condition is satisfied:

$|f1/f2| < 1.80.$

3. The imaging lens assembly of claim 2, wherein the focal length of the first lens element is f1, the focal length of the second lens element is f2, and the following condition is satisfied:

$|f1/f2| < 0.50.$

4. The imaging lens assembly of claim 1, wherein the sixth lens element has positive refractive power, and the sixth lens element has an image-side surface being convex in a paraxial region thereof.

5. The imaging lens assembly of claim 1, wherein the focal length of the imaging lens assembly is f, the focal length of the sixth lens element is f6, the focal length of the seventh lens element is t7, and the following condition is satisfied:

$1.5 < |f/f6| + |f/f7| < 5.0.$

6. The imaging lens assembly of claim 1, wherein a number of lens elements having an Abbe number smaller than 40 among the seven lens elements is V40, and the following condition is satisfied:

$3 \leq V40.$

7. The imaging lens assembly of claim 1, wherein an axial distance between the first lens element and the second lens element is T12, an axial distance between the second lens element and the third lens element is T23, an axial distance between the fourth lens element and the fifth lens element is T45, an axial distance between the fifth lens element and the sixth lens element is T56, the axial distance between the sixth lens element and the seventh lens element is T67, and the following conditions are satisfied:

$1.0 < T67/T12;$ $1.0 < T67/T23;$ $1.0 < T67/T45;$ and $1.0 < T67/T56.$

8. The imaging lens assembly of claim 1, wherein the axial distance between the object-side surface of the first lens element and the image-side surface of the seventh lens element is Td, the sum of central thicknesses of the seven lens elements of the imaging lens assembly is ΣCT, and the following condition is satisfied:

$1.0 \leq Td/\Sigma CT \leq 1.55.$

9. The imaging lens assembly of claim 1, wherein a number of lens elements having an Abbe number smaller than 30 among the seven lens elements is V30, and the following condition is satisfied:

$3 \leq V30.$

10. The imaging lens assembly of claim 1, wherein the sixth lens element has an image-side surface being convex in a paraxial region thereof, and the object-side surface of the seventh lens element is concave in a paraxial region thereof.

11. The imaging lens assembly of claim 1, wherein a number of lens elements having an Abbe number smaller than 20 among the seven lens elements is V20, and the following condition is satisfied:

$1 \leq V20.$

12. The imaging lens assembly of claim 1, wherein an axial distance between the object-side surface of the first lens element and an image surface is TL, a maximum image height of the imaging lens assembly is ImgH, an f-number of the imaging lens assembly is Fno, a curvature radius of the image-side surface of the first lens element is R2, a central thickness of the first lens element is CT1, and the following conditions are satisfied:

$0.80 < TL/ImgH < 1.75;$ $1.0 < Fno < 2.0;$ and $0 < R2/CT1.$

13. The imaging lens assembly of claim 12, wherein an Abbe number of the second lens element is V2, an Abbe number of the third lens element is V3, an Abbe number of the fourth lens element is V4, and the following condition is satisfied:

$30 < V2 + V3 + V4 < 115.$

14. The imaging lens assembly of claim 1, wherein the focal length of the imaging lens assembly is f, a focal length of the first lens element is f1, a focal length of the second lens element is f2, and the following condition is satisfied:

$0.50 < f \times (|f1| + |f2|)/(|f1| \times |f2|) < 1.65.$

15. The imaging lens assembly of claim 14, wherein the focal length of the imaging lens assembly is f, the focal length of the first lens element is f1, the focal length of the second lens element is f2, and the following condition is satisfied:

$0.50 < f \times (|f1| + |f2|)/(|f1| \times |f2|) < 1.50.$

16. The imaging lens assembly of claim 1, wherein the focal length of the imaging lens assembly is f, the curvature radius of the image-side surface of the fourth lens element is R8, the curvature radius of the image-side surface of the fifth lens element is R10, and the following condition is satisfied:

$0.25 < (f/R8) + (f/R10).$

17. The imaging lens assembly of claim 1, wherein a focal length of the first lens element is f1, a focal length of the second lens element is f2, a maximum image height of the imaging lens assembly is ImgH, an axial distance between the object-side surface of the first lens element and an image surface is TL, and the following condition is satisfied:

$$|(f1/ImgH) \times (TL/f2)| < 0.85.$$

18. The imaging lens assembly of claim 1, wherein a maximum value among all refractive indices of the seven lens elements of the imaging lens assembly is Nmax, and the following condition is satisfied:

$$1.65 \leq Nmax < 1.75.$$

19. An image capturing unit, comprising:
the imaging lens assembly of claim 1; and
an image sensor disposed on an image surface of the imaging lens assembly.

20. An electronic device, comprising:
the image capturing unit of claim 19.

21. An imaging lens assembly comprising seven lens elements, the seven lens elements being, in order from an object side to an image side, a first lens element, a second lens element, a third lens element, a fourth lens element, a fifth lens element, a sixth lens element and a seventh lens element, the first lens element with positive refractive power having an object-side surface being convex in a paraxial region thereof, the sixth lens element having an object-side surface being convex in a paraxial region thereof, the seventh lens element having an image-side surface being concave in a paraxial region thereof, the image-side surface of the seventh lens element having at least one convex shape in an off-axis region thereof, and an object-side surface and the image-side surface of the seventh lens element being both aspheric;
wherein at least one of an image-side surface of the fourth lens element and an image-side surface of the fifth lens element has at least one inflection point, a focal length of the imaging lens assembly is f, a curvature radius of the image-side surface of the fourth lens element is R8, a curvature radius of the image-side surface of the fifth lens element is R10, an axial distance between the object-side surface of the first lens element and the image-side surface of the seventh lens element is Td, a sum of central thicknesses of the seven lens elements of the imaging lens assembly is ΣCT, a focal length of the sixth lens element is f6, a focal length of the seventh lens element is t7, a number of lens elements having an Abbe number smaller than 40 among the seven lens elements is V40, and the following conditions are satisfied:

$$0 \leq f/R8;$$

$$0 \leq f/R10,$$

$$Td/\Sigma CT < 1.65;$$

$$1.10 < |f/f6| + |f/f7|, \text{ and}$$

$$3 \leq V40.$$

22. The imaging lens assembly of claim 21, wherein the axial distance between the object-side surface of the first lens element and the image-side surface of the seventh lens element is Td, the sum of central thicknesses of the seven lens elements of the imaging lens assembly is ΣCT, and the following condition is satisfied:

$$1.0 \leq Td/\Sigma CT \leq 1.55.$$

23. The imaging lens assembly of claim 21, wherein an axial distance between the first lens element and the second lens element is T12, an axial distance between the second lens element and the third lens element is T23, an axial distance between the third lens element and the fourth lens element is T34, an axial distance between the fourth lens element and the fifth lens element is T45, an axial distance between the fifth lens element and the sixth lens element is T56, an axial distance between the sixth lens element and the seventh lens element is T67, and the following conditions are satisfied:

$$1.0 < T67/T12;$$

$$1.0 < T67/T23;$$

$$1.0 < T67/T34;$$

$$1.0 < T67/T45; \text{ and}$$

$$1.0 < T67/T56.$$

24. The imaging lens assembly of claim 21, wherein the focal length of the imaging lens assembly is f, the focal length of the sixth lens element is f6, the focal length of the seventh lens element is t7, and the following condition is satisfied:

$$1.5 < |f/f6| + |f/f7| < 5.0.$$

25. The imaging lens assembly of claim 21, wherein the focal length of the imaging lens assembly is f, the curvature radius of the image-side surface of the fourth lens element is R8, the curvature radius of the image-side surface of the fifth lens element is R10, and the following condition is satisfied:

$$0.25 < (f/R8) + (f/R10).$$

26. The imaging lens assembly of claim 21, wherein a number of lens elements having an Abbe number smaller than 30 among the seven lens elements is V30, and the following condition is satisfied:

$$3 \leq V30.$$

27. The imaging lens assembly of claim 21, wherein a number of lens elements having an Abbe number smaller than 20 among the seven lens elements is V20, and the following condition is satisfied:

$$1 \leq V20.$$

28. The imaging lens assembly of claim 21, wherein a focal length of the first lens element is f1, a focal length of the second lens element is f2, a maximum image height of the imaging lens assembly is ImgH, an axial distance between the object-side surface of the first lens element and an image surface is TL, a maximum value among all refractive indices of the seven lens elements of the imaging lens assembly is Nmax, and the following conditions are satisfied:

$$|(f1/ImgH) \times (TL/f2)| < 0.85; \text{ and}$$

$$1.65 \leq Nmax < 1.75.$$

* * * * *

UNITED STATES PATENT AND TRADEMARK OFFICE
CERTIFICATE OF CORRECTION

PATENT NO. : 10,690,886 B2
APPLICATION NO. : 15/816897
DATED : June 23, 2020
INVENTOR(S) : Hsiang-Chi Tang et al.

Page 1 of 1

It is certified that error appears in the above-identified patent and that said Letters Patent is hereby corrected as shown below:

In the Claims

Column 53, Line 3 (Claim 1): replace "t7" with "f7"

Column 53, Line 10 (Claim 1): replace the "," with a ";"

Column 53, Line 15 (Claim 1): replace "|f7|" with "|f/f7|"

Column 53, Line 37 (Claim 5): replace "t7" with "f7"

Column 55, Line 44 (Claim 21): replace "t7" with "f7"

Column 55, Line 51 (Claim 21): replace the "," with a ";"

Column 55, Line 55 (Claim 21): replace the "," with a ";"

Column 56, Line 27 (Claim 24): replace "t7" with "f7"

Signed and Sealed this
Eighteenth Day of August, 2020

Andrei Iancu
*Director of the United States Patent and Trademark Office*